United States Patent
Inoue et al.

(10) Patent No.: US 6,609,451 B1
(45) Date of Patent: Aug. 26, 2003

(54) MINE DETECTOR AND INSPECTION APPARATUS

(75) Inventors: Yoshitaka Inoue, Tokyo (JP); Yoichi Toguchi, Kyoto (JP); Hiroshi Tomita, Tokyo (JP)

(73) Assignees: Omron Corporation, Kyoto (JP); Geo Search Co., Ltd., Tokyo (JP)

(*) Notice: Subject to any disclaimer, the term of this patent is extended or adjusted under 35 U.S.C. 154(b) by 0 days.

(21) Appl. No.: 09/830,170

(22) PCT Filed: Oct. 20, 1999

(86) PCT No.: PCT/JP99/05775

§ 371 (c)(1),
(2), (4) Date: Jul. 23, 2001

(87) PCT Pub. No.: WO00/23762

PCT Pub. Date: Apr. 27, 2000

(30) Foreign Application Priority Data

Oct. 21, 1998 (JP) .............................. 10-299479
May 7, 1999 (JP) .............................. 11-127597

(51) Int. Cl.[7] .................................................. G01V 3/00
(52) U.S. Cl. .......................... 89/1.13; 342/22; 342/179; 324/329
(58) Field of Search .......... 342/22, 179, 180; 367/128; 324/329; 89/1.13

(56) References Cited

U.S. PATENT DOCUMENTS

| 4,706,031 A | * 11/1987 | Michiguchi et al. ........... 342/22 |
| 4,839,654 A | * 6/1989 | Ito et al. ........................ 342/22 |
| 4,896,116 A | * 1/1990 | Nagashima et al. ......... 324/329 |
| 5,680,048 A | * 10/1997 | Wollny ......................... 324/329 |
| 6,094,157 A | * 7/2000 | Cowdrick ..................... 342/22 |

FOREIGN PATENT DOCUMENTS

| EP | 305 556 | * 3/1989 | ............... 89/1.13 |
| JP | 9-88351 | 3/1997 | |

* cited by examiner

Primary Examiner—Stephen M. Johnson
(74) Attorney, Agent, or Firm—Jacobson Holman PLLC

(57) ABSTRACT

A mine detector is provided for detecting buried land mines safely and promptly. A sensor head (12) is connected to a detector body (1) through hinges (11-1 to 11-4) and arms (12-1 to 12-3). The sensor head (12) includes a transmitting and receiving means for emitting electromagnetic impulses to the ground within a range of detection of land mines. When the transmitting and receiving means receives electromagnetic waves reflected from a land mine, information on the three-dimensional structure of the land mine buried under the ground is generated on the basis of the time of arrival of the reflected wave, the level of the reflected wave and the x and y coordinates of the transmitting and receiving means, and the information is displayed on a display (1). The detector is also applicable to the inspection of steel rods and bars for concrete reinforcement.

20 Claims, 60 Drawing Sheets

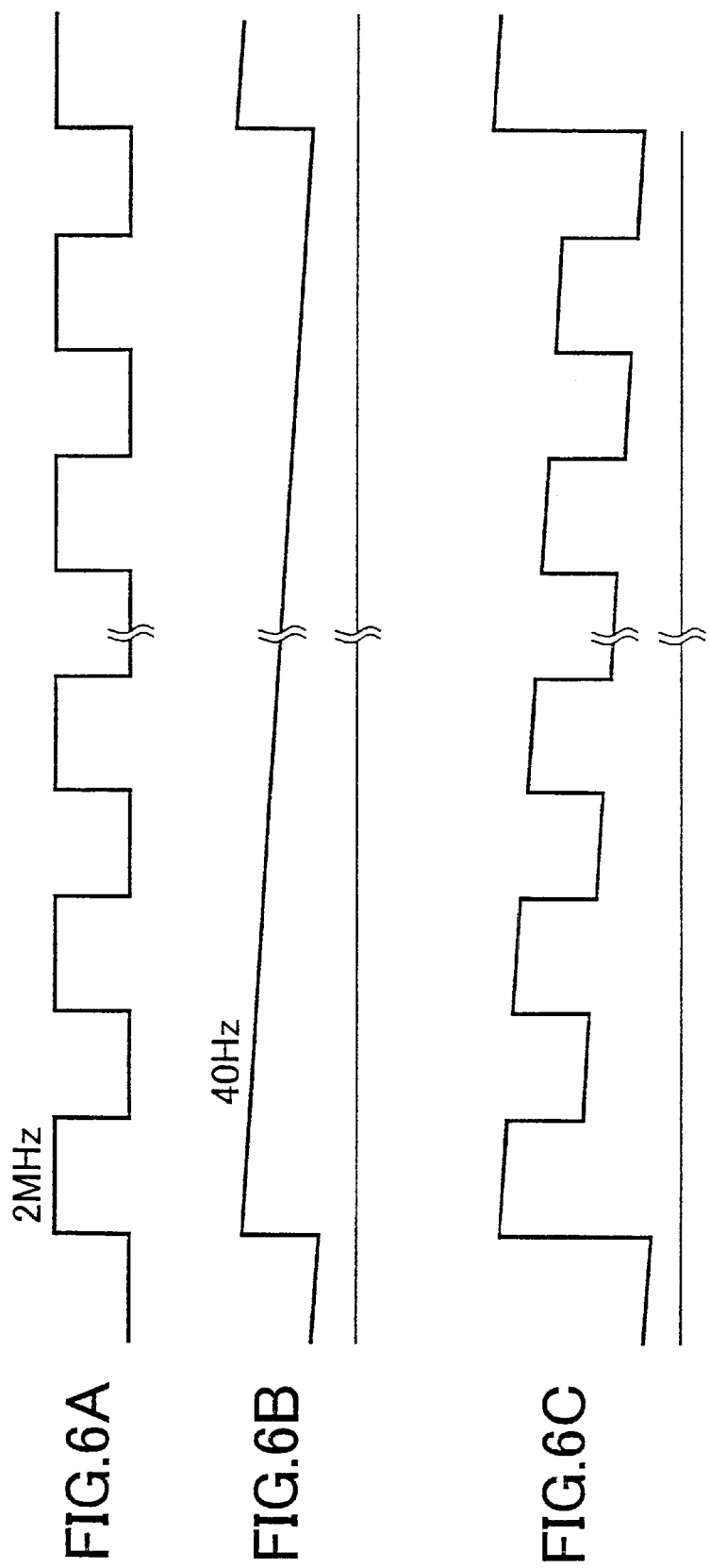

REFERENCE POINT    SAMPLING POINT

REFERENCE POINT    SAMPLING POINT

81 SCALE
82 INDICATOR
83 CURSOR

91 FRAME

91

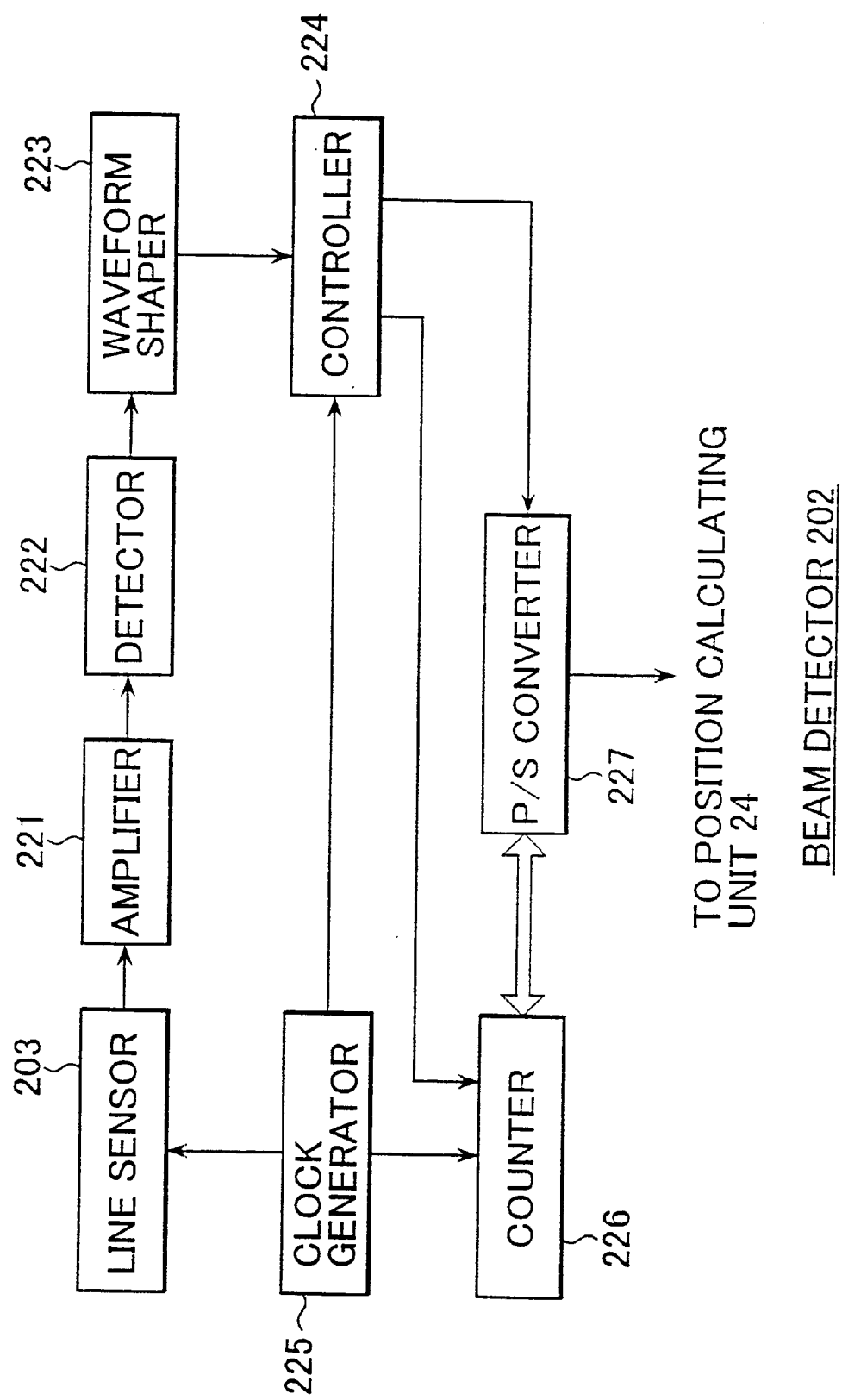

SENSOR HEAD 152

FIG.68
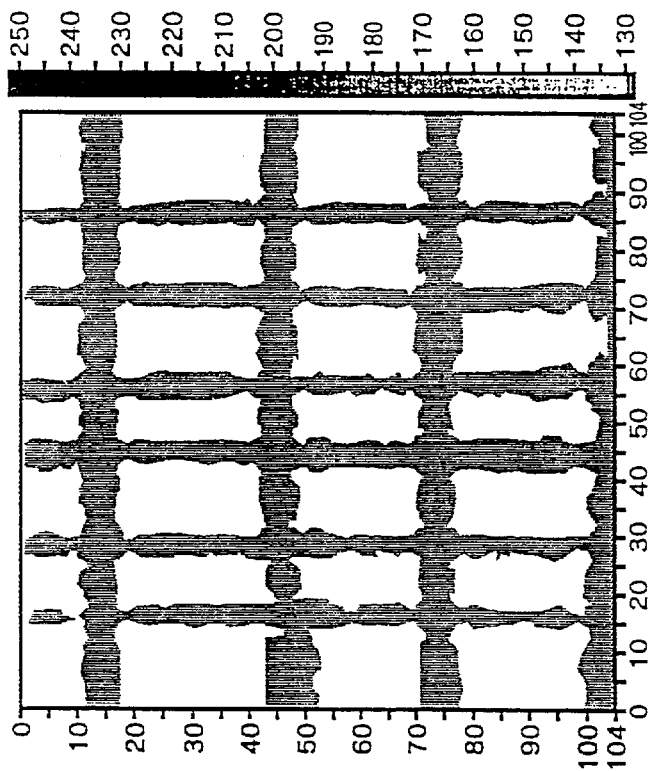
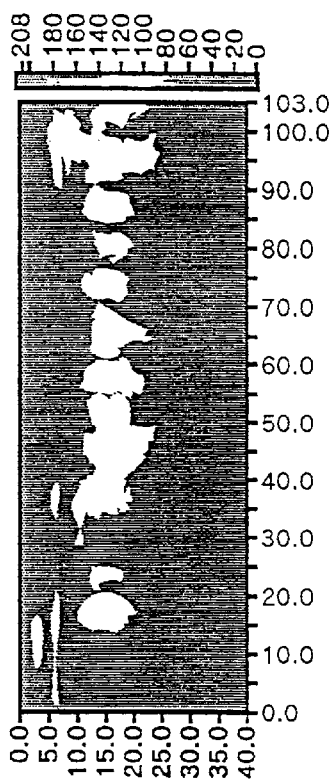
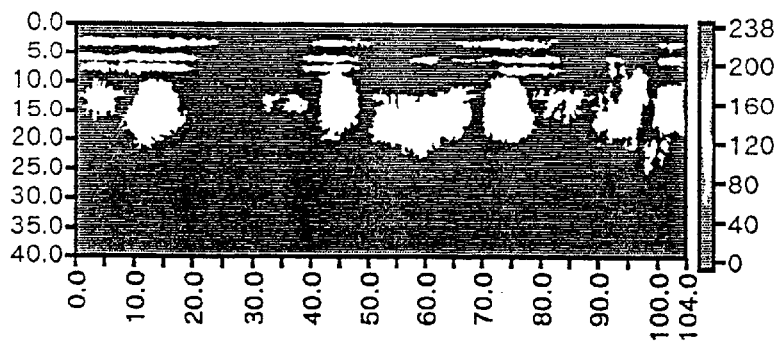

FIG. 69
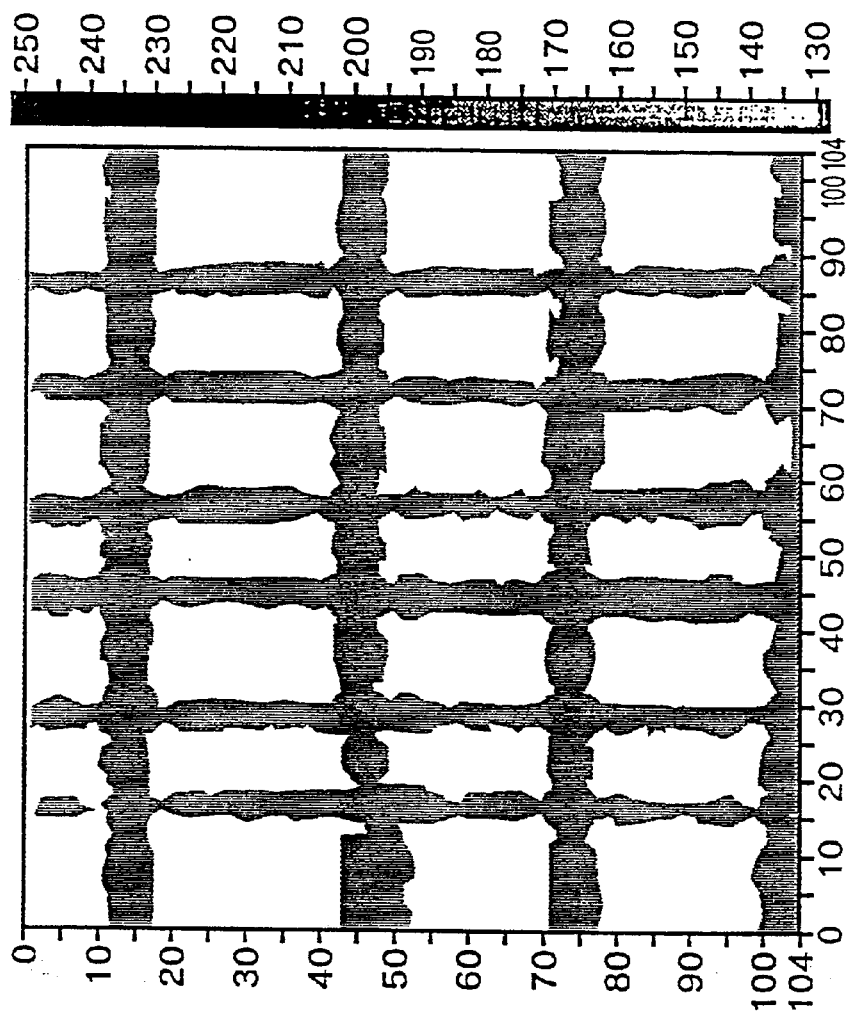
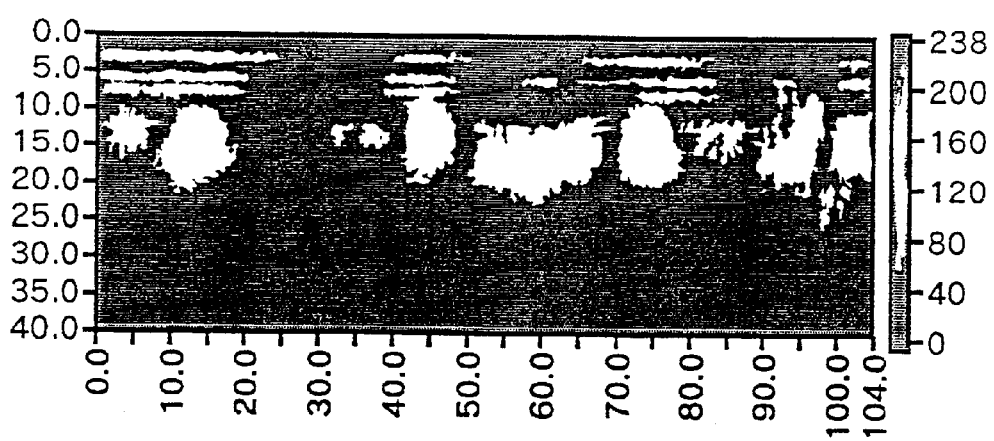

FIG.70
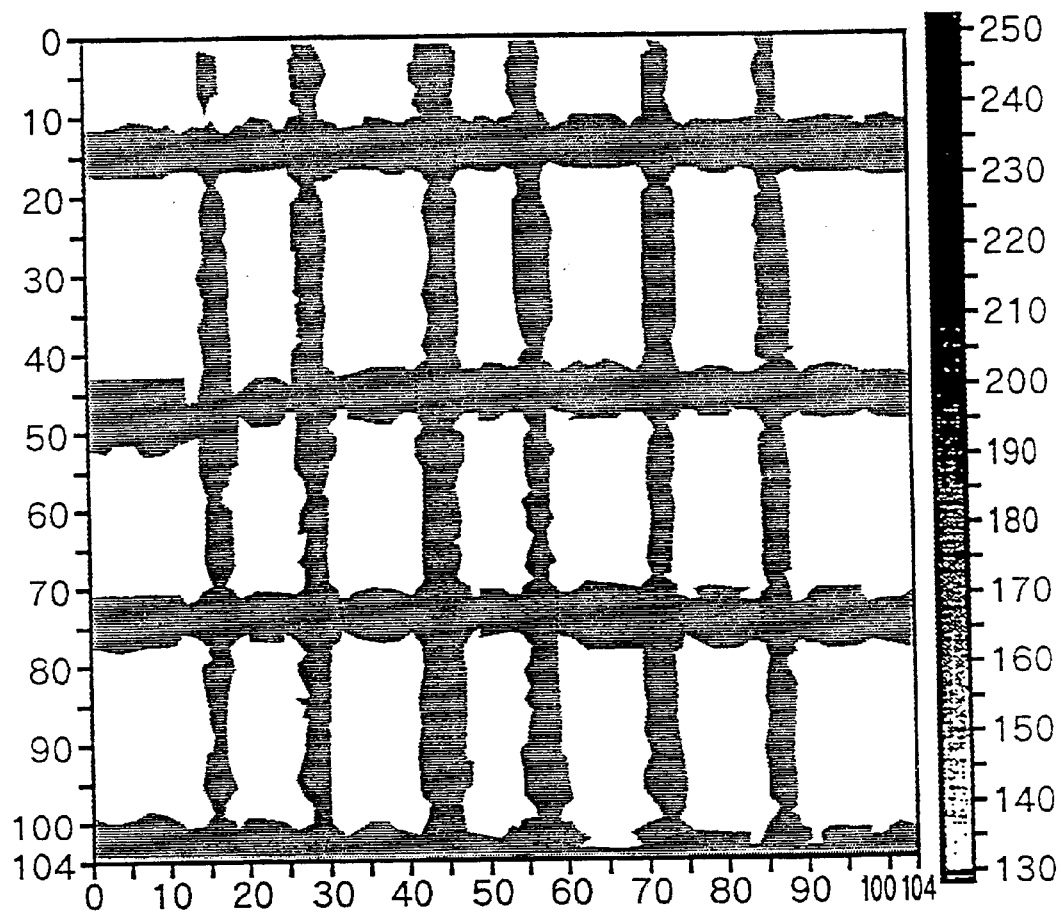
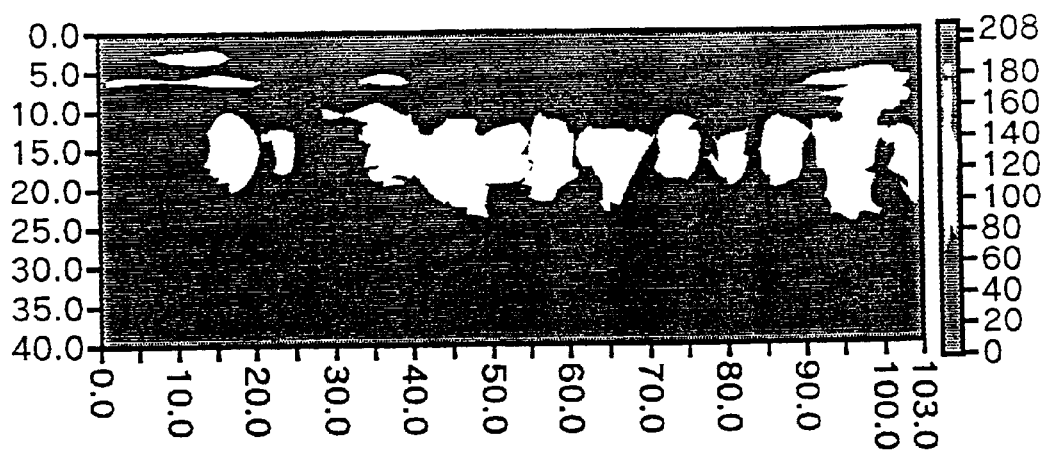

SENSOR HEAD 152

MINE DETECTOR AND INSPECTION APPARATUS

This application is a national phase under 35 USC §371 of PCT International Application No. PCT/JP99/05775 which has an International Filing Date of Oct. 20, 1999, which designated the United States of America and was published in Japanese and claims priority from 10/299479 filed Oct. 21, 1998, in Japan and 11/127597 filed May 7, 1999, in Japan which is claimed herein.

TECHNICAL FIELD

The present invention relates to a mine detector and an inspection apparatus, and more particularly, to a mine detector and an inspection apparatus which can safely and promptly detect land mines, a structure within a concrete wall, and so on.

BACKGROUND ART

Recently, in a region where an intestine war or the like took place, a need exists for removing land mines buried in the ground after the termination of the intestine war. Conventionally, land mines have been removed, for example, in the following manner.

First, within a predetermined range, an operation is performed for confirming the presence or absence of trap wires. The trap wires are coupled to the buried ground, such that a walking person touching the trap wire causes a land mine to explore, so that the trap wires are first removed.

Next, within a range where it is confirmed that there are no trap wires, the grass is cut for facilitating an inspection. Then, within the range where the grass has been cut, the presence or absence of land mines is inspected using a metal detector.

When a metal reaction is caught by the metal detector, the operator uses a stick of approximately 30 centimeters long to carefully dig the ground up from that position to confirm whether or not the sensed reaction is due to a land mine. When the existence of a land mine is confirmed, this is dug out, removed, and then carried to a predetermined place where it is explored using an explosive or the like.

On the other hand, for inspecting a structure within a concrete wall, it is known that a state internal to the concrete is detected by transmitting an electromagnetic wave toward the interior of the concrete and receiving a reflected signal therefrom, for example, as previously proposed by one of the applicants as Laid-open Japanese Patent Application No. Hei 9-88351.

Conventionally, since land mines are detected using a metal detector in the manner mentioned above, a problem is encountered in securely detecting the land mines if they are made of other than metals, for example, plastics or the like.

Further, the metal detector is configured to notify the operator of a metal reaction through sound such as "beep." The sound becomes larger as the metal detector is closer to a metal and smaller as it is further away from a metal. The operator is required to gain experience for identifying the position at which the largest sound is generated. As a result, an operator less experienced with the operation digs the ground up with a stick from a position at which even small sound begins (a position far away from a land mine) for safety, so that a problem arises in that the detection of land mines is time consuming.

Further, when a metal detector is used, nails, other metal fragments and so on, if buried other than land mines, are also detected. Before digging out, it is unknown whether a detected object is a land mine or not, so that the ground must be carefully dug out. However, as a result of digging out over a long time, it is often the case that the object is not a mine.

Consequently, it comes down to a problem in taking a very long time to detect whether or not land mines are buried within a predetermined area to confirm the safety.

Also, as previously proposed, the method of detecting an internal structure within a concrete from a reflected wave of an electromagnetic wave transmitted thereto implies a problem that precise detection of the internal state is difficult due to a difference in the level of the reflected electromagnetic wave, caused by a moisture included in the concrete, and so on.

DISCLOSURE OF THE INVENTION

The present invention has been made in view of the situations as mentioned, and its object is to provide a mine detector which is capable of safely, promptly and reliably detecting land mines buried in the ground.

Also, it is an object of the present invention to provide an inspection apparatus which is capable of promptly and reliably detecting the presence or absence of an object, and the state of an object under inspection.

A mine detector according to the present invention is a mine detector for detecting a land mine buried in the ground, which comprises transmitting and receiving means for transmitting an electromagnetic wave toward the ground of a range intended to detect the land mine for scanning, and receiving a reflected wave thereof, position detecting means for detecting the position of the transmitting and receiving means at a time the transmitting and receiving means receives the reflected wave, an internal ground structure information generating means for generating information indicative of a three-dimensional structure in the ground based on a period of time from the transmission of the electromagnetic wave by the transmitting and receiving means to the reception of the reflected wave, a received level of the reflected wave, and a position detected by the position detecting means, image information generating means for generating image information for display from information indicative of the three-dimensional structure generated by the internal ground structure information generating means, and display means for displaying an image based on the image information generated by the image information generating means.

In this mine detector, information indicative of a three-dimensional structure in the ground is processed based on a period of time until a reflected wave is detected after the electromagnetic wave has been transmitted, a received level of the reflected wave, and a position at which the reflected wave is detected. An image signal for display is generated from the processed information indicative of the three-dimensional structure, thereby displaying an image based on the image signal.

According to this mine detector, since the electromagnetic wave is transmitted and received to generate information indicative of a three-dimensional structure in the ground, from which image information for display is generated and displayed, it is possible to promptly and reliably detect land mines in a wide area.

Another mine detector according to the present invention is a mine detector for detecting a land mine buried in the ground, which comprises transmitting and receiving means for transmitting an electromagnetic wave toward the ground of a range intended to detect the land mine for scanning, and receiving a reflected wave thereof, position detecting means for detecting the position of the transmitting and receiving means at a time the transmitting and receiving means receives the reflected wave, an internal ground structure information generating means for generating information indicative of a three-dimensional structure in the ground based on a period of time from the transmission of the electromagnetic wave by the transmitting and receiving means to the reception of the reflected wave, a received level of the reflected wave, and a position detected by the position detecting means, calibration means for calibrating the value of a dielectric coefficient of the ground which is a parameter for use in the internal ground structure information generating means, image information generating means for generating image information for display from information indicative of the three-dimensional structure generated by the internal ground structure information generating means, and display means for displaying an image based on the image information generated by the image information generating means.

In this mine detector, information indicative of a three-dimensional structure in the ground is processed based on a period of time until a reflected wave is detected after the electromagnetic wave has been transmitted, a received level of the reflected wave, and a position at which the reflected wave is detected. The calibration is performed for the value of the dielectric coefficient as a parameter for use in generating information of the structure in the ground. An image signal for display is generated from the processed information indicative of the three-dimensional structure, thereby displaying an image based on the image signal.

According to this mine detector, since the calibration is performed for the value of the dielectric coefficient to generate information of a three-dimensional image in the ground, it is possible to accurately, promptly and safely detect the position of a land mine.

An inspection apparatus according to the present invention is an inspection apparatus which comprises transmitting and receiving means for transmitting an electromagnetic wave to an object under inspection in a range in which the object under inspection is scanned, and receiving a reflected wave thereof, a position detecting means for detecting a position at which the transmitting and receiving means receives the reflected wave, processing means for processing a signal indicative of a three-dimensional structure inside of the object under inspection based on a period of time from the transmission of the electromagnetic wave by the transmitting and receiving means to the reception of the reflected wave, a received level of the reflected wave, and a position detected by the position detecting means, calibration means for calibrating the processing by the processing means, generating means for generating an image signal from the signal indicative of the three-dimensional structure processed by the processing means, and display means for displaying an image based on the image signal generated by the generating means.

In this inspection apparatus, a signal on a three-dimensional coordinates representative of a state inside of the object under inspection is processed based on a period of time until a reflected wave is detected after the electromagnetic wave has been transmitted, a received level of the reflected wave, and a position at which the reflected wave is detected. After the calibration is performed, an image signal is generated from the processed signal on the three-dimensional coordinates, thereby displaying an image based on the image signal.

According to this inspection apparatus, since the calibration is performed based on the dielectric coefficient to inspect the object under inspection, it is possible to promptly and reliably inspect an article in the object under inspection.

Another inspection apparatus according to the present invention is an inspection apparatus which comprises transmitting and receiving means for transmitting an electromagnetic wave to an object under inspection in a range in which the object under inspection is scanned, and receiving a reflected wave thereof, inspecting means for inspecting the interior of the object under inspection from an output of the transmitting and receiving means, generating means constructed integrally with the transmitting and receiving means for generating at least three light beams, light receiving means for receiving the three light beams and outputting signals corresponding to positions at which the light beams are received, and position detecting means for detecting a position of the transmitting and receiving means from an output of the light receiving means.

In this inspection apparatus, at least three light beams are generated corresponding to the position of the transmitting and receiving means, and the position of the transmitting and receiving means is detected from signals corresponding to positions at which the light beams are detected.

According to this inspection apparatus, since the position of the transmitting and receiving means is detected based on positions at which at least three light beams are received, it is possible to not only detect the three-dimensional position of the transmitting and receiving means but also detect its posture. As a result, the object under inspection can be accurately and promptly inspected.

Other objects, features and benefits of the present invention will become sufficiently apparent from the following description.

BRIEF DESCRIPTION OF THE DRAWINGS

FIGS. 6A, 6B and 6C are timing charts for explaining the operation of a sampling pulse generator 111 in FIG. 3;

FIG. 43 is a block diagram illustrating the internal configuration of a beam detector 202 in FIG. 42;

FIG. 68 is a diagram illustrating an exemplary layout of displaying a plurality of cross-sections;

FIG. 69 is a diagram illustrating an exemplary layout of displaying a plurality of cross-sections;

FIG. 70 is a diagram illustrating an exemplary layout of displaying a plurality of cross-sections;

BEST MODE FOR CARRYING OUT THE INVENTION

A mine detector and an inspection apparatus according to one embodiment of the present invention will hereinafter be described with reference to the drawings.

Figure 1:
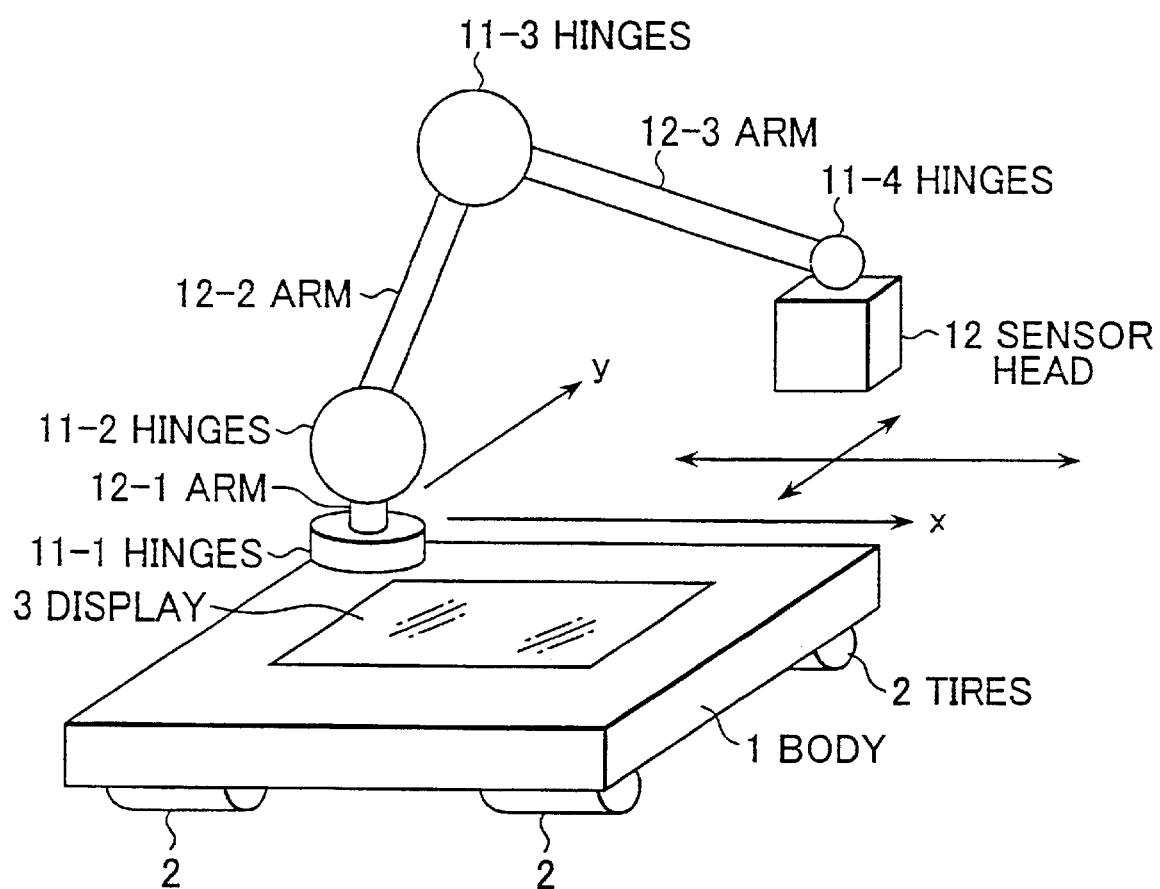
FIG. 1 is a perspective view illustrating an external configuration of an inspection apparatus to which the present invention is applied.

FIG. 1 illustrates an external configuration of an inspection apparatus to which the present invention is applied. A body 1, to which four tires 2 are mounted, can be moved to a predetermined position. A display 3 is disposed on the top surface of the body 1 for displaying a predetermined image.

An arm 12-1 is coupled to an upper left end of the body 1 through a hinge 11-1, a hinge 11-2 is coupled to an end of the arm 12-1, and an arm 12-2 is coupled to the hinge 11-2. Further, a hinge 11-3 is coupled to an end of the arm 12-2, an arm 12-3 is coupled to the hinge 11-3, and a hinge 11-4 is coupled to an end of the arm 12-3. Then, a sensor head 12 is mounted to the hinge 11-4. Therefore, the sensor head 12 can be moved in an arbitrary direction in the horizontal direction and the vertical direction. Rotary encoders are contained within the hinge 11-1 to the hinge 11-4 for detecting a relative position of the sensor head 12 with respect to a predetermined reference position of the body 1 (for example, the center of the hinge 11-1 at which the sensor head 12 is attached).

Figure 2:
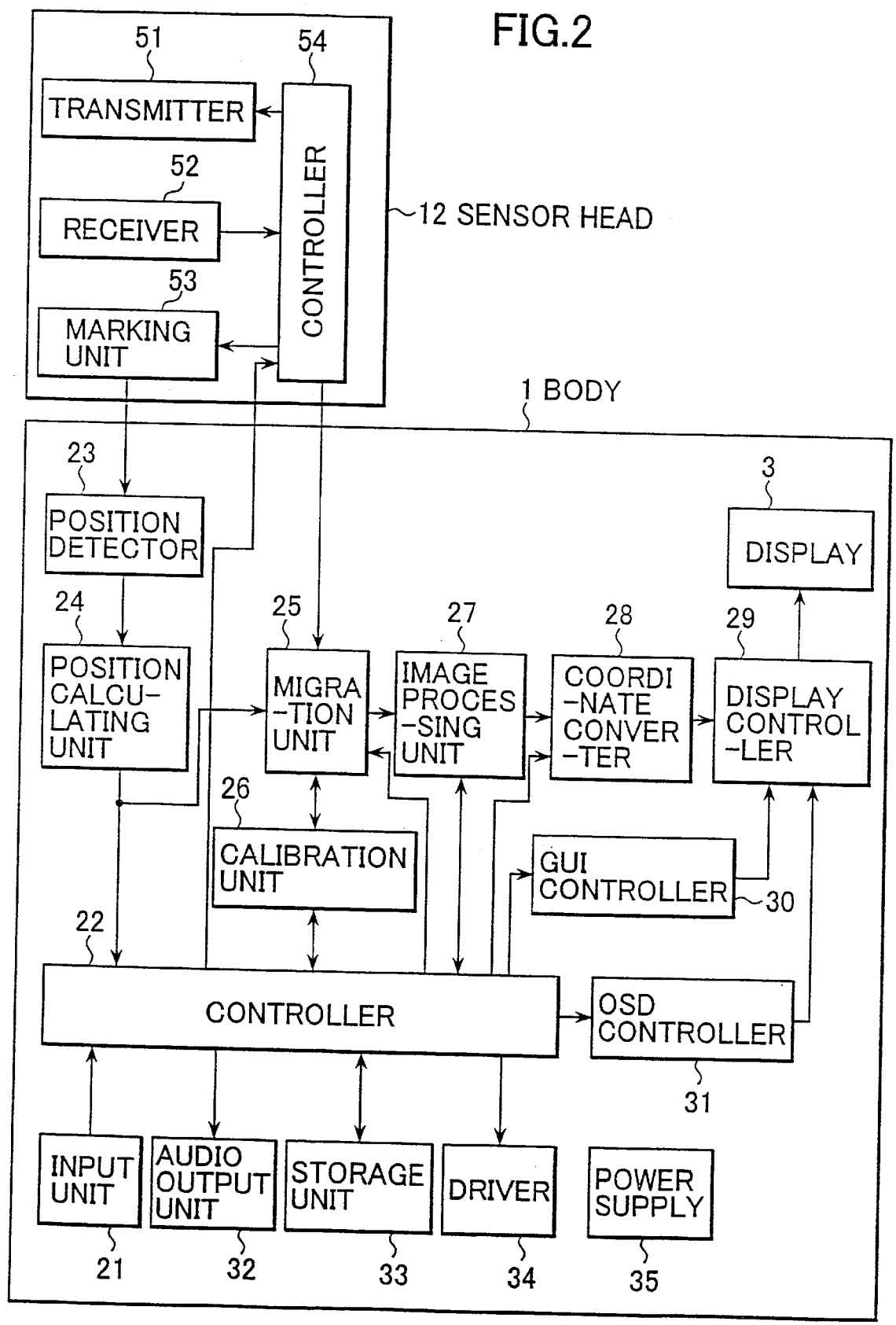
FIG. 2 is a block diagram illustrating an exemplary internal configuration of the inspection apparatus of FIG. 1.

FIG. 2 illustrates an exemplary internal configuration of the body 1 and the sensor head 12. The sensor head 12 comprises a transmitter 51 for transmitting electromagnetic impulses in a frequency band extending to a GHz band to the ground, and a receiver 52 for receiving a reflected wave of the electromagnetic wave from the underground. A controller 54 controls the transmitter 51 and the receiver 52, and measures a time until a reflected wave is received from an object (land mine) buried in the ground, after the transmitter 51 has transmitted an impulse electromagnetic wave. A marking unit 53 discharges a paint or the like to the ground, when controlled by the controller 54 at a predetermined timing, such that a position at which a land mine is buried can be identified at a later time.

A position detector 23, which is comprised of the aforementioned rotary encoders contained in the hinges 11-1 to 11-4, and so on, detects the position of the sensor head 12 with respect to the reference position of the body 1, and outputs the result of the detection to a position calculating unit 24. The position calculating unit 24 calculates the coordinate in the x-axis direction and the coordinate in the y-axis direction in a horizontal plane of the sensor head 12 with respect to the reference position of the body 1 based on a signal from the position detector 23, and outputs the result of the calculation to a controller 22. To the controller 22, for example, based on a microcomputer or the like, a predetermined instruction can be entered by the operator manipulating an input unit 21 comprised of buttons, switches and so on. An audio output unit 32 comprises, for example, a speaker and so on for outputting predetermined alarming sound to the operator. A driver 34 contains motors and so on for driving the tires 2 to move the body 1 to a predetermined position.

A migration unit 25 receives a signal input from the controller 54 of the sensor head 12 for performing migration processing (movement processing), and performs processing for converting a signal including a propagation time of an electromagnetic wave, supplied from the controller 54, to a coordinate signal on the z-axis (depth direction). A calibration unit 26 performs processing for determining a dielectric coefficient, which is required for the migration processing in the migration unit 25, under the control of the controller 22. An image processing unit 27, controlled by the controller 22, generates an image signal indicative of a three-dimensional structure within the ground (image signal represented by a pixel at each position on the xyz-coordinates with the origin defined at a predetermined reference position for scanning) from three-dimensional xyz-coordinate signals supplied from the migration unit 25. A coordinate converter 28 converts an xyz-coordinate signal input from the image processing unit 27 to a two-dimensional coordinate signal for display on a screen of the display 3, and outputs the converted signal to a display controller 29. The display controller 29 controls the display 3 based on an image signal supplied from the coordinate converter 28 to display an image.

A GUI (graphical user interface) controller 30, controlled by the controller 22, generates a GUI image for prompting the operator to enter a predetermined instruction, and outputs the GUI image to the display controller 29. An OSD (on screen display) controller 31, controlled by the controller 22, generates image data, for example, for figures such as a cursor, a frame and so on, which are output to the display controller 29. The display controller 29 superimposes an image corresponding to image data supplied from the GUI controller 30 or the OSD controller 31 on an image from the coordinate converter 28 as required and displays the image on the display 3.

A storage unit 33 is comprised of RAM, EEPROM, a hard disk or the like for storing an image captured by the sensor head 12. A power supply unit 35 is comprised of a battery, a cell or the like for supplying respective components with required power.

Figure 3:
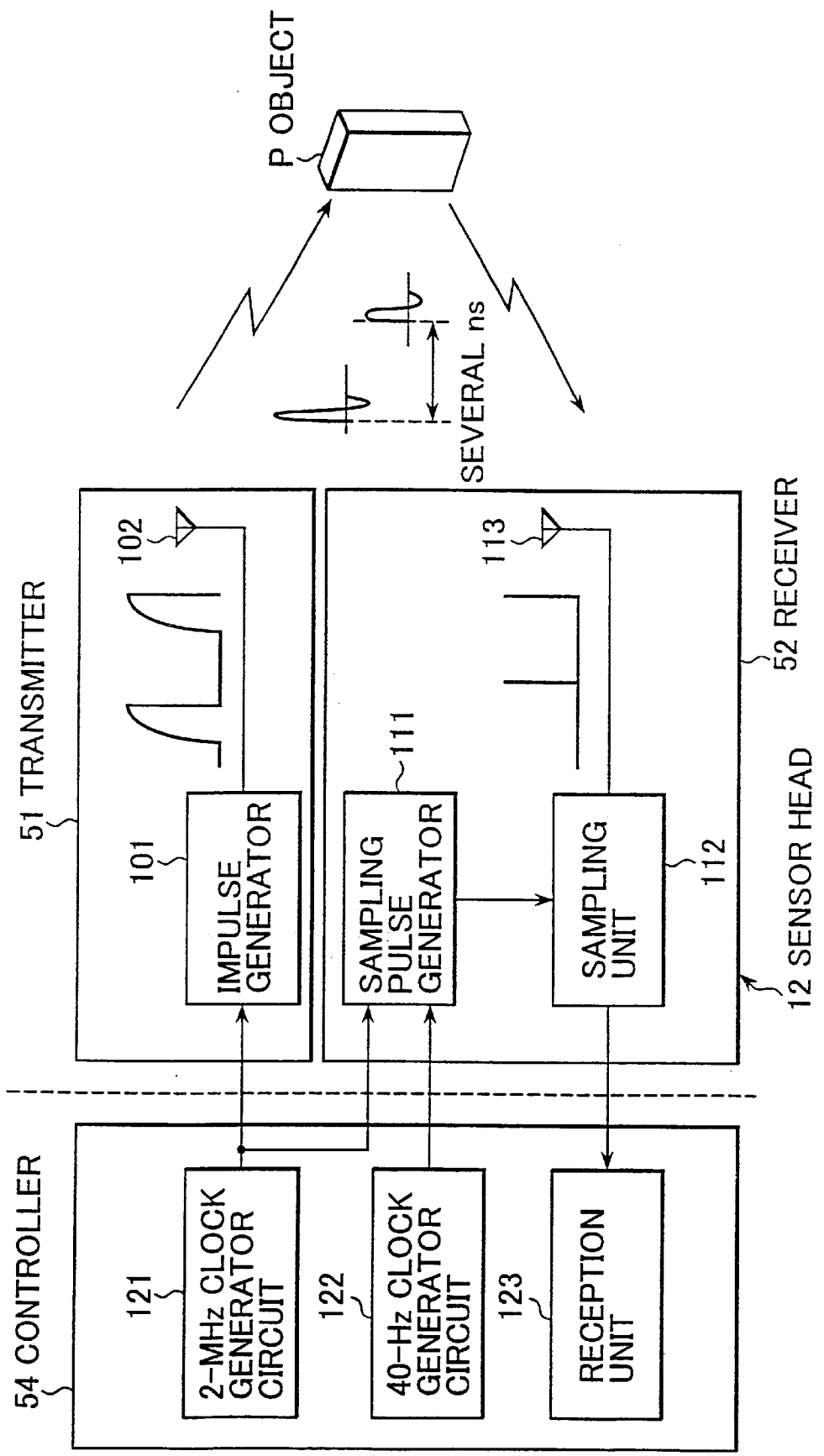
FIG. 3 is a block diagram illustrating in greater detail an exemplary internal configuration of a sensor head 12 in FIG. 2.

FIG. 3 illustrates in greater details an exemplary configuration of the transmitter 51, the receiver 52 and the controller 54 of the sensor head 12. The transmitter 51 and the receiver 52 are high frequency circuits. The transmitter 51 comprises an impulse generator 101 for generating an impulse which abruptly falls; and a transmission antenna 102 for generating an impulse electromagnetic wave based on the impulse output from the impulse generator 101.

The receiver 52 comprises a sampling pulse generator 111 for generating a sampling pulse; and a sampling unit 112 for sampling the level of a reflected wave received by a reception antenna 113 corresponding to the sampling pulse supplied from the sampling pulse generator 111.

The controller 54 comprises a clock generator circuit 121 for generating a clock at frequency of 2 MHz and outputting the clock to the impulse generator 101 and the sampling pulse generator 111; and a clock generator circuit 122 for generating a clock at frequency of 40 Hz and outputting the clock to the sampling pulse generator 111. The controller 54 also comprises a reception unit 123 for receiving and holding a sample value supplied from the sampling unit 112.

First, the operation associated with transmission and reception of an electromagnetic wave will be explained. The impulse generator 101 generates an abruptly falling impulse in synchronism with a clock output from the clock generator circuit 121. The abruptly falling impulse can be generated by rapidly turning on or off a contained transistor as a switching element. The transmission antenna 102, when supplied with the abruptly falling impulse from the impulse generator 101, transmits an impulse electromagnetic wave in synchronism with the timing of the abrupt falling.

The transmitted impulse electromagnetic wave is reflected by an object P such as a land mine buried in the ground, and received by the reception antenna 113, so that the received signal is input to the sampling unit 112. The electromagnetic wave is strongly reflected on a boundary face on which the dielectric coefficient largely varies from a predetermined value to another value. Therefore, for example, the earth is largely different in dielectric coefficient from a metal, so that the electromagnetic wave is strongly reflected by the boundary face therebetween, and therefore a high level reflected wave is received. The level and a propagation time (a period of time until the reflected wave is received after the transmission wave has been transmitted) of the reflected wave serve as important sensing information.

Figure 4:
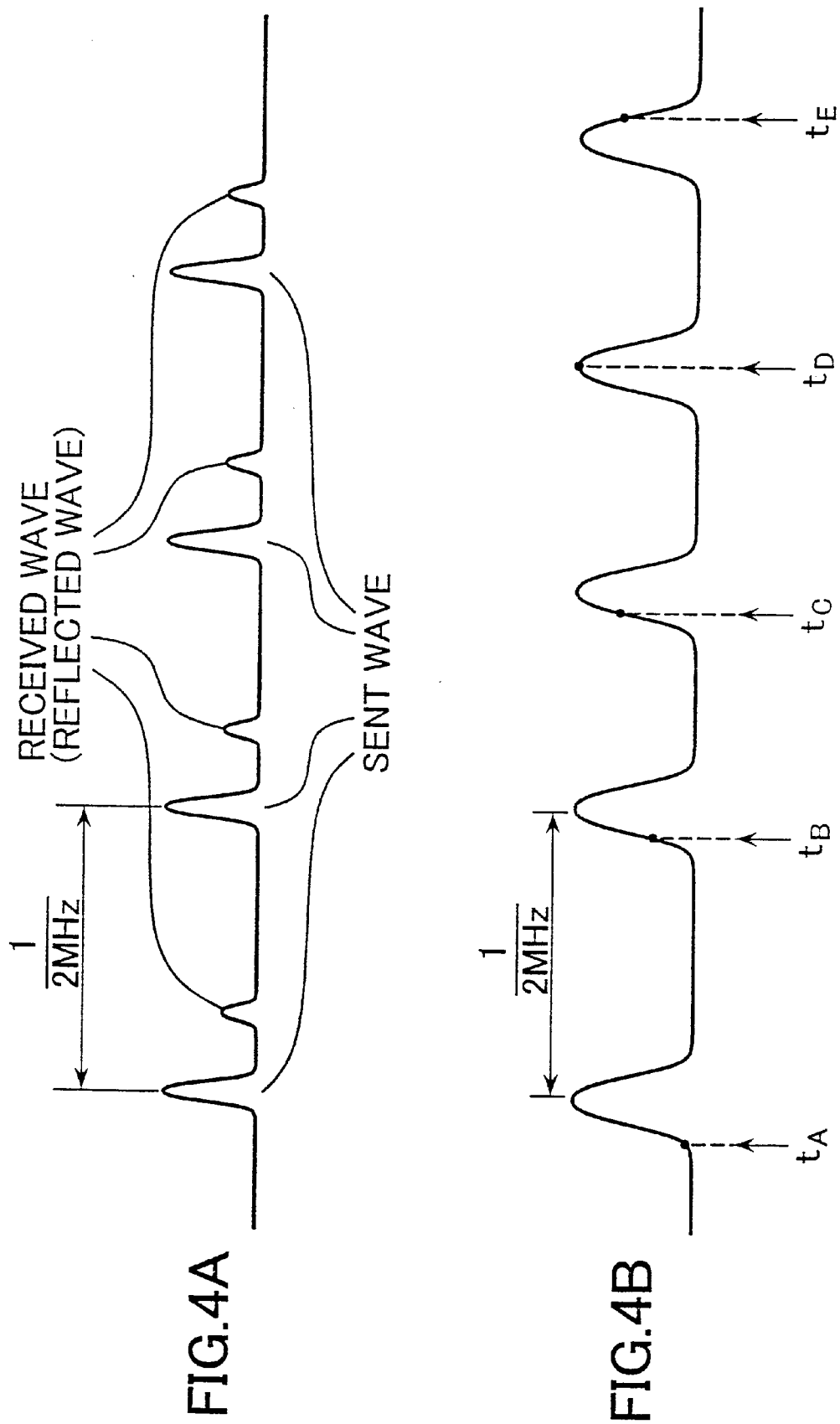
FIGS. 4A and 4B shows waveform charts for explaining the operation of the sensor head in FIG. 3.

Therefore, as shown in FIG. 4(A), when a transmission wave (sent wave) is transmitted at a period of an inverse of the frequency of 2 MHz, a reflected wave is received with a slight delay therefrom. Now, considering only the reflected wave (received wave), a reflected wave as shown in FIG. 4(B) is input to the sampling unit 112.

The sampling pulse generator 111 generates a sampling pulse in synchronism with the clock at frequency of 2 MHz supplied from the clock generator circuit 121, where the sampling pulse is slightly offset in phase based on a clock at frequency of 40 Hz supplied from the clock generator circuit 122. In this way, the level of the received wave can be sampled at different positions, as shown in FIG. 4(B).

Since an object reflecting an electromagnetic wave can be treated as an object which does not substantially move within a sampling period, it is thought that each waveform of the reflected wave (received wave) received at a period equal to the inverse of the frequency of 2 MHz, shown in FIG. 4(B), is substantially the same. It is therefore possible to sample the ever changing level of one received wave with an extended time axis (in a low frequency region) by sampling these received waves at a period equal to the inverse of the frequency of substantially 2 MHz while slightly changing the phase.

For receiving one reflected wave and sampling the value of the ever changing level thereof, a sampling clock at a frequency sufficiently higher than the frequency of 2 MHz is required. Such a high frequency implies laborious handling and high cost. Thus, by slightly offsetting the phase of the sampling clock at a frequency of substantially 2 MHz in this way, a reflected wave having the frequency of 2 MHz can be sampled without using a special high frequency circuit. For example, in the example of FIG. 4(B), the received wave is sampled at timings of times tA to tE.

Figure 5:
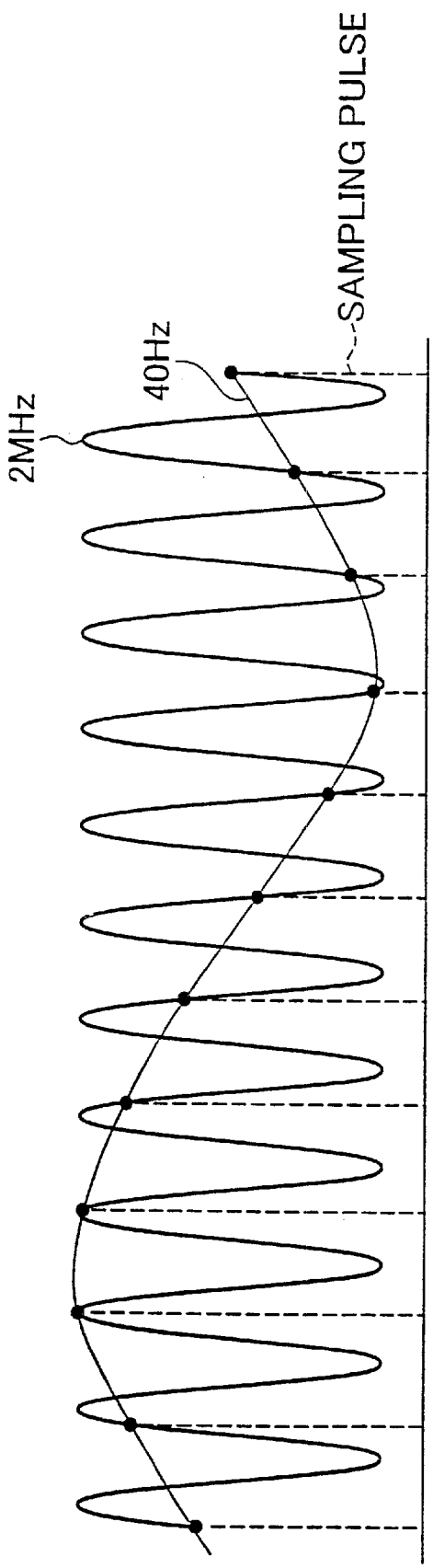
FIG. 5 is a timing chart for explaining a transmitted wave and a reflected wave.

For this reason, the sampling pulse generator 111 compares the clock at frequency of 2 MHz with the clock at frequency of 40 Hz in terms of the level, and generates a sampling pulse at the timing at which both the clocks are at the same level, as schematically shown in FIG. 5.

More specifically, as shown in FIG. 6, the sampling pulse generator 111 combines the clock at frequency of 2 MHz supplied from the clock generator circuit 121 (FIG. 6(A)) with a clock in the shape of saw-tooth wave at frequency of 40 Hz supplied from the clock generator circuit 122 (FIG. 6(B)) to generate a combined wave (FIG. 6(C)). The sampling pulse generator 111 compares this combined wave with a predetermined threshold value LT which has been previously set.

Figure 7A:
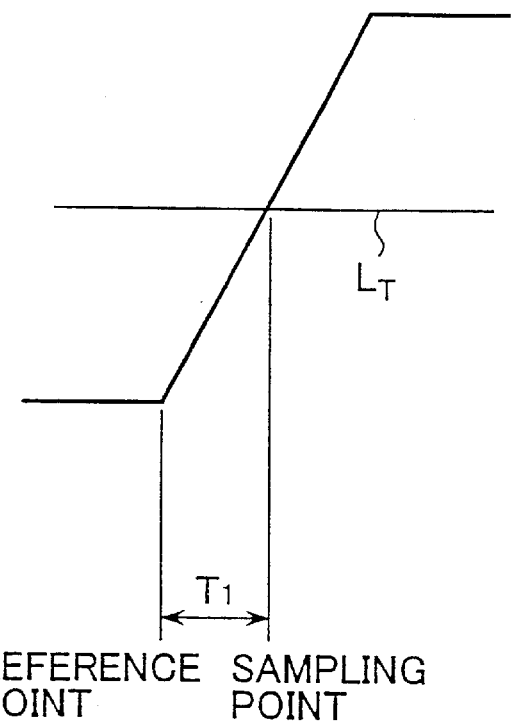
FIGS. 7A and 7B shows waveform charts for explaining the operation of the sampling pulse generator 111 in FIG. 3.
Figure 7B:
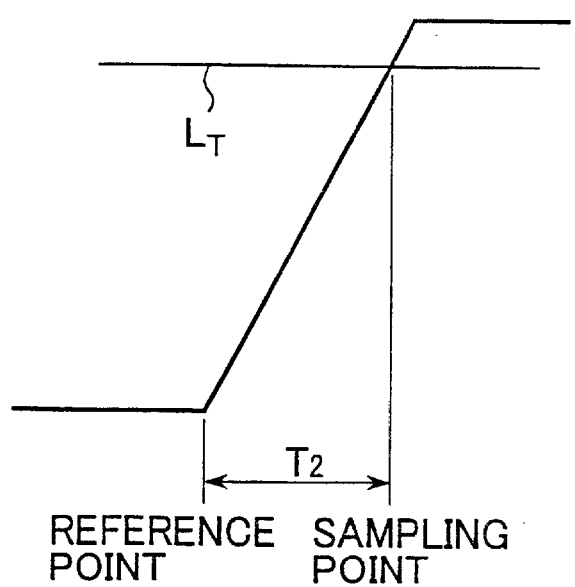

FIG. 7 shows an edge of the combined wave shown in FIG. 6(C) in an enlarged view. Specifically, the edge of the 2-MHz clock, when combined with the clock at frequency of 40 Hz, has a predetermined slope. As a result, near the starting point of the saw-tooth wave, assuming that a rising point of the rising edge of the clock at frequency of 2 MHz is defined as a reference point, and a time required for the level of the edge to reach the threshold value LT is T1, as shown in FIG. 7(A), a time T2 from the reference point to the sampling point is longer than the time T1 shown in FIG. 7(A) near the end point of the saw-tooth wave, as shown in FIG. 7(B). Therefore, in a region between the starting point and the end point of the saw-tooth wave, a sampling point is found in a period between the time T1 and the time T2. The sampling pulse generator 111 generates a sampling pulse at timing of this sampling point, and outputs the sampling pulse to the sampling unit 112. The sampling unit 112 samples the reflected wave in synchronism with this sampling pulse, and outputs a sampling value to the reception unit 123.

Figure 8:
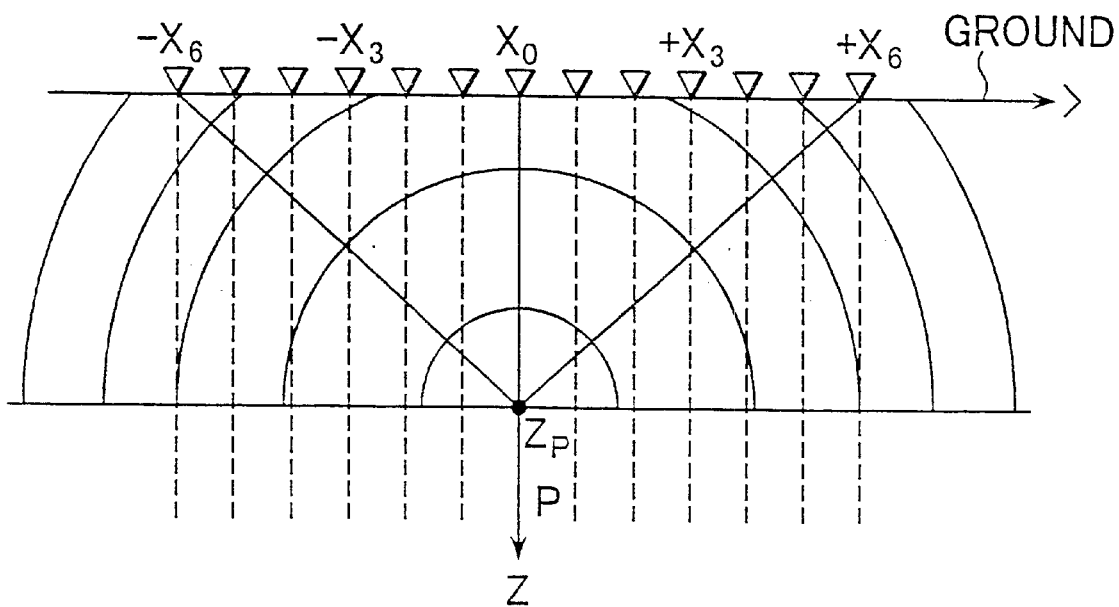
FIG. 8 is a diagram for explaining reflection of an electromagnetic wave.

Next, explanation will be given of the principles of detecting the depth of an object buried in the ground from the ground by transmitting an impulse electromagnetic wave to the ground and receiving its reflected wave from the object. Assume herein that an x-axis is defined on the ground, and a z-axis is defined in the direction perpendicular to the ground, as shown in FIG. 8. Assume that an object P is buried at a position z=zp on the z-axis. As an impulse electromagnetic wave is transmitted from the transmitter 51 in the direction perpendicular to the ground, the electromagnetic wave diffuses within a certain range, and propagates into the ground. When no object exists in the ground, the reflected wave of the electromagnetic wave will not substantially come back (it should be noted that while a reflected wave from the ground is actually strongest, the reflected wave from the ground is ignored since it can be readily identified from a reflected wave from an object in the ground and a period of time until the reflected wave is received).

For example, assuming that the electromagnetic impulse is transmitted at a coordinate position −x6 on the x-axis in FIG. 8, and a reflected wave is received by the receiver 52 at this position for convenience of explanation, the electromagnetic impulse propagates within the ground from the position −x6 until it encounters an object P, reflected by the object P, and returns again to the position −x6. Therefore, at the position −x6, a time difference (propagation time) between the observed transmitted wave and the reflected wave is proportional to the value twice the distance from the position −x6 to the object P. Similarly, assuming that the position at which the electromagnetic wave is transmitted and received (sensor head 12) is moved, and the electromagnetic wave is transmitted at a position x0 on the x-axis and its reflected wave is received there, a propagation time in this event is proportional to the value twice the distance from the position x0 to the object P.

Further, when an electric wave is transmitted and received at a position +x6, the propagation time is proportional to the value twice the distance from the position +x6 to the object P.

Figure 9:
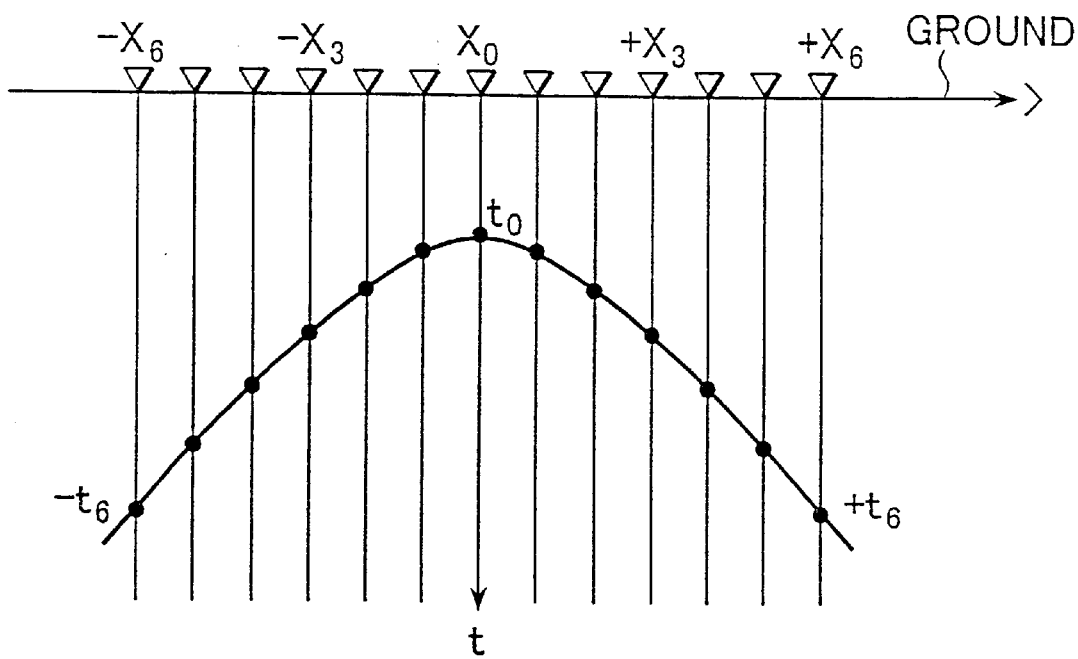
FIG. 9 is a diagram for explaining a propagation time of a reflected wave of an electromagnetic wave.

Thus, when the time from the transmission of the electromagnetic wave to the reception of the reflected wave at each of the positions from −x6 to +x6 is represented along a time axis t defined in a direction perpendicular to the x-axis as shown in FIG. 9, a propagation time t0 at the position x0 is the shortest, while a propagation time −t6 at the position −x6 and a propagation time +t6 at the position +x6 are the longest, so that its characteristic can be represented by a hyperbolic curve.

Figure 10:
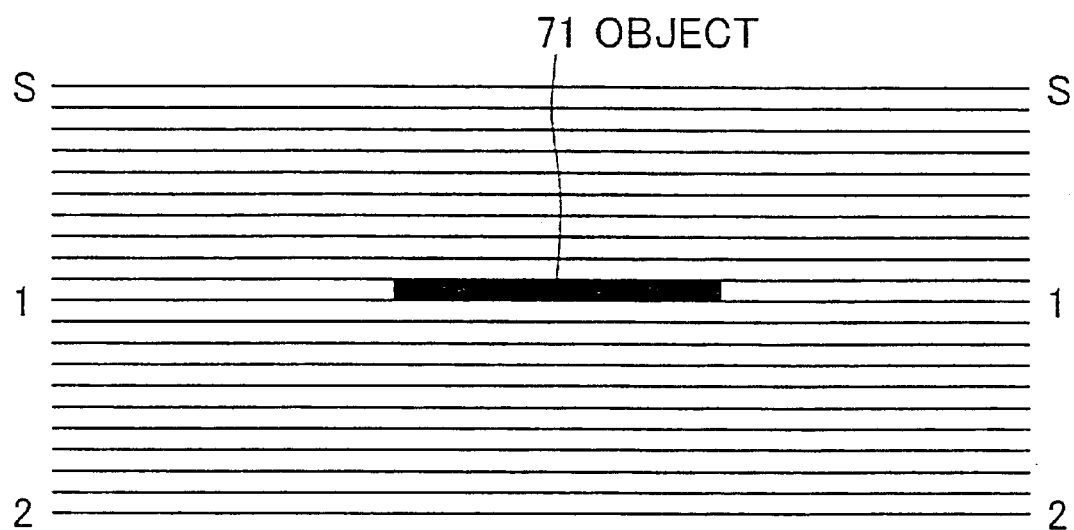
FIG. 10 is a diagram for explaining a state in which an object is buried in the ground.
Figure 11:
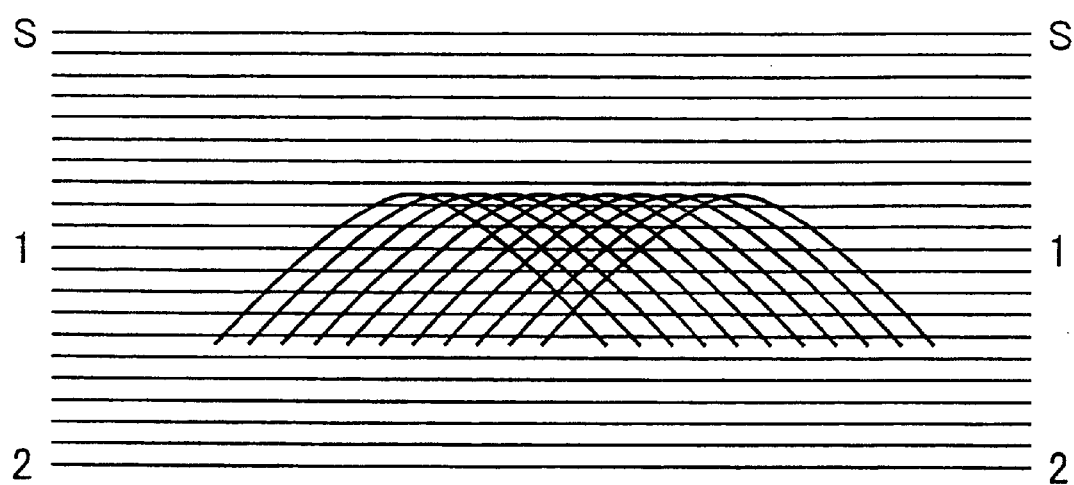
FIG. 11 is a diagram showing a propagation speed of a reflected wave reflected from the object in FIG. 10.

For example, when an object 71 is buried at a predetermined depth from the ground as illustrated in FIG. 10, an electromagnetic wave is reflected from every part of the object 71, so that received waves having a hyperbolic characteristic are generally observed as illustrated in FIG. 11. It is therefore possible to detect the position of the object 71 in the depth direction by calculating a peak value of a hyperbolic curve.

Figure 12:
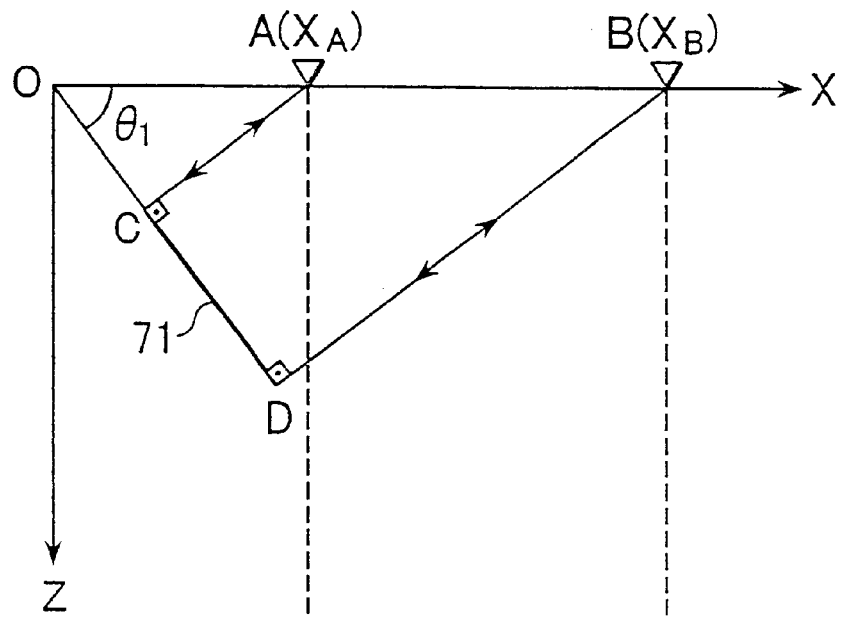
FIG. 12 is a diagram for explaining migration.

It should be noted that an object is not always placed horizontally in the ground. For example, as illustrated in FIG. 12, assume that an object 71 is buried at an angle θ1 with respect to the ground. Assume also that in FIG. 12, the leftmost position at which an electromagnetic wave has been transmitted to the ground and a reflected wave can be received is a position A, and the rightmost position is a position B. In this event, a reflected wave from a leftmost end C of the object 71 is received at the position A, while a reflected wave from a rightmost end D of the object 71 is received at the position B.

Figure 13:
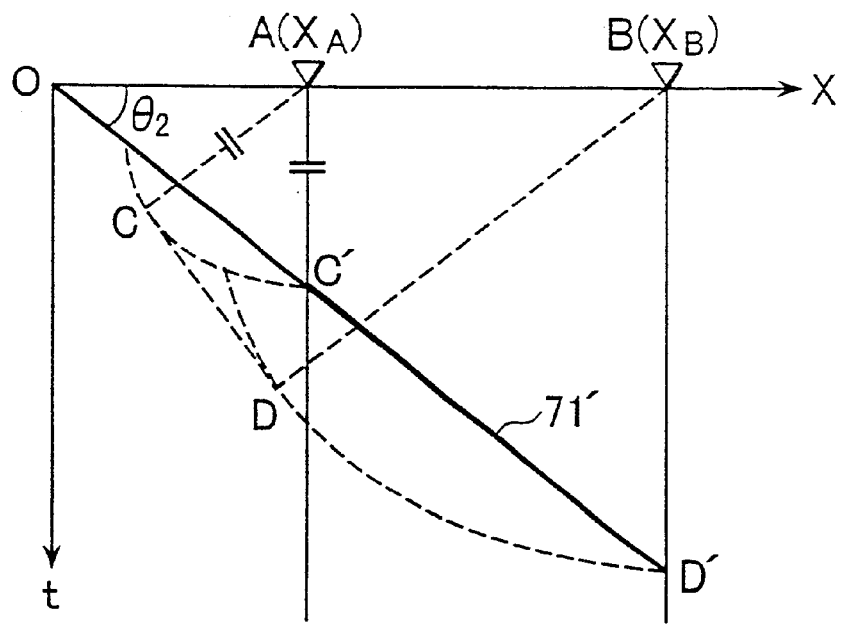
FIG. 13 is a diagram for explaining the migration.

FIG. 13 shows a time of the reflected wave from the object 71 in FIG. 12 together with the coordinate along the x-axis. Specifically, since reflected waves can be received between the position A and the position B, the object 71 is observed as if an object 71' exists between a point C' away from the position A by a time corresponding to the distance from the position A and the end C and a point D' away from the position B by a time corresponding to the distance from the position B to the end D. The angle of the object 71' with respect to the ground or the x-coordinate axis is θ2.

As described above, while data acquired through the observation are as shown in FIG. 13, the object is actually positioned as shown in FIG. 12. It is therefore necessary to perform processing for moving the object 71' detected by the measurement as shown in FIG. 13 to the object 71 actually positioned in the ground as shown in FIG. 12 (migration). It is the migration unit 25 that performs this processing.

This migration is performed in accordance with three principles as follows:

(1) A buried angle θ is larger on the z-coordinate axis (θ1 in FIG. 12) than in the time axis coordinate system (θ2 in FIG. 13).

(2) The length of an object is shorter on the z-coordinate axis (in FIG. 12) than on the time axis (in FIG. 13).

(3) A movement is done in a direction approaching the ground (in a direction in which the depth becomes smaller).

Specifically, when an object 71' on the x-axis and the t-coordinate is moved in the coordinate space to capture an object 71'', a point E' on the object 71' is positioned at a point E'' on the object 71''. Assuming the distance from the point E' to the point E'' on the x-coordinate axis is dx, the distance on the t-coordinate axis (time) is dt, a buried angle of the object 71' is θ2, and a buried angle of the object 71'' is θ3, the following equations are established:

$$dx = (v^2 \cdot t \cdot \tan\theta2)/4 \quad (1)$$

$$dt = t\{1-[1-(v^2 \tan^2\theta2)/4]^{1/2}\} \quad (2)$$

$$\tan\theta3 = \tan\theta2/[1-(v^2 \tan^2\theta2)/4]^{1/2} \quad (3)$$

Thus, the migration can be performed based on these equations.

Note that v represents a propagation velocity of the electromagnetic wave within the ground, and t represents a propagation time.

The propagation velocity v is represented by the following equation:

$$v = 2z0/t$$

where z0 represents a depth at which an object is buried. Also, the propagation velocity v is represented by the following equation, assuming that the dielectric coefficient in the ground (specific dielectric coefficient) is εr:

$$v = C/\sqrt{\epsilon r} \quad (4)$$

where C represents the light velocity.

Therefore, the following equation is derived from these equations:

$$z0 = C\epsilon t/2\sqrt{\epsilon r} \quad (5)$$

For the dielectric coefficient in the ground, when the ground is comprised of a plurality of layers each having a thickness di and a dielectric coefficient εi, a combined dielectric coefficient is represented by the following equation:

$$\sqrt{\epsilon r} = (1/d)(d1\sqrt{\epsilon1} + d\,d2 + \ldots + dn\sqrt{\epsilon n}) \quad (6)$$

$$d = d1 + d2 + \ldots + dn \quad (7)$$

Next, the operation of the inspection apparatus illustrated in FIGS. 1 and 2 will be explained with reference to flow charts of FIGS. 15 and 16. It should be noted that this processing is started after completing the confirmation as to the presence or absence of wire traps, and grass cutting, as is the case in the prior art. First, at step S1, calibration processing is executed. As described above, it is necessary to know an accurate value of the propagation velocity v of the electromagnetic wave in the ground for accurately detecting the depth at which an object exists in the ground. The propagation velocity v varies depending on the dielectric coefficient εr. Therefore, after all, it is necessary to know the value of the actual dielectric coefficient εr in the ground which is to be inspected for accurately detecting the depth at which an object exists in the ground. If the correct value of the dielectric coefficient εr were not found, a land mine would be detected at an incorrect depth position, thereby compromising the safety. Therefore, the actual dielectric coefficient εr in the ground is set through the calibration processing. Details on the processing will be described later with reference to a flow chart of FIG. 34.

Next, at step S2, the operator executes mode selection processing. Specifically, the operator manipulates the input unit 21 to selectively instruct either of a scan mode and a display mode. Further, when selecting the display mode, the operator selectively instructs a three-dimensional object image display mode or a horizontal plane display mode. The controller 22 controls the GUI controller 30 to generate an image required for this selection, and display the image on the display 3 through the display controller 29. The operator selectively enters a predetermined mode corresponding to GUI displayed on the display 3. This selection may be made, for example, by selectively entering a predetermined numeral.

Figure 17:
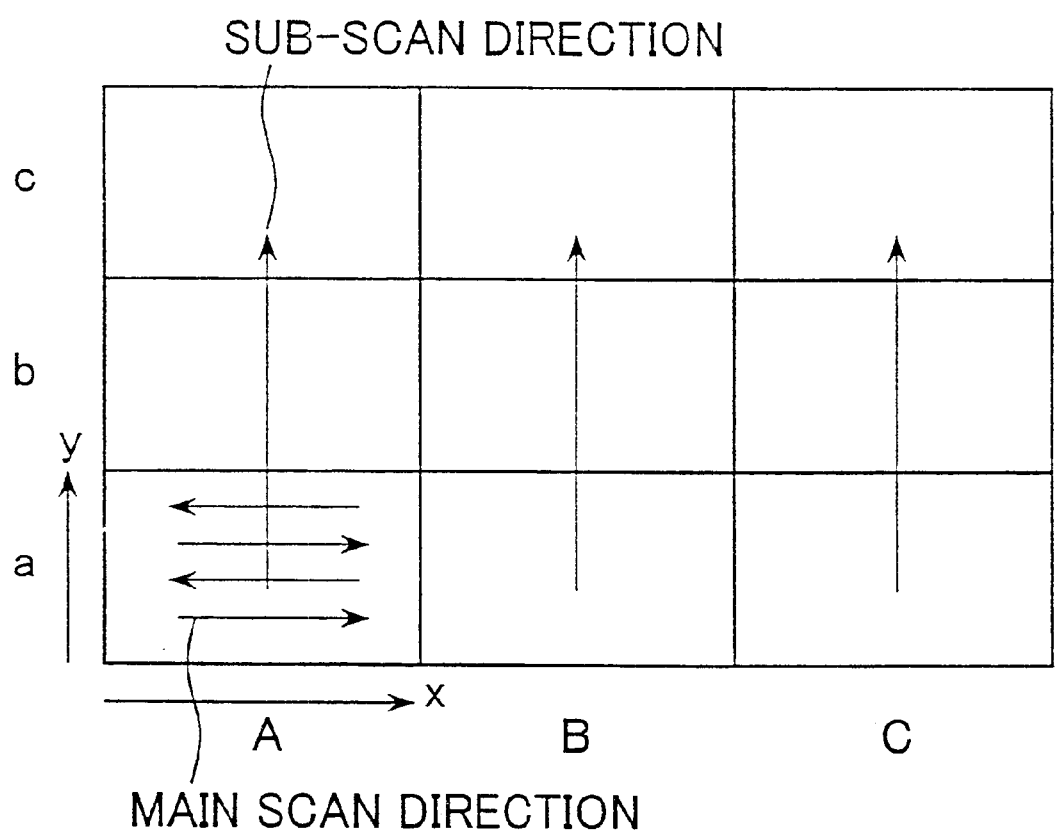
FIG. 17 is a diagram for explaining a scanning range.

At step S3, the controller 22 determines whether or not a mode selected at step S2 is the scan mode. When determining the scan mode, the processing proceeds to step S4, wherein the OSD controller 31 is controlled to display a message prompting the start of a scan manipulation on the display 3 through the display controller 29. The operator, in response to this message, scans the sensor head 12 in the x-axis direction (a main scan direction) (for example, in the right direction) as shown in FIG. 17. When the sensor head 12 reaches the end in the main scan direction, the sensor head 12 is advanced by one pitch in the y-axis direction (sub-scan direction), and is again scanned in the sub-scan direction (in the left direction). In this way, a range, for example, over A columns x a rows is scanned by the sensor head 12, as shown in FIG. 17.

Next, at step S5, image processing is executed. Specifically, as described above, the transmitter 51, which is controlled by the controller 22 through the controller 54, generates an impulse electromagnetic wave at a predetermined timing, and the receiver 52 receives a reflected wave of the electromagnetic wave from within the ground. The receiver 52, upon receipt of the reflected wave, A/D converts the timing and a signal corresponding to a received level and outputs them to the controller 54. The controller 54 calculates a difference between the time at which the transmitter 51 had transmitted the electromagnetic wave and the time at which the receiver 52 received the reflected wave (propagation time), and outputs the difference, together with the sampling data of the received wave, to the migration unit 25.

It should be noted that the transmitter 51 and the receiver 52 are located substantially at the same position. The sensor head 12 is moved in the xy-plane during the scanning operation, so that while the xy-coordinates at which the transmitter 51 had transmitted are different from the xy-coordinates at which the receiver 52 received the reflected wave in a more exact sense, the change in the position can be substantially ignored provided that a period in which the transmitter 51 transmits the electromagnetic wave and the receiver 52 receives a reflected light thereof is sufficiently short as compared with a scanning velocity of the sensor head 12. If the change cannot be ignored, the position may be corrected by the difference.

The position detector 23 detects the position of the sensor head 12 on the xy-coordinate axes relative to the predetermined reference position of the body 1, and outputs the result of the detection to the position calculating unit 24. The position calculating unit 24 processes the output of the position detector 23, and calculates the position of the sensor head 12 on the xy-coordinates with the origin defined at the reference position of the body 1. The position of the sensor head 12 is input to the migration unit 25.

The migration unit 25 performs the migration processing on the aforementioned data including the propagation time to convert the data to data substantially in the depth direction (data on the z-coordinate). The migration unit 25 combines the z-coordinate with the coordinates (x,y) input from the position calculating unit 24, and outputs it to the image processing unit 27 as data on three-dimensional coordinates (x, y, z).

The image processing unit 27 integrates the three-dimensional coordinate data supplied from the migration unit 25 as appropriate to generate three-dimensional image data representative of a state in the ground. The generated image data is stored in the storage unit 33 through the controller 22.

At step S6, the controller 22 executes scan range display processing. Specifically, as the controller 22 receives the supplied position data on the sensor head 12 output by the position calculating unit 24, the controller 22 instructs the OSD controller 31 to generate an image corresponding to the scan range and display the image on the display 3 through the display controller 29.

Figure 18A:
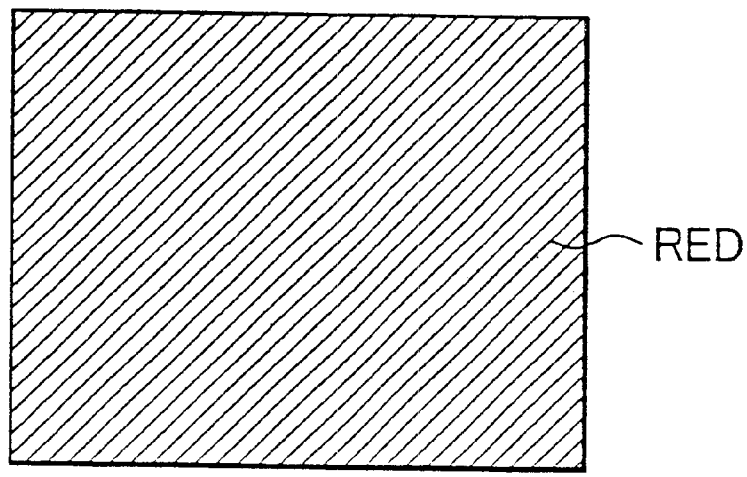
FIGS. 18A, 18B, and 18C are diagrams illustrating exemplary displays of a scanning range.
Figure 18B:
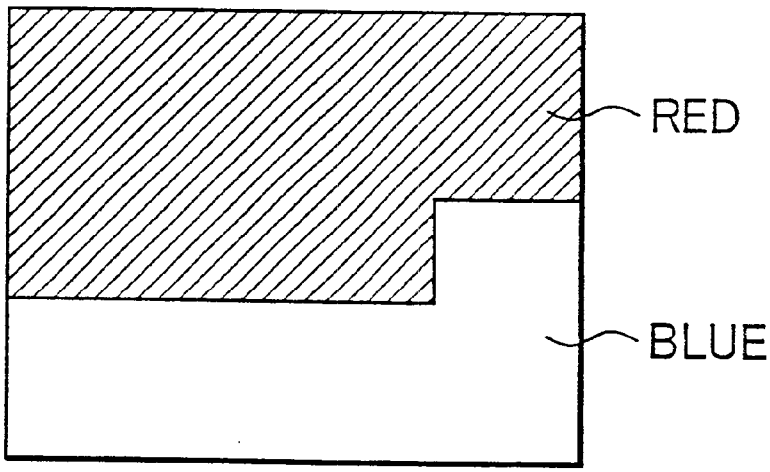
Figure 18C:
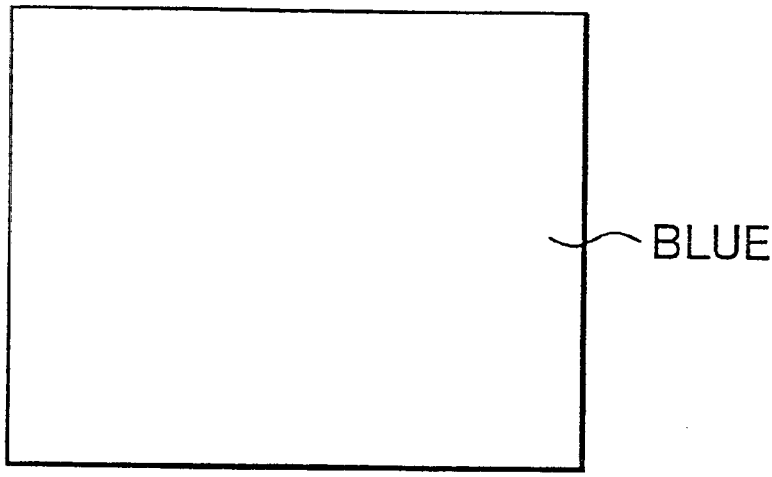

Before starting the scanning, an entire display region corresponding to the scan range (the range over A columns and a rows in FIG. 17) is displayed in red on the display 3, for example, as illustrated in FIG. 18(A). This indicates that the scan range has not at all scanned and therefore is in a dangerous state. On the other hand, as the sensor head 12 is scanned within the scan range, a scanned region is displayed in blue (safety color), as illustrated in FIG. 18(B). This allows the operator to confirm where in the scan range the sensor head 12 has been scanned by now. As a result, if the sensor head 12 is moved over one pitch or more in the main scanning direction to leave some range unscanned, this range is displayed in red, so that omission of the scanning can be prevented. Then, when the entire range has been properly scanned, the entire scan range is displayed in blue as illustrated in FIG. 18(C). In this way, the user can recognize that the range to be scanned has been scanned without omission.

Next, the processing proceeds to step S7, where the operator determines whether or not the entire range has been scanned, viewing the display (an image as illustrated in FIG. 18 is being displayed) on the display 3. If some range still remains unscanned, the processing returns to step S4 to repetitively execute the processing subsequent thereto.

When the operator determines at step S7 that the entire range to be scanned has been scanned, the processing proceeds to step S8, where the operator determines whether or not the inspection processing is terminated. The processing returns to step S2 if the inspection processing is not terminated to repetitively execute the processing subsequent thereto. When the operation is terminated, the operator manipulates the input unit 21 to instruct the termination of the inspection. At this time, the controller 22 terminates the inspection processing.

When the controller 22 determines at step S3 that the operator does not select the scan mode, the processing proceeds to step S9, where the controller 22 determines whether or not the selected mode is a three-dimensional object image display mode. When the controller 22 determines that the selected mode is not the three-dimensional object image display mode, the processing proceeds to step S10, where the controller 22 executes horizontal plane display processing.

Specifically, in this event, the controller 22 controls the image processing unit 27 to generate image data of a horizontal cross section (a plane parallel with the scanned ground) at a predetermined depth, which has been previously set, from image data stored in the storage unit 33. The image data generated by the image processing unit 27 is output to the coordinate converter 28 and converted to two-dimensional coordinate data for display on the display 3. The image data of a two-dimensional plane output from the coordinate converter 28 is output to and displayed on the display 3 through the display controller 29.

Further, at step S11, the controller 22 controls the OSD controller 31 to generate data of a cursor and display the cursor on the display 3 through the display controller 29. In this event, the controller 22 monitors the output of the position calculating unit 24 to display the cursor at a position corresponding to the position of the head sensor 12 at that time. Also, the controller 22 controls the GUI controller 30 to generate image data representative of the depth of the image data presently displayed on the display 3 and display the image data on the display 3 through the display controller 29.

Figure 19:
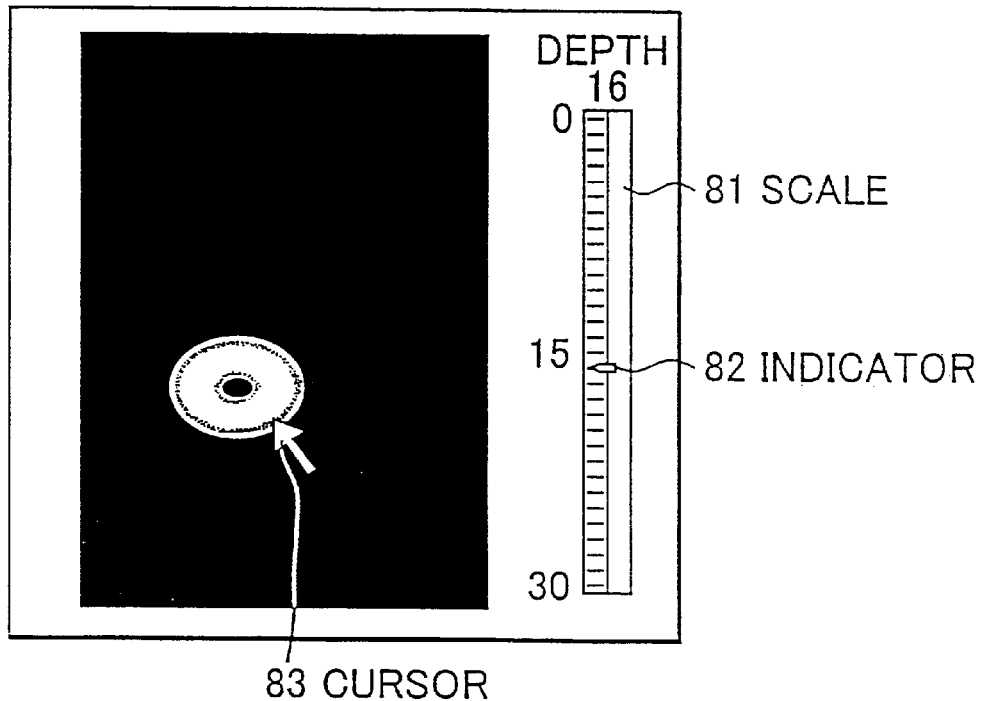
FIG. 19 is a diagram illustrating an exemplary display of a plane cross section.

FIG. 19 represents an exemplary display displayed on the display 3 in the manner as described above. In this example, a cursor 83 generated by the OSD controller 31 is displayed at a position corresponding to a current position of the sensor head 12. Also, the depth of the presently displayed horizontal cross section is displayed by an indicator 82 on a scale 81 generated by the GUI controller 30. Also, the depth information is displayed as a numerical value above the scale 81. The example of FIG. 19 displays that the depth is 16 cm from the ground.

At step S12, the operator determines whether or not it is required to change the depth of the horizontal cross section displayed on the display 3. When a change is required, the processing proceeds to step S13, where the operator manipulates the input unit 21 to enter a parameter associated with a depth to be displayed. The parameter may be entered, for example, by entering a numerical value from a keyboard, or dragging the indicator 82 with a mouse to move the indicator 82 to a predetermined position on the scale 81.

When a new depth is entered at step S13, the processing returns to step S10, where the controller 22 outputs the specified depth information to the image processing unit 27, causing the same to generate horizontal cross section image data at that depth. The image processing unit 27, in response to this request, calls image data required to generate a horizontal cross section image at the specified depth from the storage unit 33, processes, and displays the image on the display 3. In this respect, further explanation will be given later with reference to FIGS. 25 to 28.

When the operator determines at step S12 that the depth need not be changed, when the operator determines at step S14 that the scaling factor need not either be changed, and when the operator determines at step S16 that marking is not either required (details on these processing will be described later), the operator determines at step S18 whether or not the horizontal plane display mode is terminated. When the horizontal plane display mode need not be terminated, the processing again returns to step S10 to repetitively execute the processing subsequent thereto.

Figure 20:
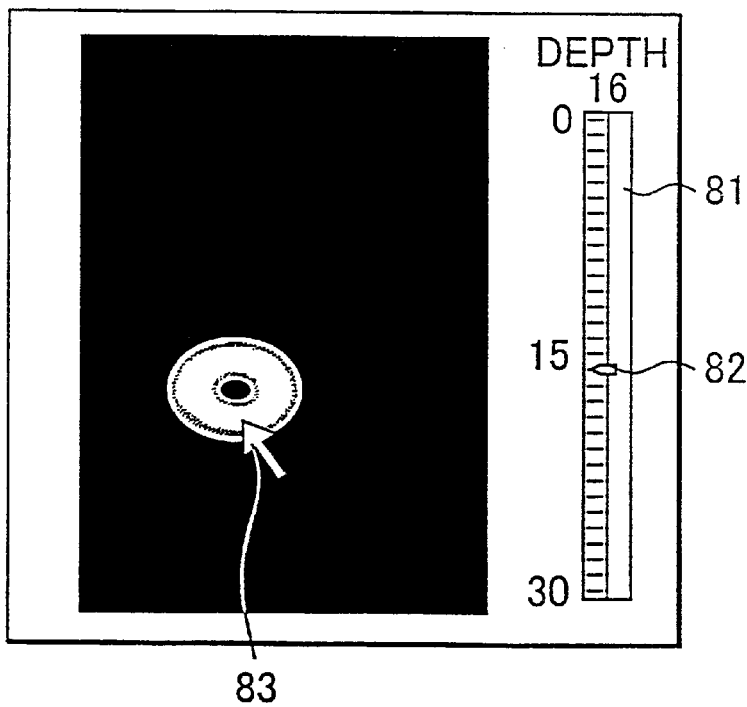
FIG. 20 is a diagram illustrating an exemplary display of a plane cross section.
Figure 21:
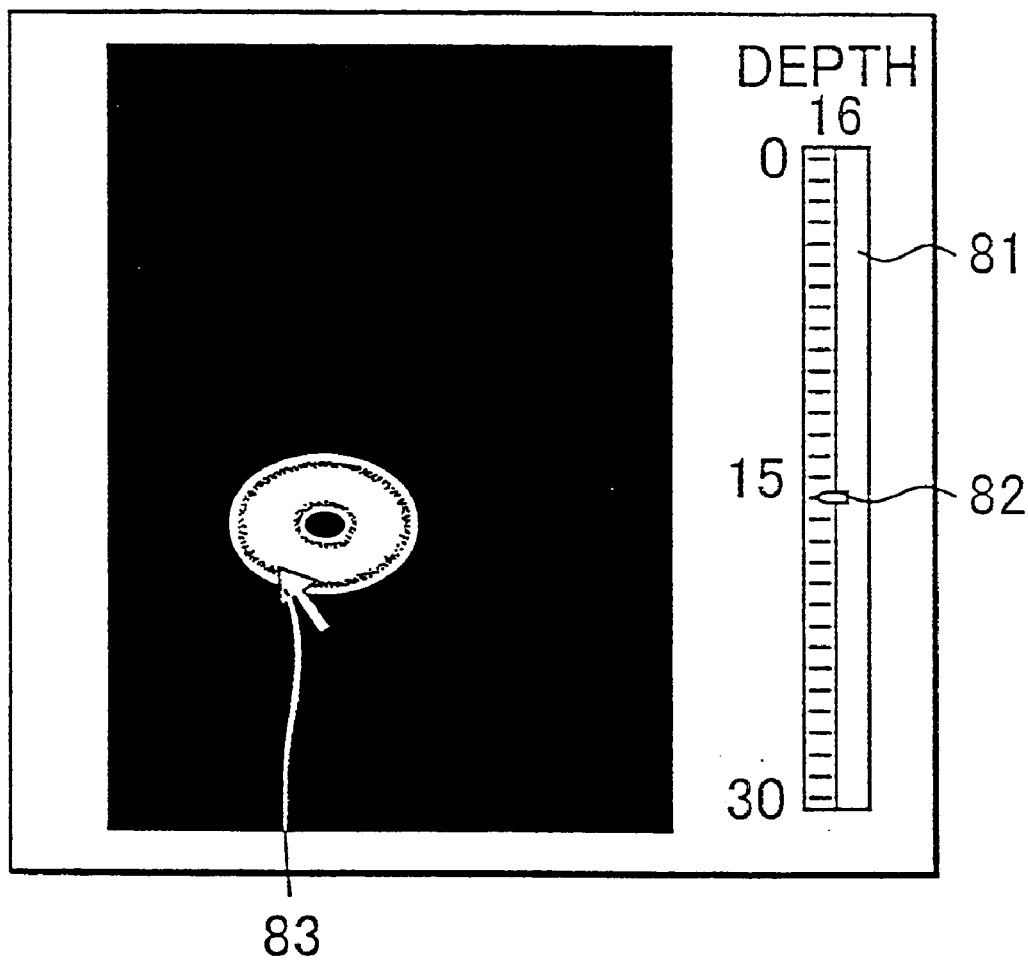
FIG. 21 is a diagram illustrating an exemplary display of a plane cross section.

As a result, when the operator moves the sensor head 12 to an arbitrary position within the horizontal plane in the scan range, the position of the cursor 83 is moved and displayed corresponding to the position in the horizontal plane, as illustrated in FIGS. 20 and 21. Thus, the operator can confirm a position at which a land mine is buried by moving the head sensor 12 to an arbitrary position (by moving the cursor 83 to a position at which an image appearing to be a land mine is being displayed), while viewing the display 3.

Figure 22:
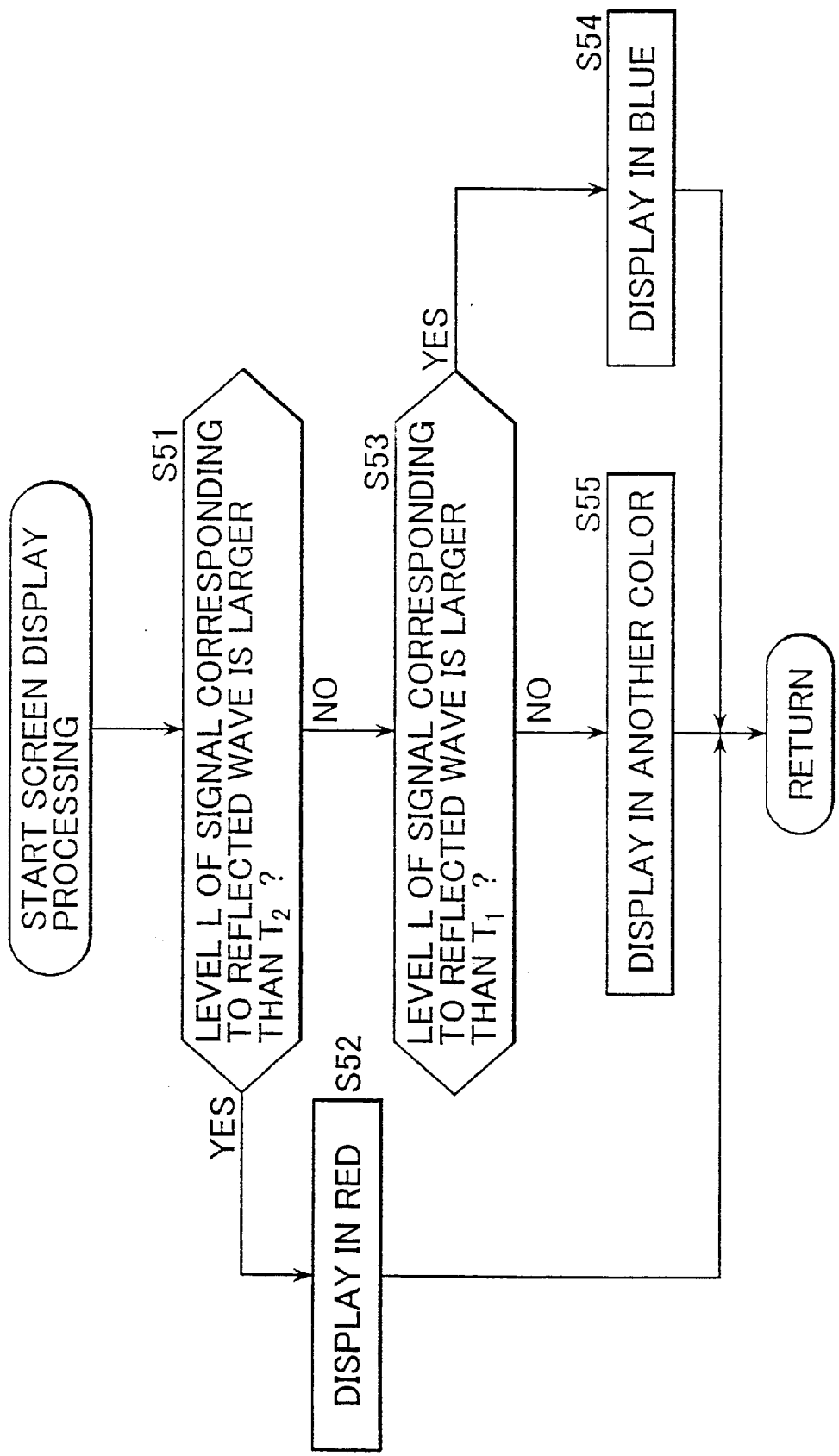
FIG. 22 is a flow chart for explaining plane cross section display processing.

Also, at step S10, the controller 22 executes the processing illustrated in a flow chart of FIG. 22, when the horizontal plane display processing is performed, such that the operator can more definitely identify a land mine or not.

Specifically, at step S51, the controller 22 is first supplied with a signal at level L corresponding to a reception level of a reflected wave output by the controller 54 from the migration unit 25, and determines whether or not the level L is higher than a predetermined threshold value T2 which has been previously set.

Figure 23:
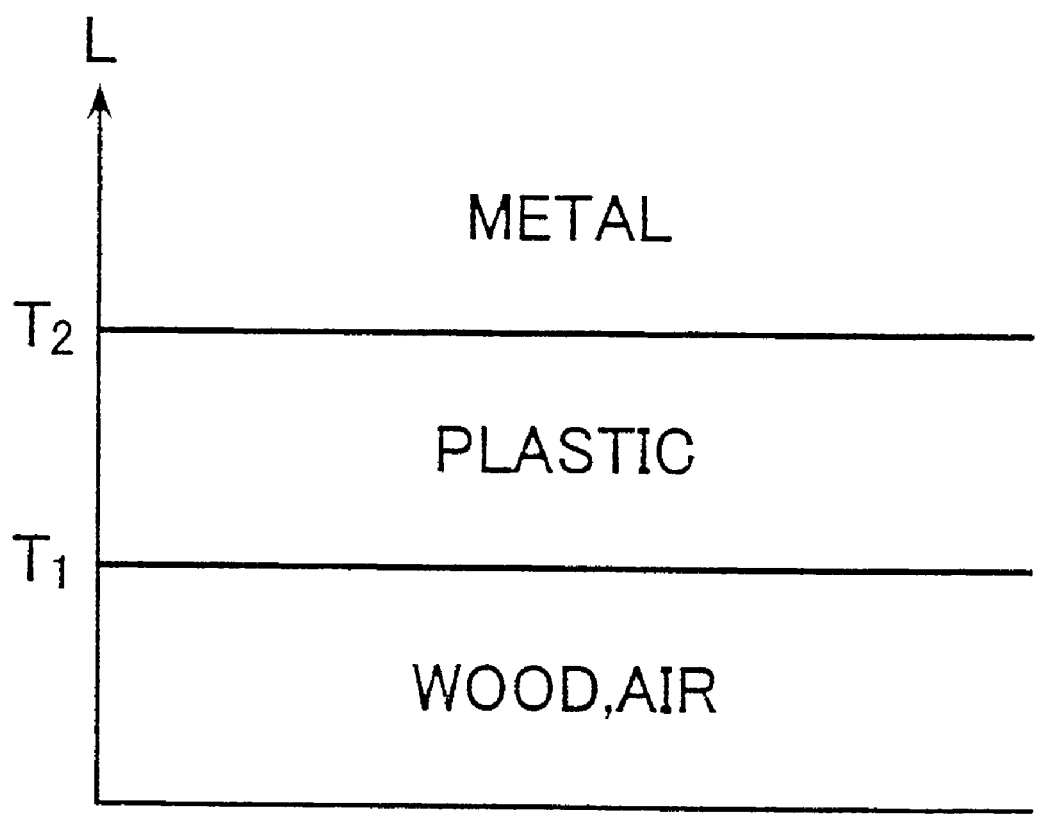
FIG. 23 is a diagram for explaining how to determine a material of an object.

As shown in FIG. 23, the signal level L corresponding to the reception level of the reflected wave is higher than the previously set threshold value T2 when an object reflecting the electromagnetic wave is metal; lower than the threshold value T2 but higher than a threshold value T1 when it is plastic; and lower than the threshold value T1 when it is wood or air. Therefore, when the controller 22 determines at step S51 that the level L is higher than the threshold value T2, the processing proceeds to step S52, where the controller 22 controls the coordinate converter 28 to specify a range in which the level L is higher than the threshold value T2. The display controller 29 displays the range specified by the coordinate converter 28 on the display 3 in red. In this way, a metal is displayed in red.

When the controller 22 determines at step S51 that the level L is not higher than the threshold value T2, the processing proceeds to step S53, where the controller 22 determines whether or not the level L is higher than the threshold value T1. When the controller 22 determines that the level L is higher than the threshold value T1, the processing proceeds to step S54, where the controller 22 controls the coordinate converter 28 to specify the range. The display controller 29 displays the specified range in blue.

When the controller 22 determines at step S53 that the level L is not higher than the threshold value T1, the processing proceeds to step S55, where the coordinate converter 28 specifies the range. The display controller 29 displays the range specified by the coordinate converter 28 in a color other than red and blue.

Thus, the user can determine from the images of the horizontal planes displayed as illustrated in FIGS. 19 to 21 whether the image displayed thereon is metal, plastic or a material other than those, from its color. Land mines are formed of metal or plastic. Therefore, the user can immediately recognize a land mine made of metal or a land mine made of plastic, and objects other than those from the color of the image.

Turning back to FIG. 16, when the operator determines at step S12 that the depth need not be changed, the processing proceeds to step S14, where the operator determines whether or not the scaling factor need be changed. When the operator determines that the scaling factor need be changed, the processing proceeds to step S15, where the operator manipulates the input unit 21 to enter a parameter for specifying a scaling factor. The controller 22, when a change in the scaling factor is instructed, outputs a value corresponding to the specified parameter to the coordinate converter 28. The coordinate converter 28 converts image data supplied from the image processing unit 27 so as to produce an image corresponding to the specified scaling factor. In this way, the image is displayed on the display 3 at a scaling factor corresponding to the specified parameter.

When the operator determines at step S14 that the scaling factor need not be changed, the processing proceeds to step S16, where the operator determines whether or not marking is required. When the operator determines that the marking is required, the processing proceeds to step S17, where the operator manipulates the input unit 21 to instruct the marking.

Specifically, as described with reference to FIGS. 19 to 21, as the sensor head 12 is moved while an image of a horizontal cross section is being displayed, the cursor 83 moves corresponding to the position of the sensor head 12 on the xy-coordinates. When the operator has moved the cursor 83 immediately before the position at which an image appearing to be a land mine is being displayed, the operator manipulates the input unit 21 to instruct the marking. The controller 22, when this marking is instructed, controls the controller 54 to discharge a paint from the marking unit 53. In this way, a predetermined position on the ground (at a position at which a land mine is seemingly buried) is colored with the paint. Subsequently, the operator retracts the sensor head 12 or the body 1 as required to a predetermined position, and can dig up a land mine with a stick from the painted position.

Whether a land mine or not can be determined with a considerable probability from the color and the shape or the size of the displayed image. It is therefore possible to promptly and reliably detect a land mine.

Figure 24A:
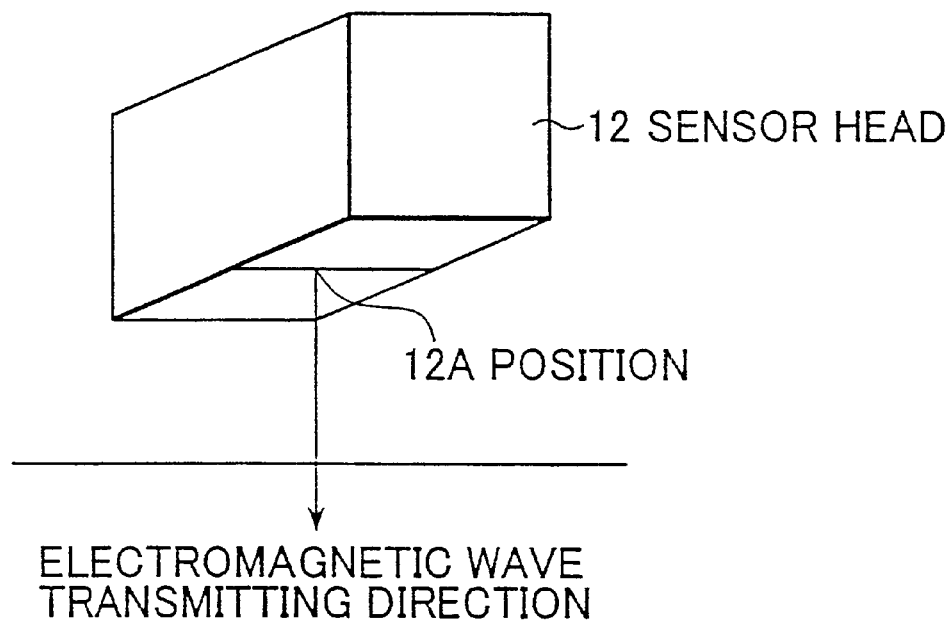
FIGS. 24A and 24B are diagrams for explaining a central position of the sensor head 12 in FIG. 2.
Figure 24B:
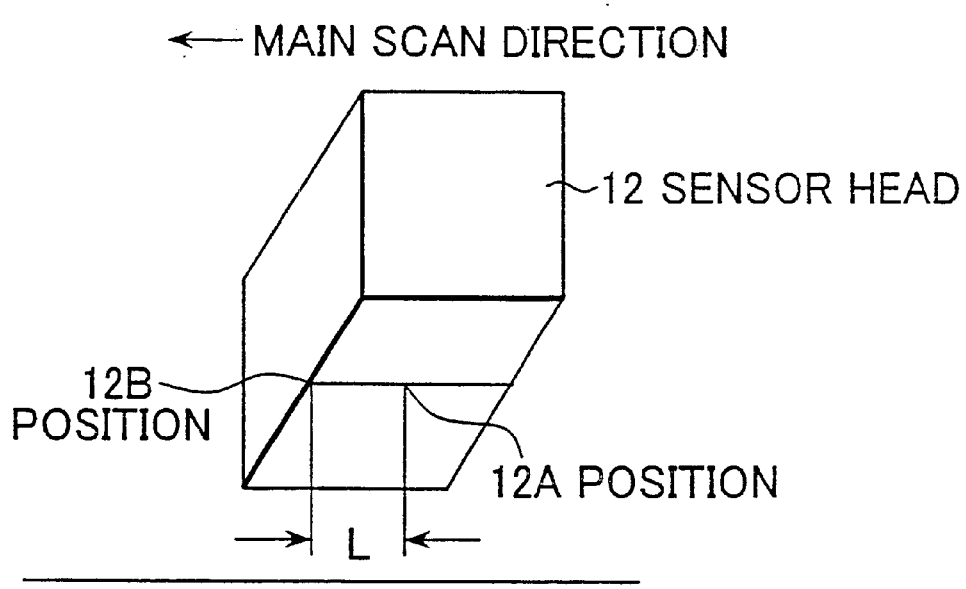

As illustrated in FIG. 24(A), the transmission antenna 102 and the reception antenna 113 illustrated in FIG. 3 are attached at a position 12A substantially at the center of the base of the sensor head 12. Since the sensor head 12 has a predetermined size, it is difficult for the operator to precisely know the position on the ground opposite to the position 12A of the sensor head 12 when the ground is being scanned by the sensor head 12. Therefore, as illustrated in FIG. 24(B), the cursor 83 may be displayed at a position corresponding to a position 12B at a leading end in the main scan direction at the position 12A of the sensor head 12. In other words, in this case, the position of the sensor head 12 during the operation at step S4 in FIG. 15 is indicated by the position 12A, while the position of the sensor head 12 when the cursor 83 is superimposed on a display at step S11 in FIG. 16 is indicated by the position 12B. By disposing a discharge unit (not shown) for discharging a paint during the marking processing at step S17 also at the position 12B, the operator can visually confirm the position at which the paint has been discharged, without being hidden by the sensor head 12. This improves the operability.

When the operator determines at step S16 that the marking is not required, the processing proceeds to step S18, where the operator determines whether or not the horizontal plane display processing is terminated. When the horizontal plane display processing need not be terminated, the processing returns to step S10 to repetitively execute the processing subsequent thereto.

Figure 25:
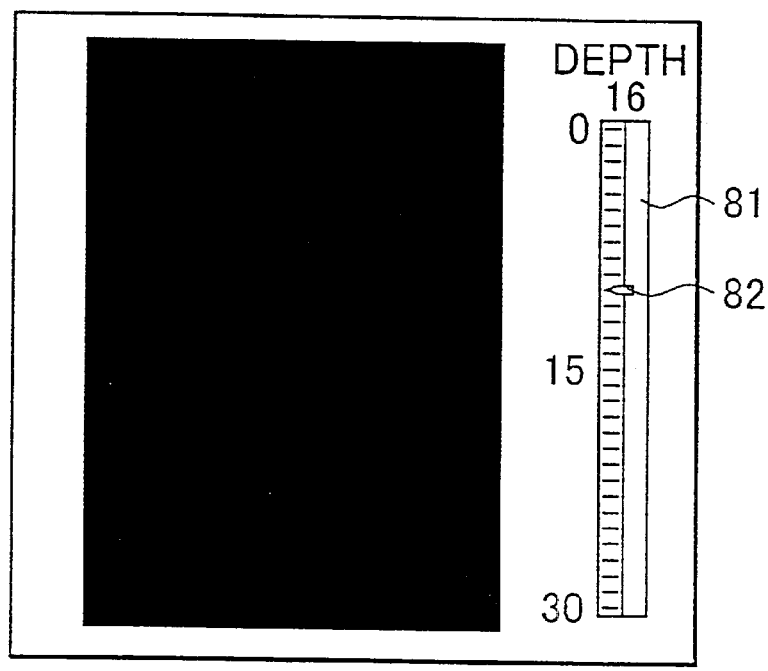
FIG. 25 is a diagram illustrating an exemplary display of a plane cross section.
Figure 26:
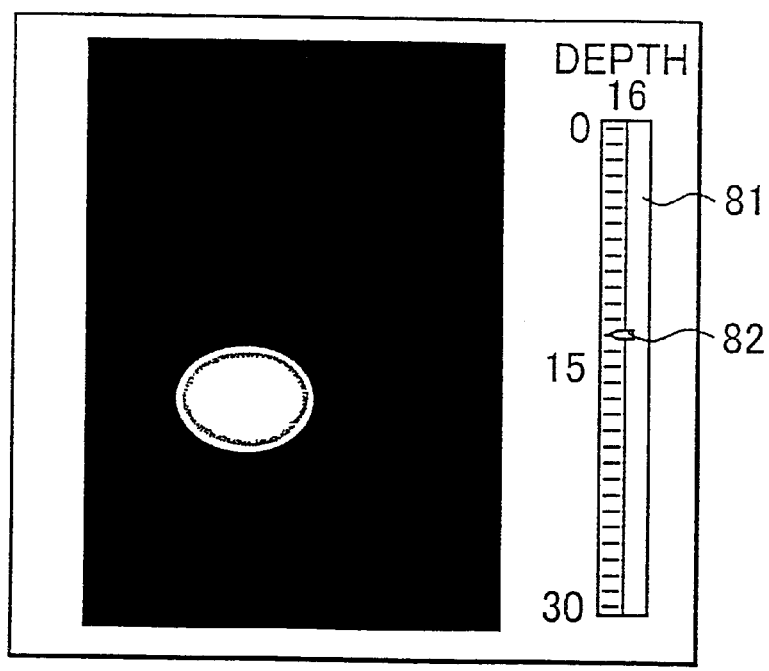
FIG. 26 is a diagram illustrating an exemplary display of a plane cross section.
Figure 27:
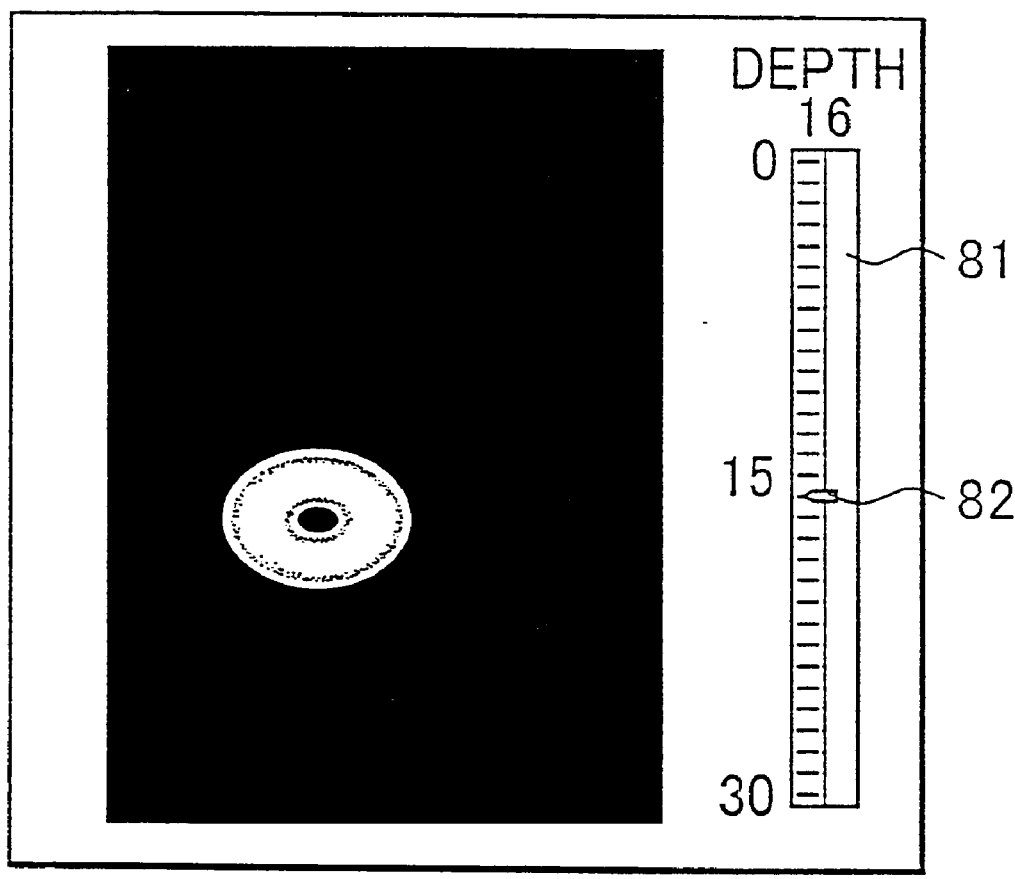
FIG. 27 is a diagram illustrating an exemplary display of a plane cross section.

It should be noted that the cursor 83 is not displayed on the display 3 when the sensor head 12 is being positioned out of the scan range. FIGS. 25 to 27 represent exemplary displays when a depth parameter is changed in such a state. FIG. 25 represents an exemplary image displayed when 10 cm is specified as the depth; FIG. 26 represents an exemplary image displayed when 13 cm is specified as the depth; and FIG. 27 represents an exemplary image displayed when 16 cm is specified as the depth. The operator can definitely know that a land mine is buried at a position how many centimeters from the ground by thus changing the depth as appropriate.

Figure 28:
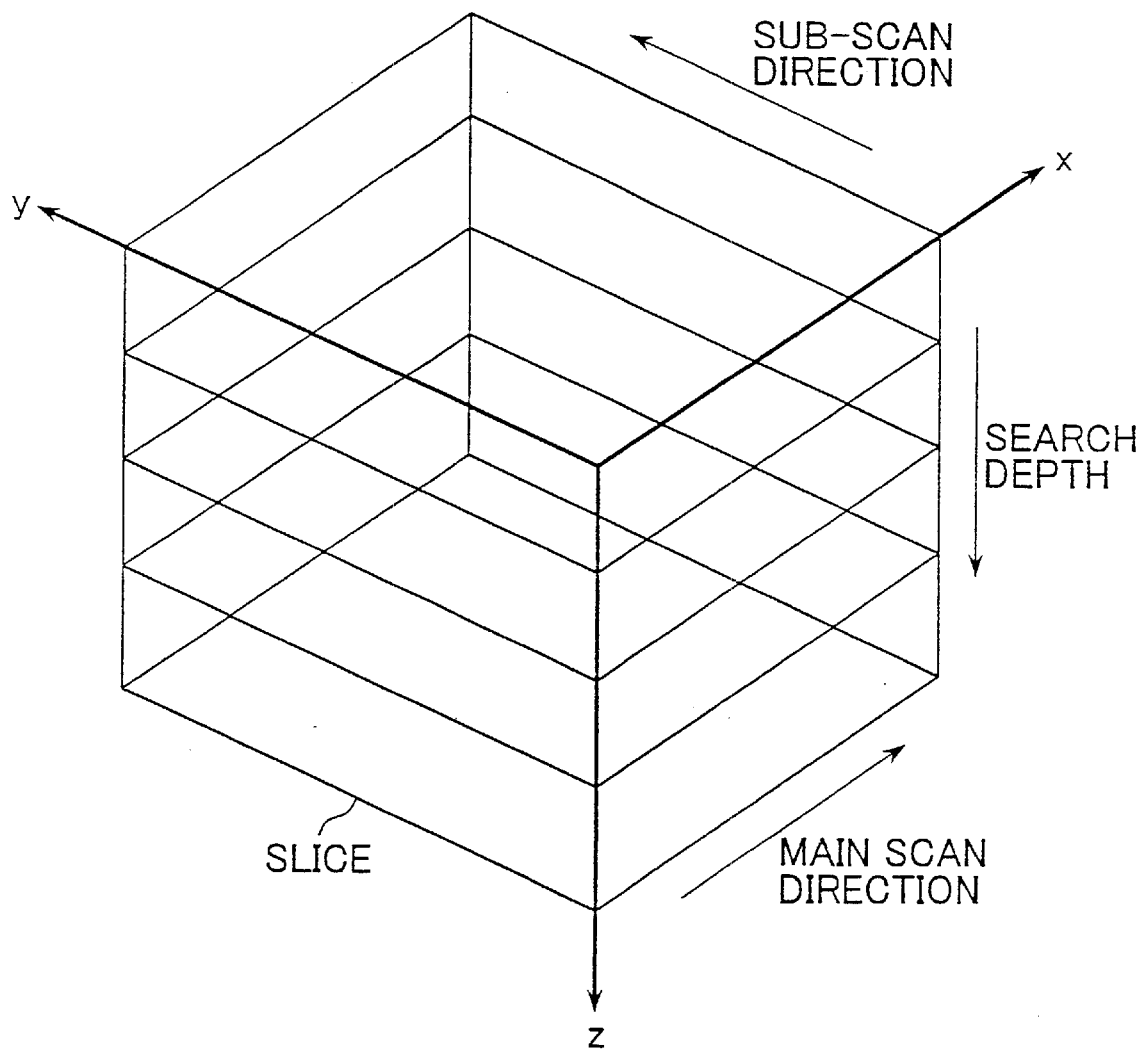
FIG. 28 is a diagram illustrating a three-dimensional inspection range.

Specifically, the operator can slice an image of a horizontal cross section at a predetermined depth in a horizontal plane defined by a predetermined range in the main scan direction and a predetermined range in the sub-scan direction to display the image on the display 3, as illustrated in FIG. 28.

Figure 16:
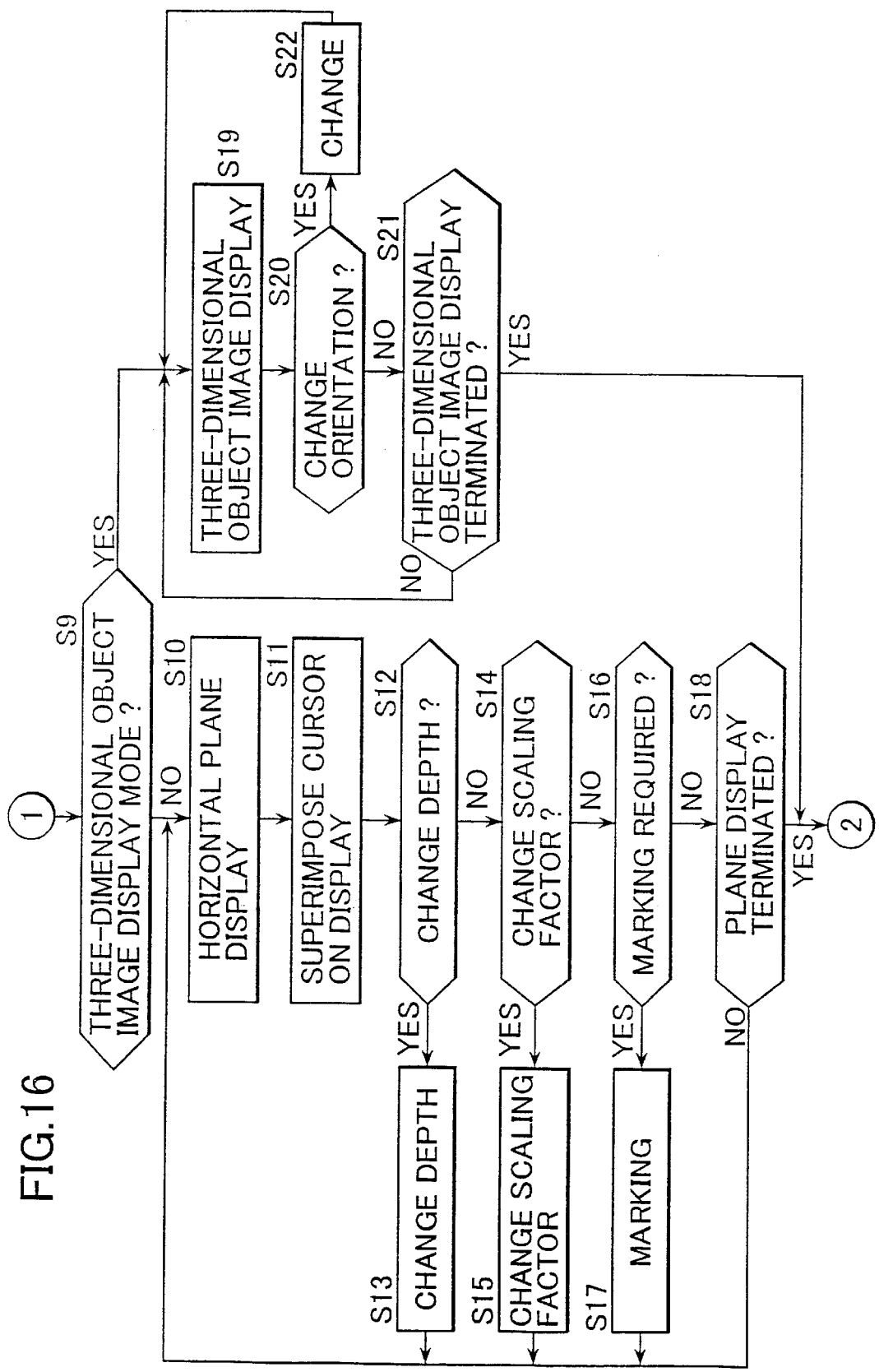
FIG. 16 is a flow chart for explaining the operation of the inspection apparatus illustrated in FIGS. 1 and 2.
Figure 29:
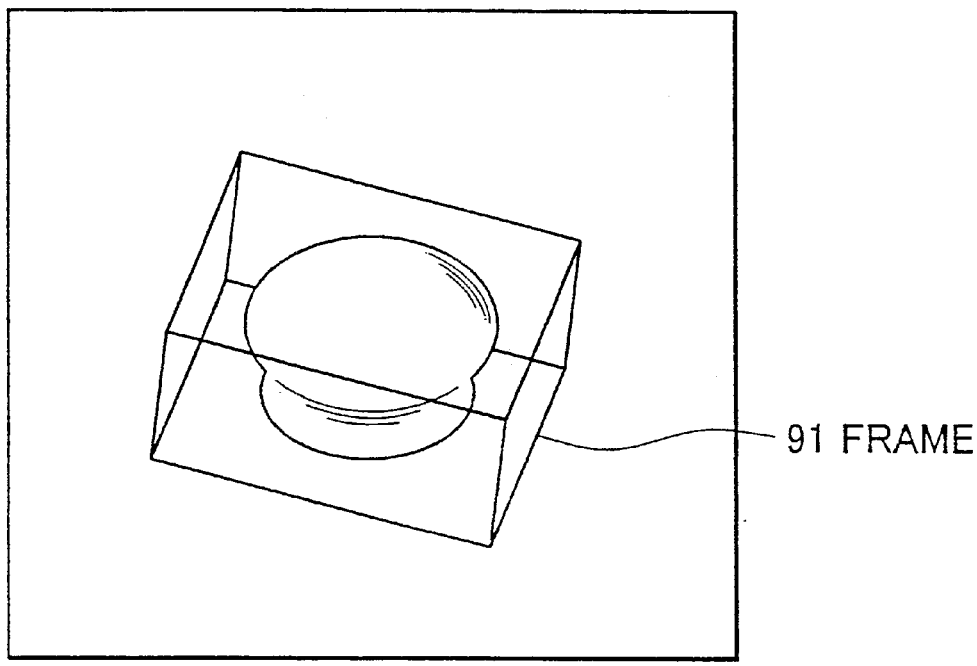
FIG. 29 is a diagram illustrating an exemplary display of a three-dimensional solid shape.
Figure 30:
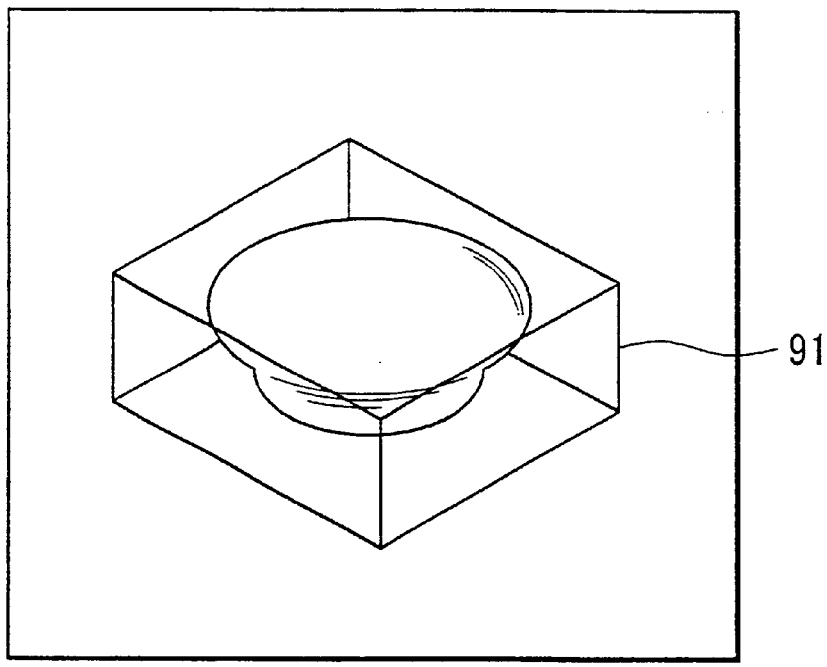
FIG. 30 is a diagram illustrating an exemplary display of a three-dimensional solid shape.
Figure 31:
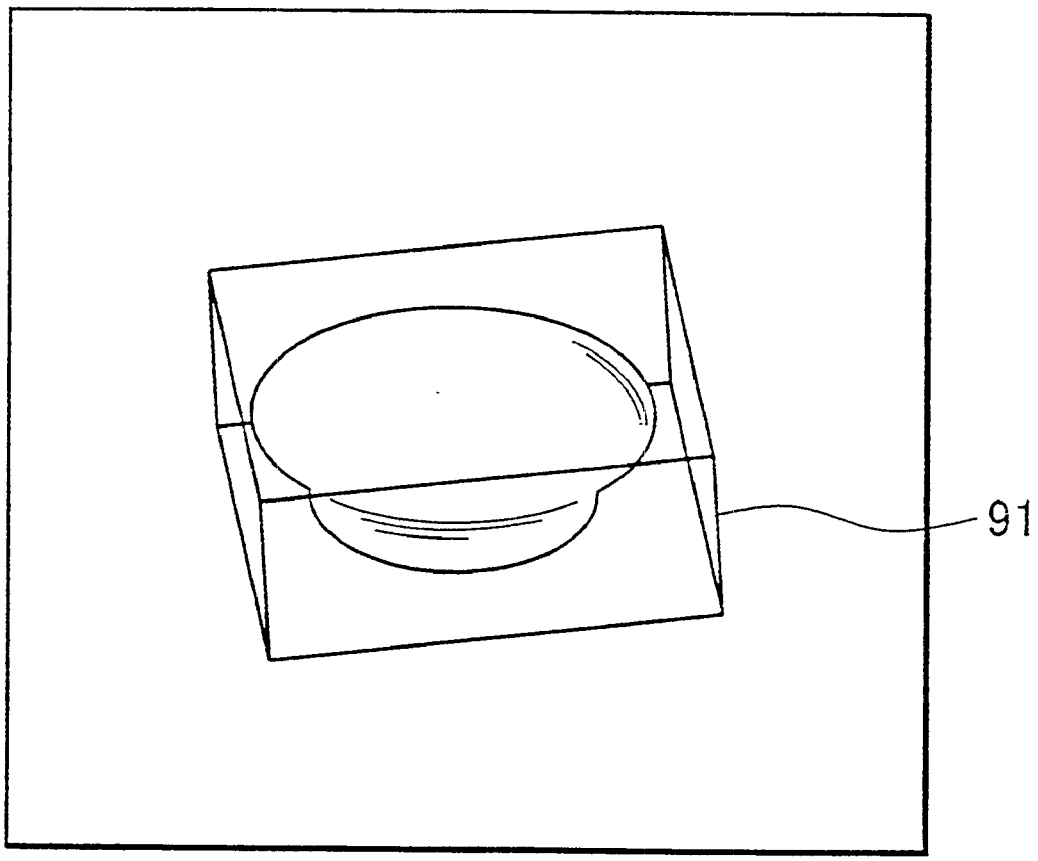
FIG. 31 is a diagram illustrating an exemplary display of a three-dimensional solid shape.
Figure 32:
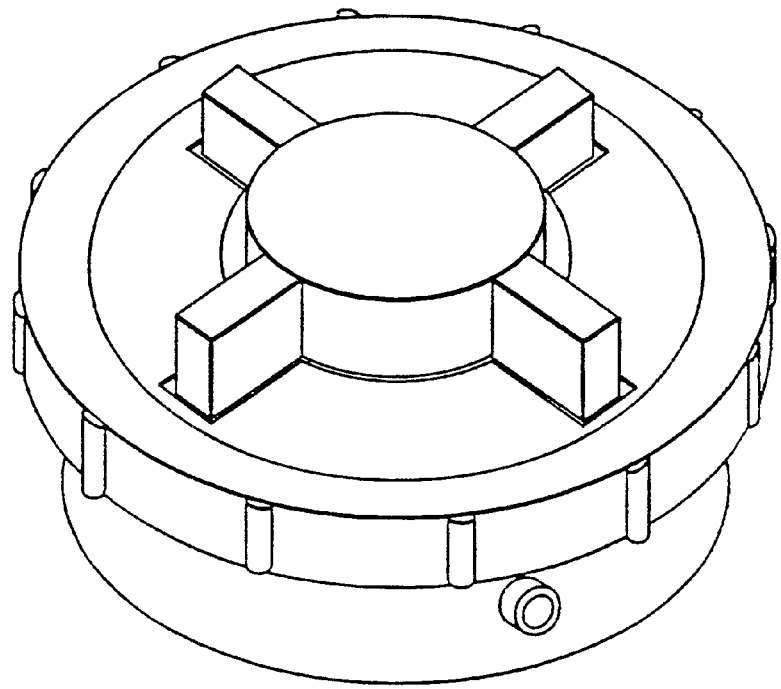
FIG. 32 is a diagram for explaining the shape of a land mine.

When the controller 22 determines at step S9 in FIG. 16 that the mode selected by the operator is the three-dimensional object image display mode, the processing proceeds to step S19, where the controller 22 executes three-dimensional object image display processing. Specifically, in this event, the operator specifies, for example, an image of an object appearing to be a land mine with a mouse or the like from the horizontal cross section image displayed at step S10. When the operator specifies the image, the controller 22 controls the image processing unit 27 to read data of the image corresponding to the specified object from the storage unit 33, and generate image data representative of the three-dimensional shape of the object. This image data is converted to two-dimensional coordinate data by the coordinate converter 28, and output to and displayed on the display 3 through the display controller 29. FIGS. 29 to 31 represent exemplary displays of a three-dimensional shape of a land mine displayed in this way. The land mine represents a three-dimensional image produced as a result of searching for a land mine having a diameter of 12 cm and a height of 5.2 cm as illustrated in FIG. 32.

It should be noted that in this event, the controller 22 controls the OSD controller 31 to display a frame 91 such that the image of the land mine is positioned within the frame, as illustrated in FIGS. 29 to 31. This frame 91 represents the size of a land mine buried in a land mine search area. In other words, although there are a large number of types of land mines, not so many types of land mines are buried in an area under search. Specifically, if one or two land mines are found, it is often the case that substantially the same types of land mines are buried in that area.

Therefore, the shape of a land mine, which has been previously known that it is buried in an area, is previously entered from the input unit 21 and stored in the storage unit 33, so that the frame 91 as a figure corresponding to the size of the land mine is simultaneously displayed around an image that appears to be a land mine. This allows the operator to immediately recognize visually whether or not the object presently under observation is substantially the same size as the land mine. When the size of the object is extremely smaller or extremely larger than the frame 91, it can be immediately determined that the object is not a land mine. Thus, only when the size of the object substantially corresponds to the frame 91, the ground may be dug up to determine whether or not it is a land mine.

At step S20, the operator determines whether or not the orientation of the three-dimensional object image need be changed. When a change is required, the processing proceeds to step S22, where the operator manipulates the input unit 21 to enter the orientation of the three-dimensional object image. In this event, the controller 22 returns to step S19, where it instructs the image processing unit 27 to generate image data corresponding to the specified orientation. The image processing unit 27, in response to this instruction, generates data of the three-dimensional object image corresponding to the specified orientation, and displays the same on the display 3.

When the operator determines at step S20 that the orientation need not be changed, the processing proceeds to step S21, where the operator determines whether or not the three-dimensional object image display processing is terminated. When the three-dimensional object image display processing need not be terminated, the processing returns to step S19 to repetitively execute the processing subsequent thereto.

When the operator determines at step S18 or at step S21 that the display processing is terminated, the processing returns to step S8 to execute the processing subsequent thereto.

Next, the calibration processing at step S1 in FIG. 15 will be explained. As described above, the propagation velocity v of an electromagnetic wave is expressed by the following equation:

$$v = C/\sqrt{\epsilon r} \qquad (8)$$

Stated another way, the propagation velocity v is reciprocally proportional to a square root of the dielectric coefficient $\epsilon r$. Therefore, as the dielectric coefficient $\epsilon r$ is larger, the propagation velocity v is lower, while as the dielectric coefficient $\epsilon r$ is smaller, the propagation velocity v is higher. As a result, the hyperbolic curve explained with reference to FIG. 9 exhibits a sharp peak (smaller width) as indicated by a broken line in FIG. 33 since a larger dielectric coefficient $\epsilon r$ results in a smaller value of the propagation velocity v and a longer propagation time t, even if an object is buried at the same depth. Conversely, since a smaller dielectric coefficient $\epsilon r$ results in a higher propagation velocity v and a shorter propagation time T, the sharpness of the hyperbolic curve becomes duller (larger width). As previously explained with reference to FIGS. 12 to 14, for performing the processing for converting the propagation time t to the depth z, the dielectric coefficient $\epsilon r$ used in the calculation must be set to a predetermined value. If the value of the dielectric coefficient $\epsilon r$ set at this time differs from the value of the actual dielectric coefficient $\epsilon r$ in the ground, the value varies when the propagation time t is converted to the depth z. Therefore, the processing for setting the value of the actual dielectric coefficient $\epsilon r$ in the ground is the calibration processing.

Figure 34:
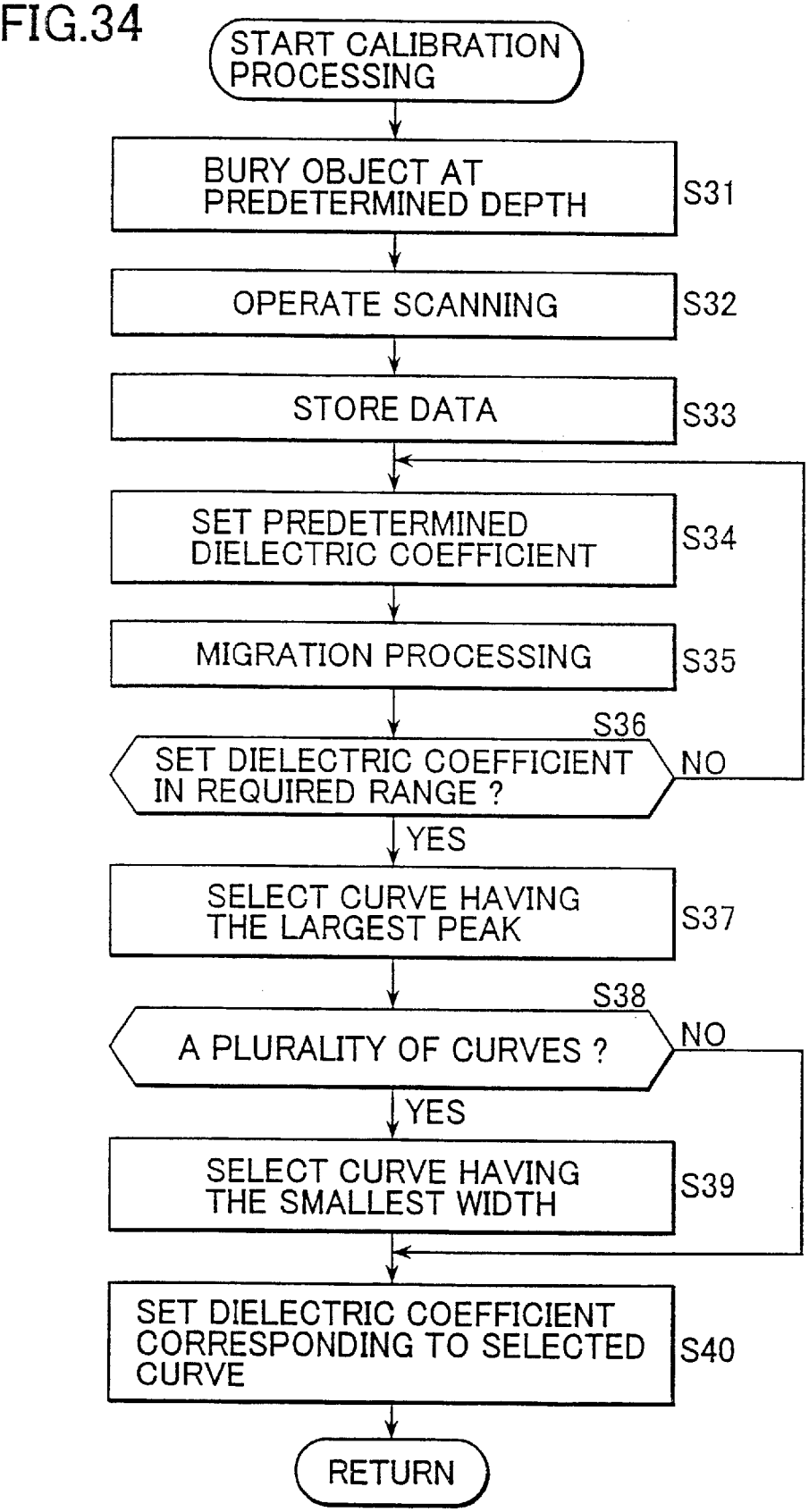
FIG. 34 is a flow chart for explaining calibration processing.

FIG. 34 illustrates details of the calibration processing. First, at step S31, the operator buries a land mine (a safe one from which explosive has been removed) or a predetermined metal at a predetermined depth in the ground within an area which is inspected as to whether land mines are buried. At step S32, this dummy land mine is scanned by the sensor head 12. In other words, the processing from step S2 to step S7 in FIG. 15 is executed. In this event, the calibration unit 26 stores data output from the migration unit 25 in the storage unit 33 through the controller 22 at step S33.

Figure 14:
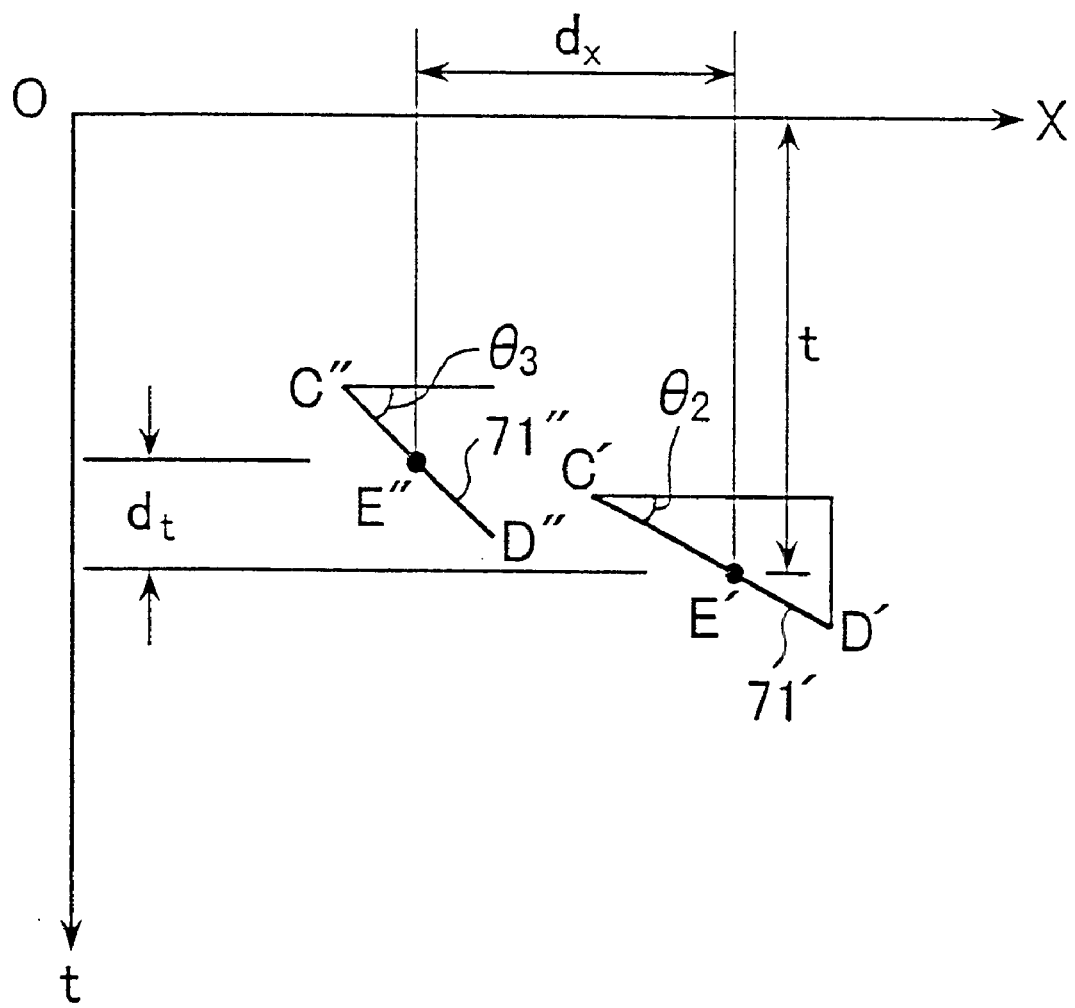
FIG. 14 is a diagram for explaining the migration.

Next, at step S34, the calibration unit 26 sets a predetermined dielectric coefficient εr, and instructs the migration unit 25 to execute the migration processing previously explained with reference to FIGS. 12 to 14 at step S35. At step S36, the calibration unit 26 determines whether or not the dielectric coefficients εr have been set for a required range. If some dielectric coefficients εr have not yet been set, the processing returns to step S34, where a new dielectric coefficient is set. Then, at step S35, the migration is again executed for the case where the dielectric coefficient is set. The foregoing processing is repetitively executed until it is determined at step S36 that all dielectric coefficients have been set in a required range.

The level of a reflected wave under measurement includes a parameter associated with a set dielectric coefficient (propagation velocity). When an appropriate dielectric coefficient is set, the level of the reflected wave presents the largest value. Thus, the processing next proceeds to step S37, where the calibration unit 26 selects the curve having the largest peak value from curves of reflection levels derived by repetitively executing the processing from step S34 to step S36.

At step S38, the calibration unit 26 determines whether or not there are two or more curves which have the same peak value. When there are two or more, the processing proceeds to step S39, where the curve having the smallest width is selected. When the calibration unit 26 determines at step S38 that there is only one curve which has the largest peak value, the processing at step S39 is skipped.

At step S40, assuming that a dielectric coefficient corresponding to the curve selected at step S37 or step S39 is the dielectric coefficient closest to the actual dielectric coefficient in the ground, the calibration unit 26 sets the value in the migration unit 25. As a result, the migration unit 25 subsequently executes the migration processing using that value.

Figure 15:
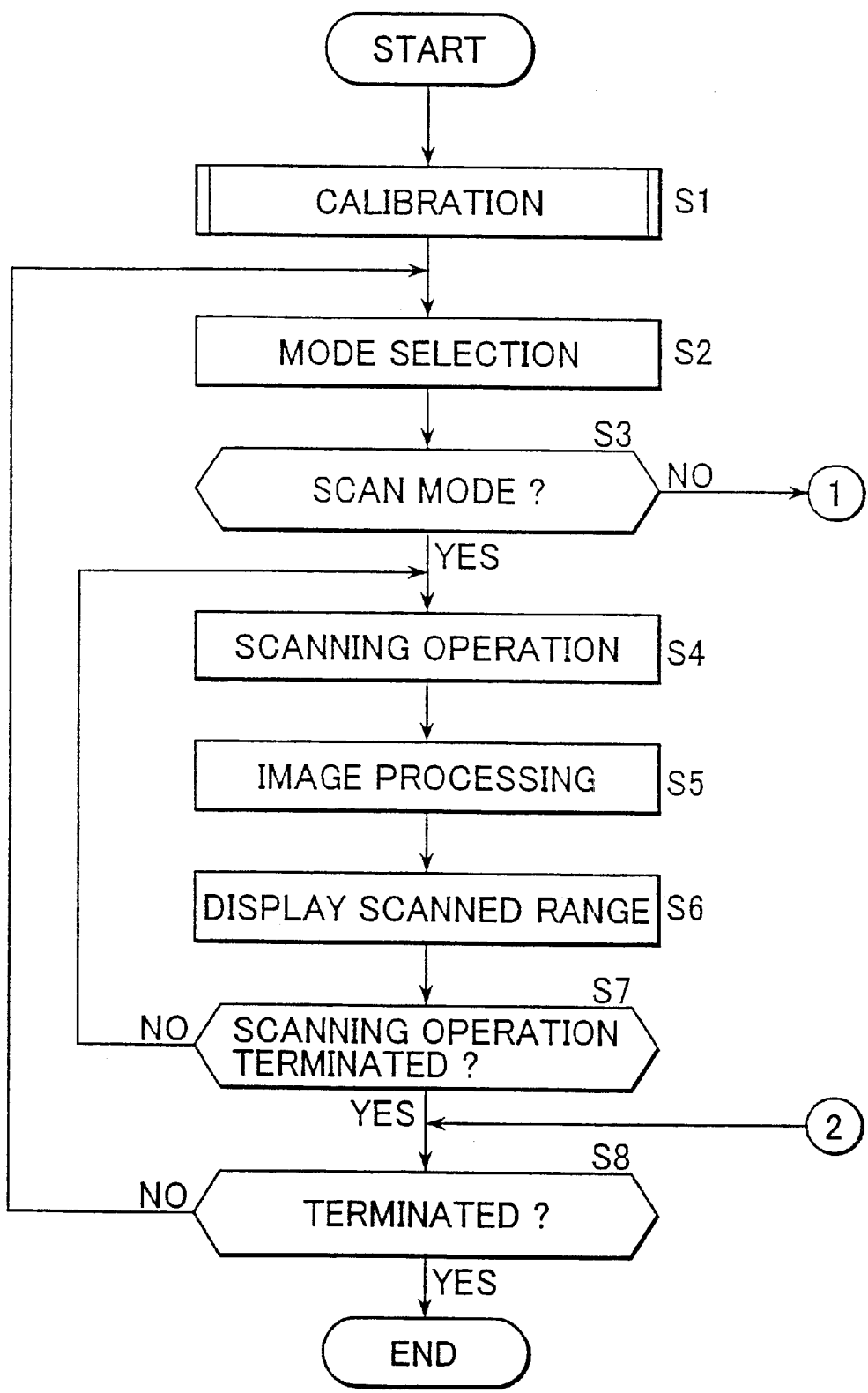
FIG. 15 is a flow chart for explaining the operation of the inspection apparatus illustrated in FIGS. 1 and 2.
Figure 35:
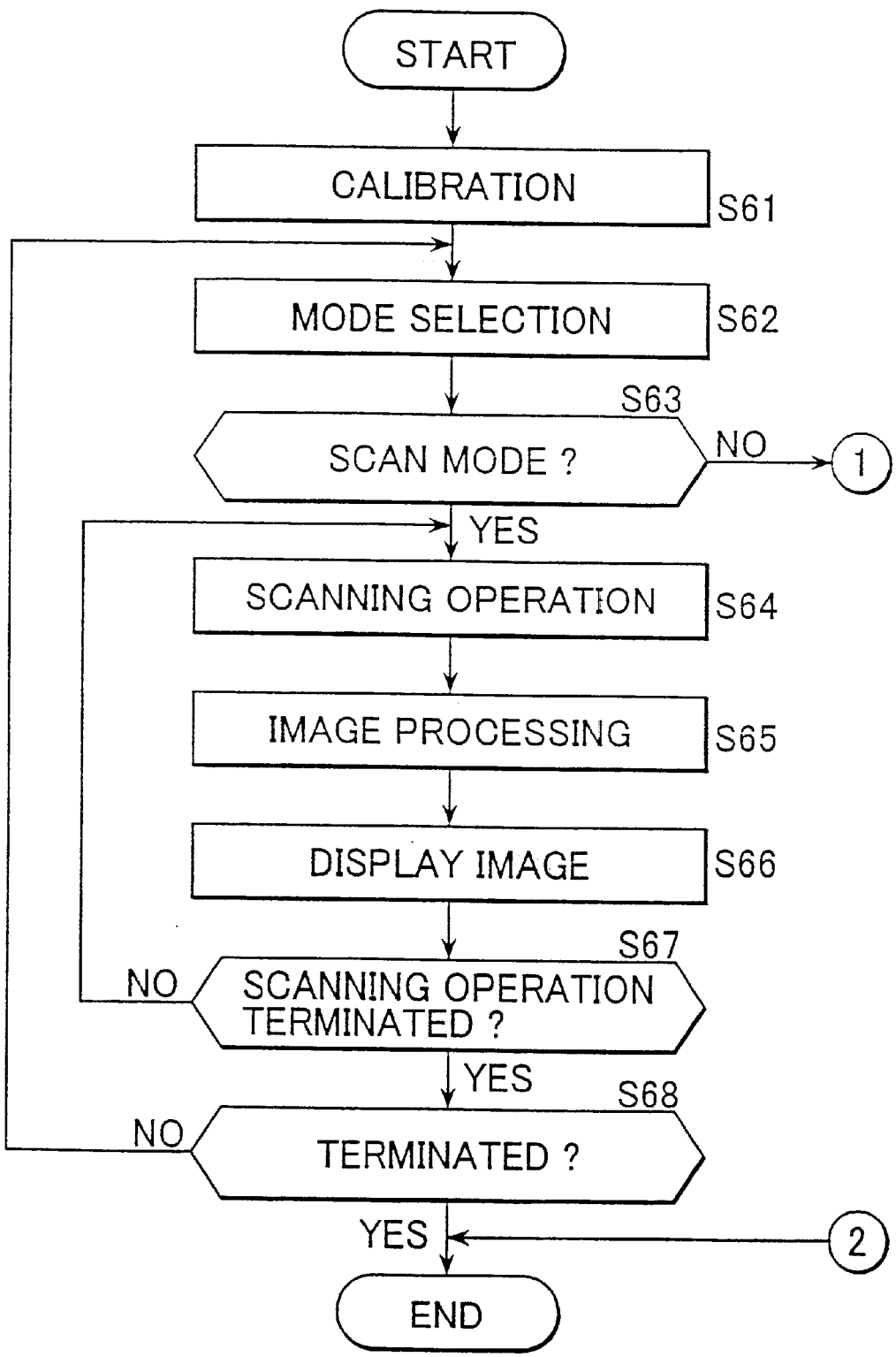
FIG. 35 is a flow chart for explaining another exemplary operation of the example illustrated in FIGS. 1 and 2.

In the exemplary processing illustrated in the flow charts of FIGS. 15 and 16, a scanned range is displayed on the display 3 in the scan mode as illustrated in FIG. 18 such that the scanned range can be distinguished from an unscanned range, and a horizontal cross section image representative of the state in the ground is displayed when the horizontal plane display mode is set. It is also possible to display an image in the ground in real time as the scanning is under progress. In this case, the processing illustrated in the flow chart of FIG. 15 is modified as illustrated in FIG. 35. While processing from step S61 to step S68 in FIG. 35 is basically similar to the processing from step S1 to step S8 in FIG. 15, image display processing is executed at step S66 in FIG. 35 whereas the scan range display processing is executed at step S6 in FIG. 15. In other words, here, similar processing to that at step S10 in FIG. 16 is executed. Therefore, in this event, the operator can display the internal state in the ground on the display 3 in real time while performing the scanning using the sensor head 12.

When the scan mode is not determined at step S63, the processing at step S9 onward illustrated in FIG. 16 is executed. Since the processing in this case is similar to that previously explained with reference to FIG. 16, explanation thereof will be omitted.

Figure 36:
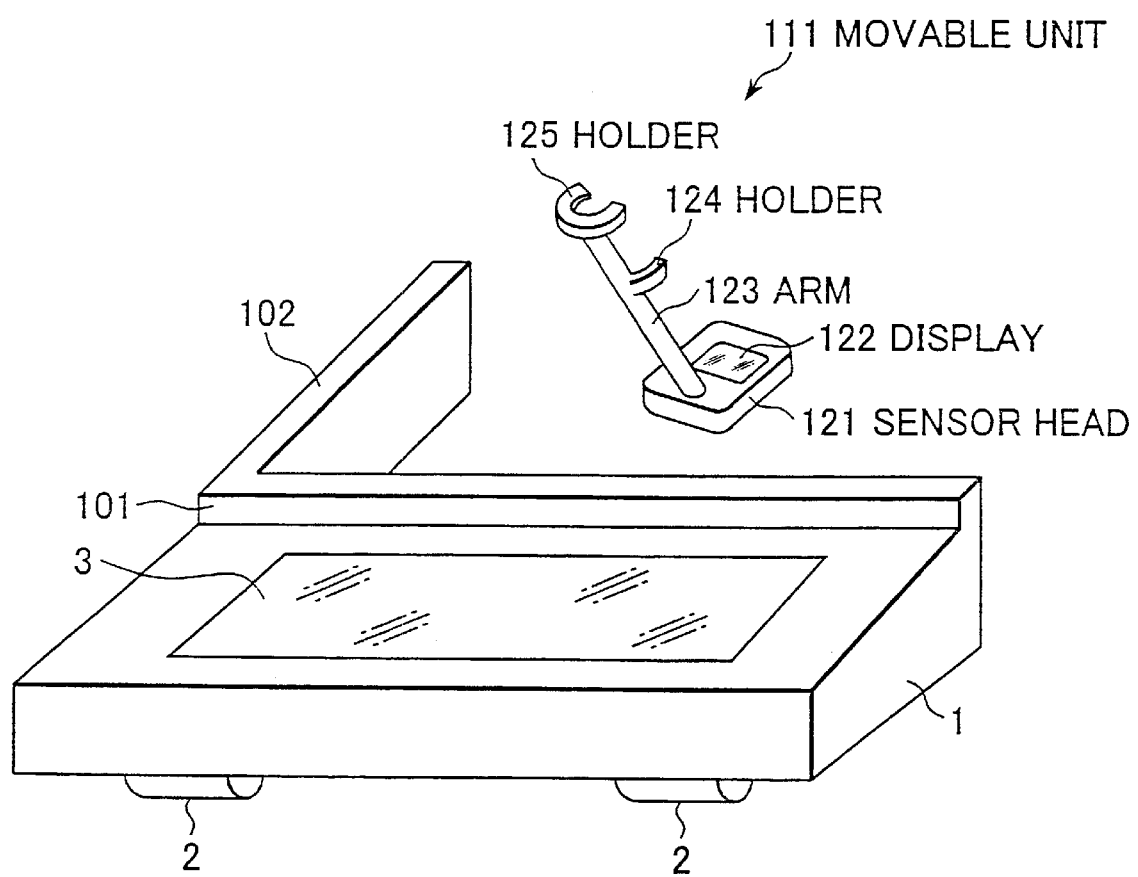
FIG. 36 is a perspective view illustrating another exemplary configuration of an inspection apparatus to which the present invention is applied.

FIG. 36 illustrates another exemplary configuration of an inspection apparatus to which the present invention is applied. In this exemplary configuration, the hinges 11-1 to 11-4, the arms 12-2 to 12-3 and a portion of the sensor head 12, illustrated in FIG. 1, are omitted, and instead, the body 1 is provided with an x-coordinate detector 101 and a y-coordinate detector 102, such that the x-coordinate and the y-coordinate of a sensor head 121 in a movable unit 111 are detected using outputs of these units. Then, the movable unit 111 can communicate with the body 1 in a wired or a wireless scheme.

Figure 37:
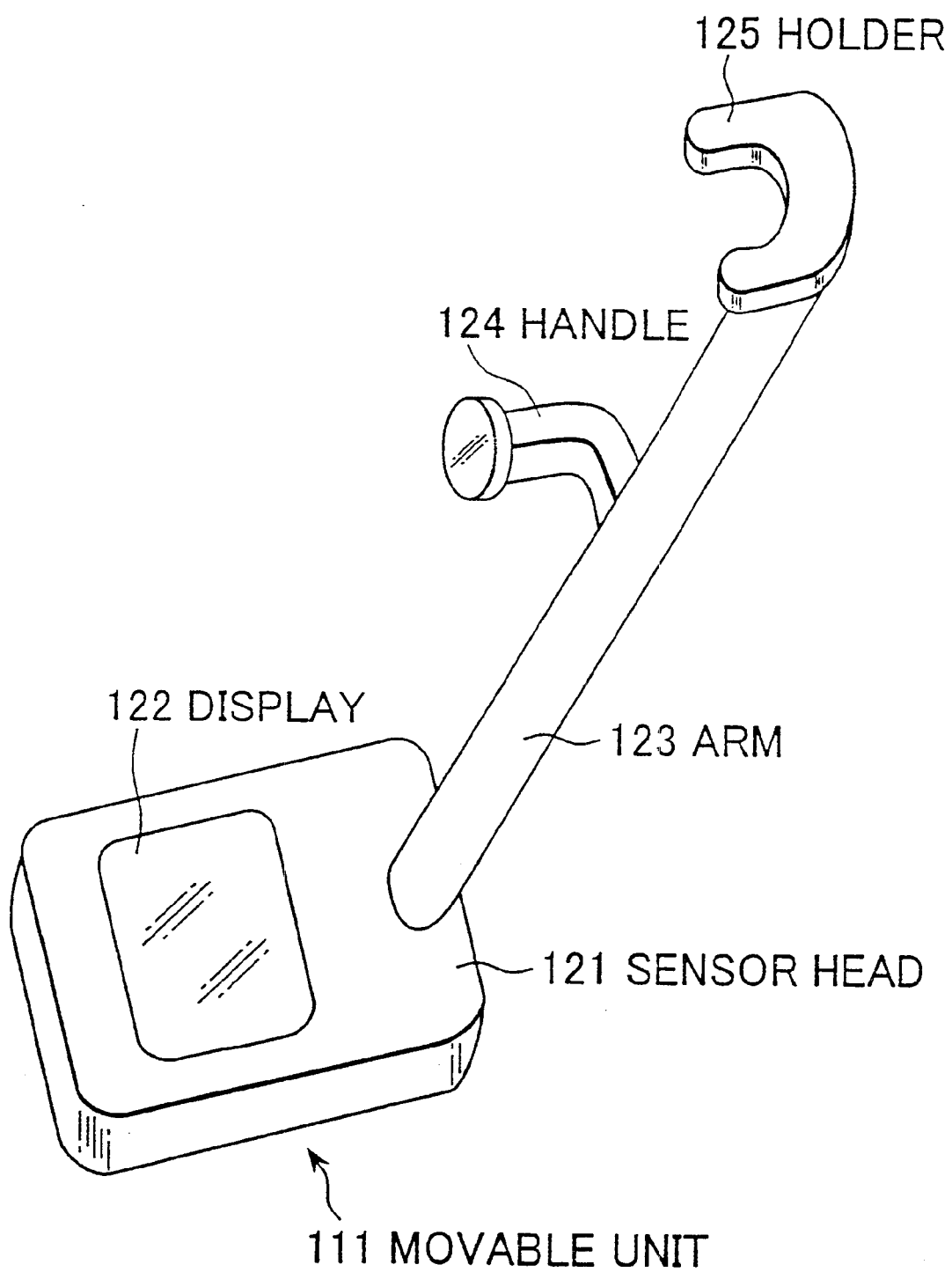
FIG. 37 is a perspective view illustrating an exemplary configuration of a movable unit 111 in FIG. 36.

FIG. 37 illustrates the external configuration of the movable unit 111 in an enlarged view. The sensor head 121 has a similar configuration to the sensor head 12 in FIG. 1. The sensor head 121 is provided with a display 122 on the top surface. The display 122 displays similar images to those on the display 3 on the body 1. An arm 123 is attached to the sensor head 121, a holder 125 substantially in a U-shape is disposed at an end of the arm 123, and a handle 124 is formed in the middle of the arm 123. The operator grabs the handle 124 with a hand, and inserts an arm into a U-shaped recess of the holder 125 to hold the movable unit 111.

As the operator scans the ground holding the movable unit 111, the x-coordinate detector 101 and the y-coordinate detector 102 irradiate the sensor head 121 with laser light which is modulated, for example, by the coordinates of the position. The sensor head 121, upon receipt of the laser light, demodulates the coordinates of the position to detect the x-coordinate or the y-coordinate. The rest of the operation is similar to the foregoing.

Figure 38:
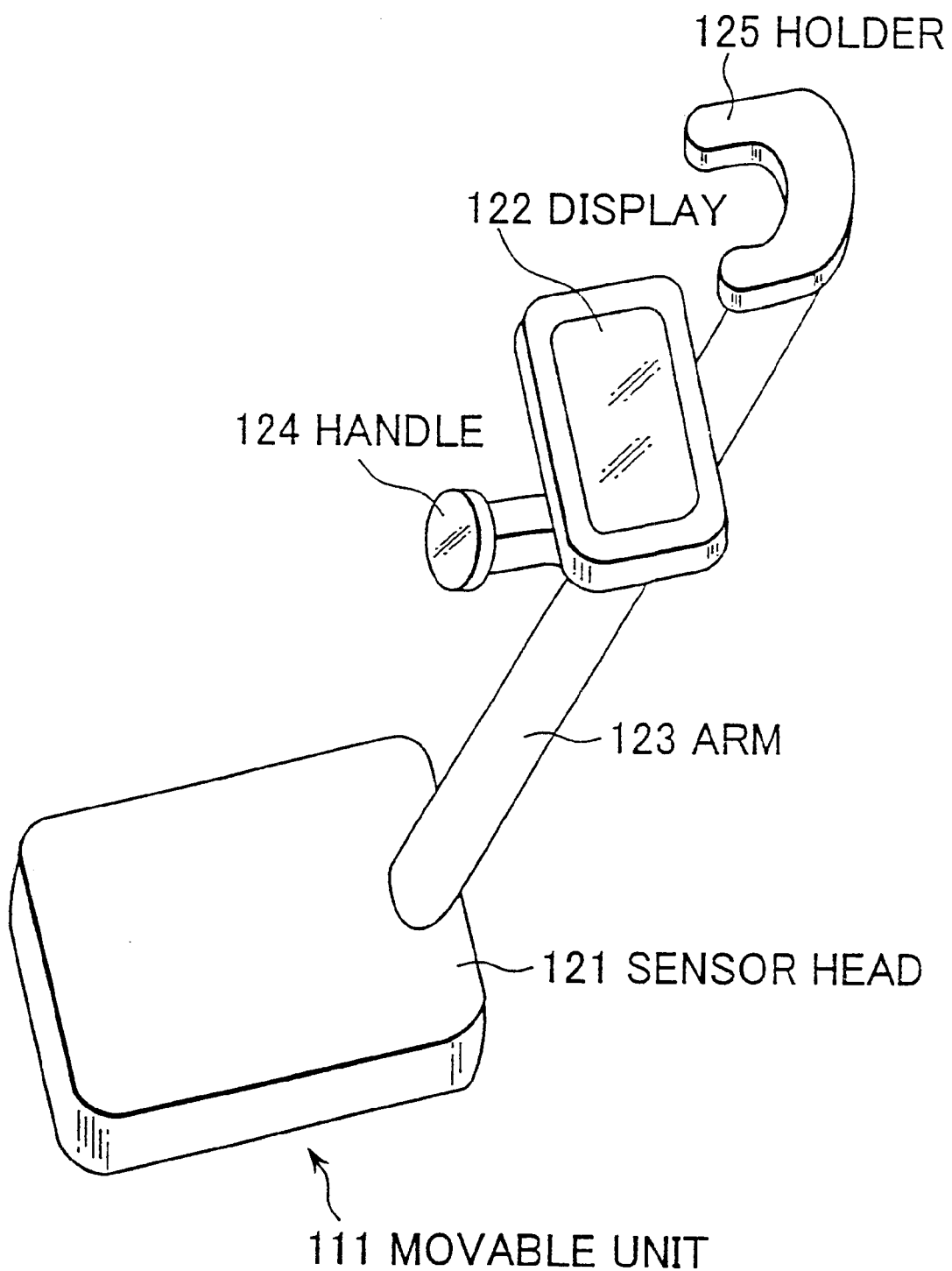
FIG. 38 is a perspective view illustrating another exemplary configuration of the movable unit Ill in FIG. 36.

FIG. 38 illustrates a further exemplary configuration of the movable unit 111. In this exemplary configuration, the display 122 is disposed at a position near the holder 125 instead of on the sensor head 121. Therefore, the operator can more readily recognize an image on the display 122, as compared with the exemplary configuration of FIG. 37.

Figure 39:
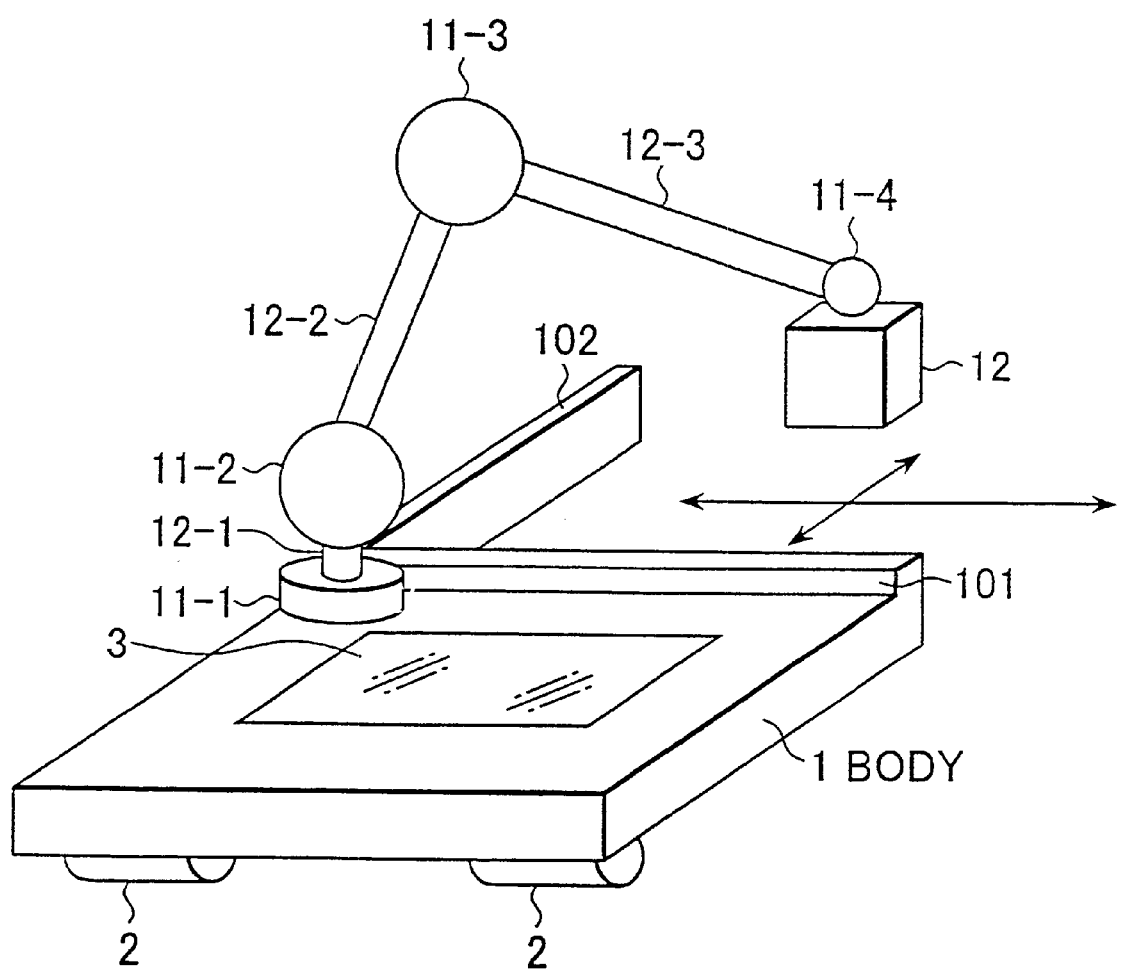
FIG. 39 is a perspective view illustrating a further exemplary configuration of an inspection apparatus to which the present invention is applied.

FIG. 39 illustrates a further exemplary configuration of the inspection apparatus. This exemplary configuration is a combination of the configuration illustrated in FIG. 1 and the configuration illustrated in FIG. 36. In this exemplary configuration, since the x-coordinate detector 101 and the y-coordinate detector 102 are disposed on the body 1, the hinges 11-1 to 11-4 are not provided with any position detector such as a rotary encoder. The position of the sensor head 12 is detected using outputs from the x-coordinate detector 101 and the y-coordinate detector 102. The rest of the configuration is similar to that in FIG. 1.

Otherwise, the position of the sensor head 121 can be detected by measuring the distance to the sensor head 121 with a plurality of distance measuring instruments and processing the results of the measurements. Alternatively, when two LEDs are perpendicularly mounted on the sensor head 121 and imaged using an ultra-wide lens, the distance between the LEDs on the image captured at this time and the actual distance between the LEDs on the sensor head 121 are defined by the focal distance f of the ultra-wide lens. The position of the sensor head 121 may be calculated and derived using this relationship.

Figure 40:
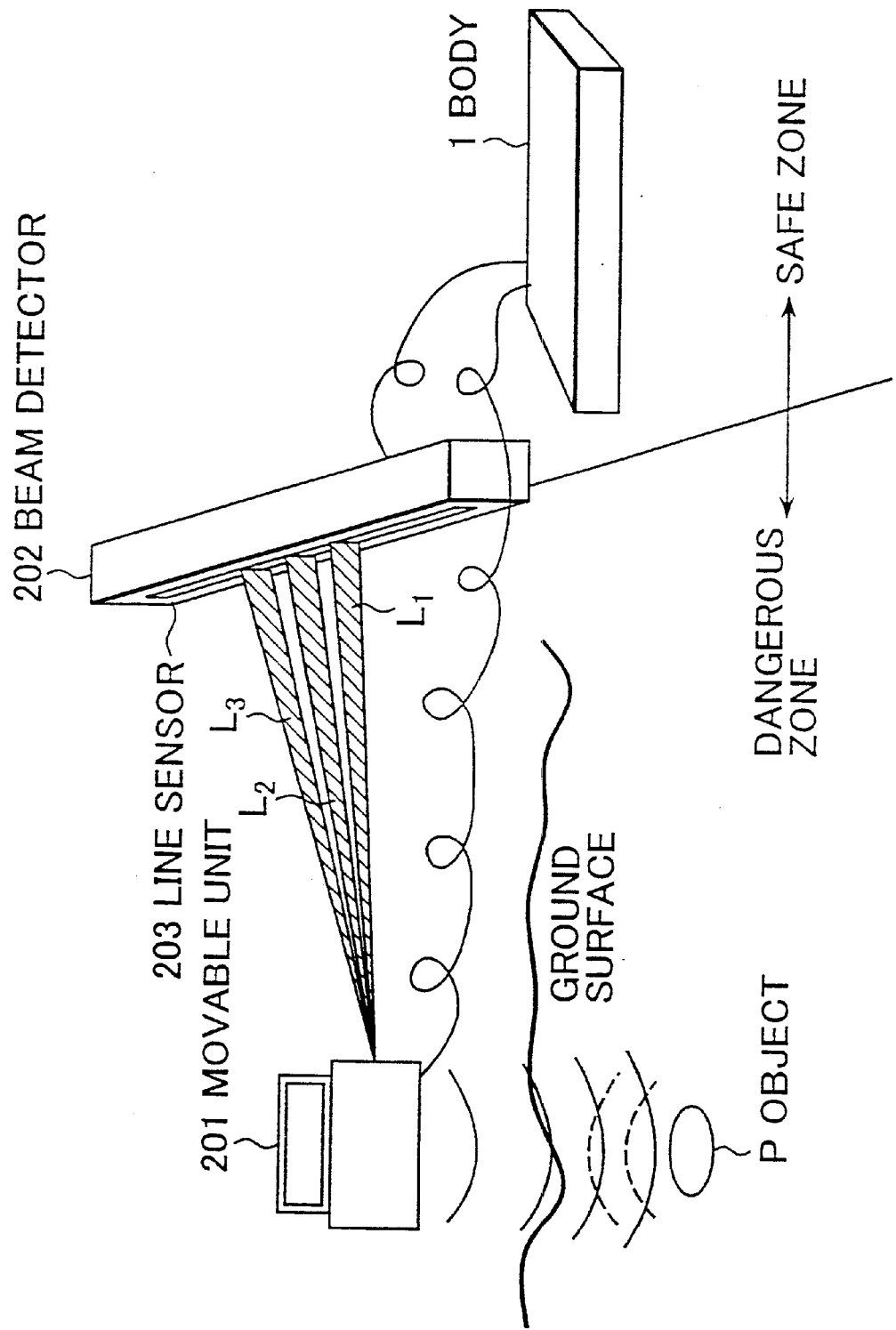
FIG. 40 is a diagram illustrating another exemplary configuration of an inspection apparatus to which the present invention is applied.

FIG. 40 illustrates a further exemplary configuration. In this exemplary configuration, a movable unit 201 substantially comprised of a sensor head is held with a hand and manipulated by the operator. A beam detector 202 has a line sensor 203 on its front surface for receiving three laser beams L1 to L3 emitted from the movable unit 201. The movable unit 201 and the beam detector 202 are connected to the body 1 through signal lines, respectively.

Figure 41:
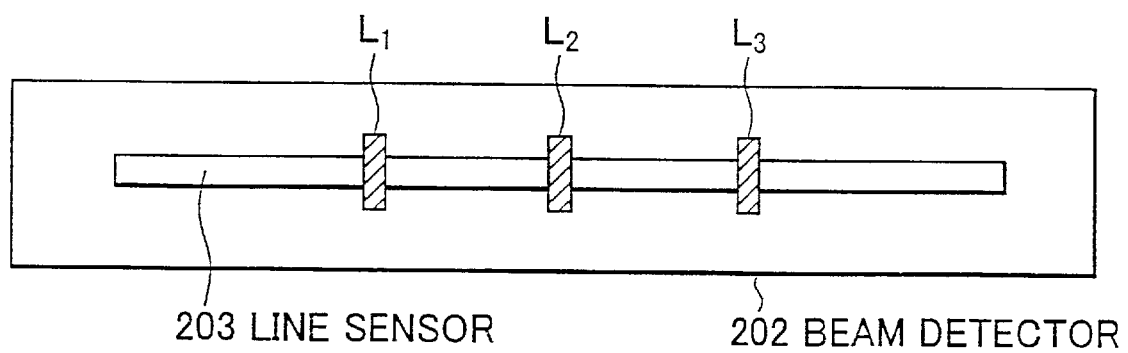
FIG. 41 is a diagram illustrating in front view the configuration of a beam detector 202 in FIG. 40.

FIG. 41 illustrates that the three laser beams L1 to L3 emitted from the movable unit 201 are received by the line sensor 203 of the beam detector 202. As illustrated in this figure, the laser beams L1 to L3 are adjusted such that their cross-sectional shape is in the shape of flat plate. Since the laser beams L1 to L3 emitted from the movable unit 201 respectively diffuse, they respectively appear in a fan shape as a whole.

Figure 42:
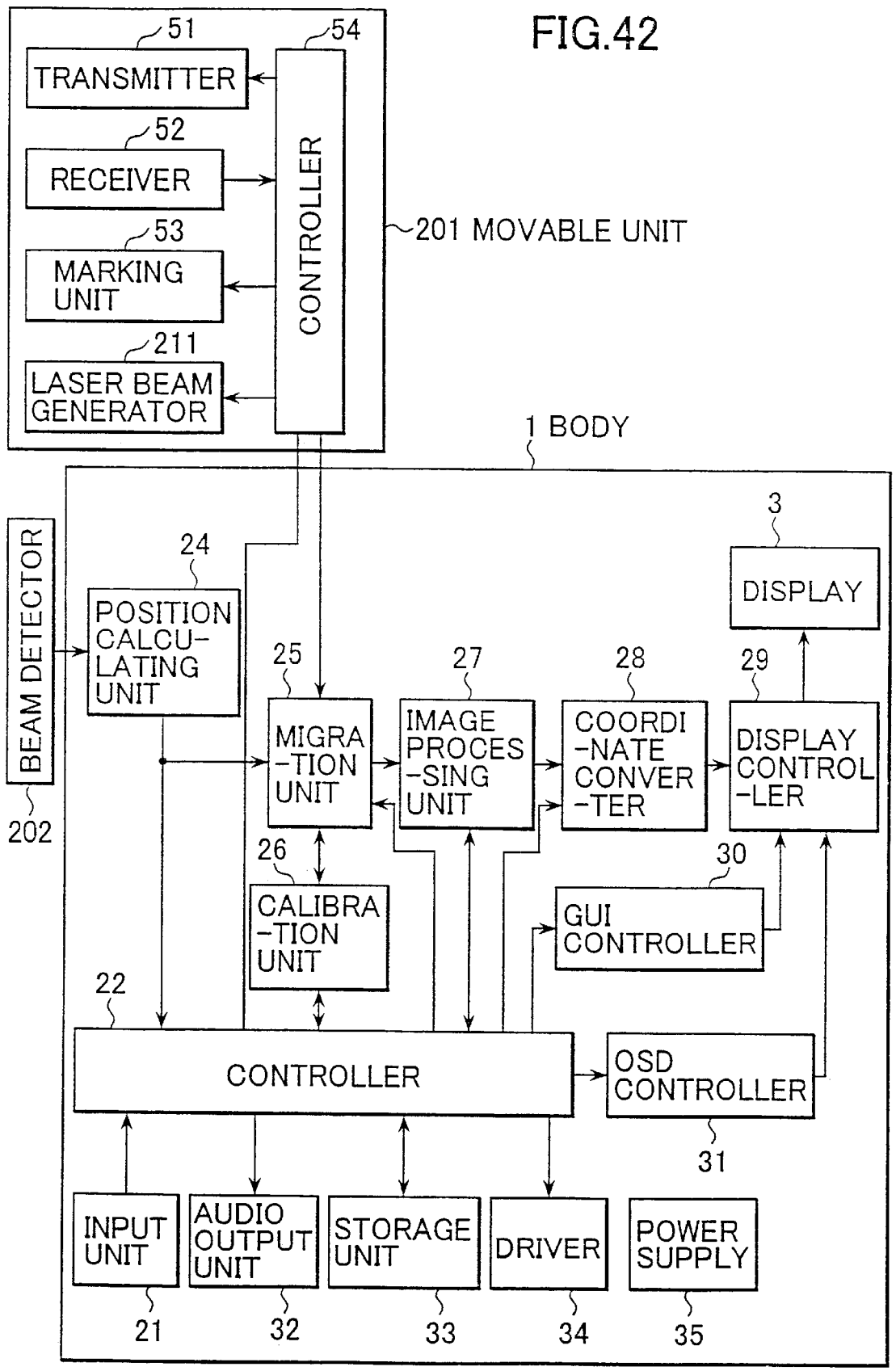
FIG. 42 is a block diagram illustrating the internal configuration of a movable unit 201 and a body 1 in FIG. 40.

FIG. 42 illustrates the electric configuration of the system illustrated in FIG. 40. The movable unit 20 has a laser beam generator 211 in addition to the transmitter 51 to the controller 54 of the sensor head 12 illustrated in FIG. 2. The laser beam generator 211 contains three laser diodes for generating the three laser beams L1 to L3 illustrated in FIG. 40.

In the exemplary configuration of FIG. 2, the position detector 23 of the body 1 detects the position of the sensor head 12, whereas in the example of FIG. 42, the beam detector 202 detects the position of the movable unit 201, so that the position detector 23 of the body 1 is eliminated. Then, the output of the beam detector 202 is supplied to the position calculating unit 24 of the body 1. The rest of the configuration is similar to that in FIG. 2.

FIG. 43 illustrates an exemplary configuration of the beam detector 202. The line sensor 203 receives the three laser beams L1 to L3 emitted from the laser beam generator 211, and outputs signals corresponding to the light receiving positions to an amplifier 221. The amplifier 221 amplifies the input signals, and outputs the amplified signals to a detector 222. The detector 222 envelope detects the signals input from the amplifier 221, and output the result of the detection to a waveform shaper 223. The waveform shaper 223 shapes the waveform of a detection signal input from the detector 222, and outputs the shaped signal to a controller 224.

A clock generator 225 generates a clock which is output to the line sensor 203, a counter 226 and the controller 224. The counter 226, controlled by the controller 224, counts the clock output by the clock generator 225. A parallel-to-serial (P/S) converter 227, controlled by the controller 224, converts a count value from the counter 226 from parallel data to serial data which is output to the position calculating unit 24 of the body 1.

While the operation of the apparatus illustrated in FIGS. 40 to 43 will be next explained, the basic operation thereof is basically similar to the operation of the apparatus illustrated in FIG. 2, so that the explanation thereof will be omitted. However, since the apparatus illustrated in FIG. 2 differs from the movable unit 201 in the principles of the position detection, the operation associated with the position detection will be explained below.

As illustrated in FIG. 44, the laser beam generator 211 of the movable unit 201 emits the laser beams L1 to L3 such that the respective optical axes are at an angle a on the same horizontal plane. As illustrated in FIG. 44(A), when the movable unit 201 is directly opposite to the line sensor 203, a spacing a between positions at which the laser beams L1 and L2 are received is equal to a spacing b between positions at which the laser beams L2 and L3 are received on the line sensor 203.

Figure 44A:
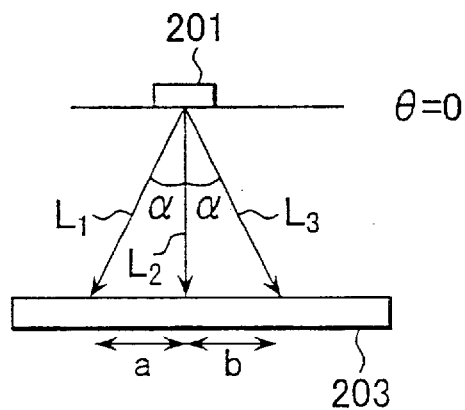
FIGS. 44A, 44B, 44C and 44D are diagrams for explaining rotation of the movable unit 201 about a line sensor 203 in FIG. 40.
Figure 44B:
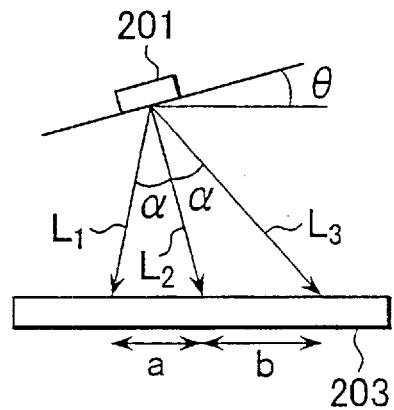
Figure 44C:
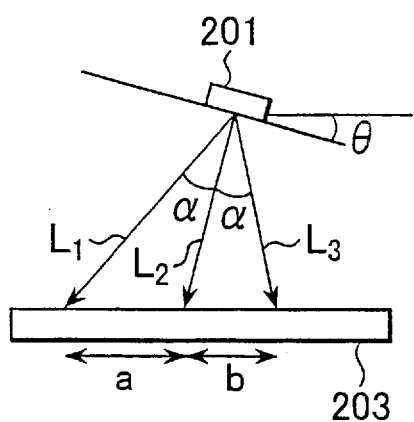
Figure 44D:
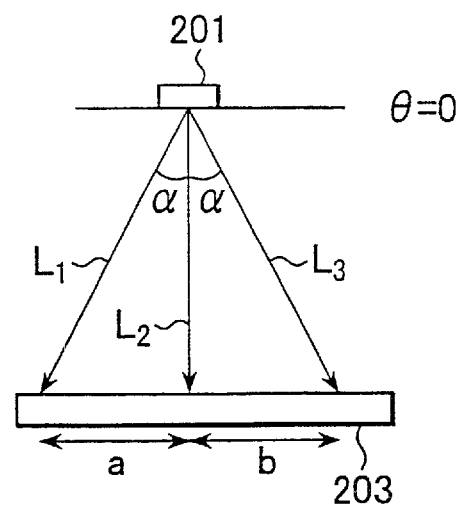

On the other hand, when the movable unit 201 is rotated by an angle θ in the counter-clockwise direction with respect to the line sensor 203 in the horizontal plane as illustrated in FIG. 44(B), the spacing a becomes shorter than the spacing b. Conversely, when the movable unit 201 is rotated by the angle θ in the clockwise direction with respect to the line sensor 203 in the horizontal plane as illustrated in FIG. 44(C), the spacing a becomes longer than the spacing b. Further, as illustrated in FIG. 44(D), when the movable unit 201 is directly opposite to the line sensor 203, but the distance between the movable unit 201 and the line sensor 203 is longer than that illustrated in FIG. 44(A), the spacings a, b become longer than those in FIG. 44(A).

Figure 45:
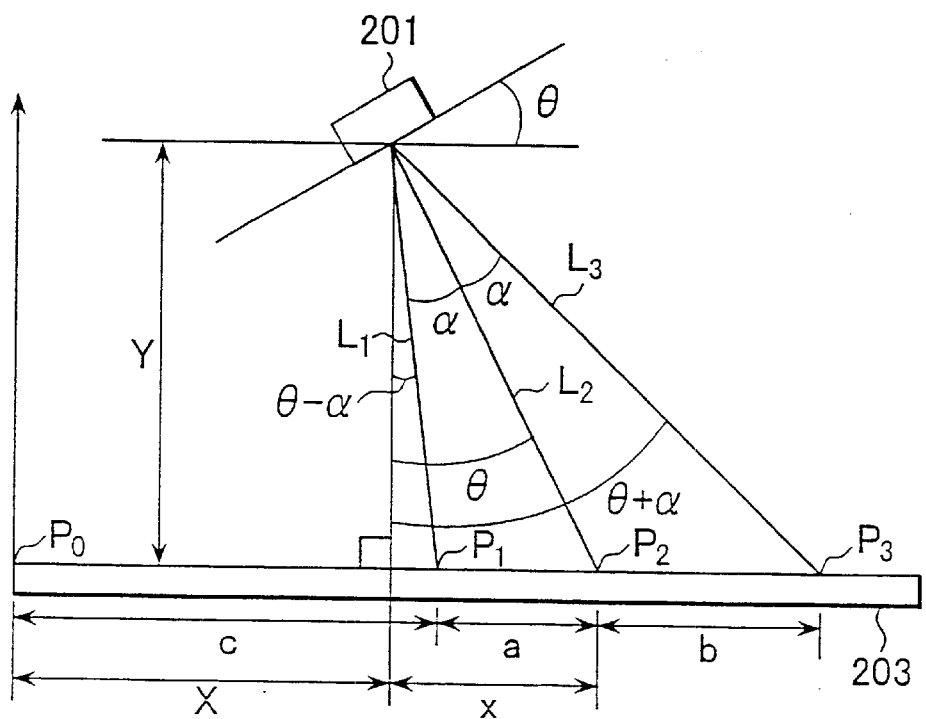
FIG. 45 is a diagram for explaining the principles of detecting the coordinates of the movable unit 201.

FIG. 45 shows a general state in which the movable unit 201 is inclined by an angle θ with respect to the line sensor 203. Assume in this figure that the left-hand end of the line sensor 203 is defined as the origin, and an X-axis is drawn in the right direction, while a Y-axis is drawn in the upward direction. In this event, the coordinates of the movable unit 201 in the horizontal plane is represented by (X, Y).

Light receiving points of the laser beams L1, L2, L3 on the line sensor 203 are P1, P2, P3, respectively. Also, the left-hand end of the line sensor 203 (origin) is P0. Further, a spacing between the point P0 and the point P1 is c; a spacing between the points P1 and the point P2 is a; and a spacing between the point P2 and the point P3 is b. Additionally, a spacing from an intersection of a perpendicular drawn from the movable unit 201 down to the line sensor 203 with the line sensor 203 to the point P2 is x.

From the foregoing relationships, the following equation is established:

$$x = Y \tan \theta \tag{9}$$

Since the angle formed by the perpendicular from the movable unit 201 to the line sensor 203 with the laser beam L1 is θ−α, the following equation is established:

$$a = x - Y \tan(\theta - \alpha) \tag{10}$$

Further since the angle or the perpendicular to the laser beam L3 is θ+α, the following equation is established:

$$b = Y \tan(\theta + \alpha) - x \tag{11}$$

Also, the following equation is established from FIG. 45:

$$X = c + a - x \tag{12}$$

The following equation is established from the above equation (9) and equation (10):

$$\begin{aligned} a &= Y \tan\theta - Y\tan(\theta - \alpha) \\ &= Y(T - (T-A)/(1+T\times A)) \\ &= YA(1 + 2\times T)/(1 - T\times A) \end{aligned} \tag{13}$$

where T=tan θ, and A=tan α.

Further, the following equation is established from equation (9) and equation (11):

$$\begin{aligned} b &= Y\tan(\theta + \alpha) - Y\tan\theta \\ &= Y((T+A)/(1+T)A) - T) \\ &= YA(1 + 2\times T)/(1 - T\times A) \end{aligned} \tag{14}$$

Also, the following equation is established from equation (13) and equation (14):

$$b/a = (1+T\times A)/(1-T\times A) \tag{15}$$

This equation (15) can be re-written in the following manner:

$$a(1+T \times A) = b(1 - T \times A) \quad (16)$$

Now, since A=tan θ, the following equation is established:

$$T = \tan \theta = (b-a)/((b+a) \times A) \quad (17)$$

Transforming equation (13), the following equation is derived:

$$Y = a(1+T \times A)/A(1+2 \times T)) \quad (18)$$

From equation (9) and equation (18), the following equation is derived:

$$x = Y \times T \quad (19)$$

Further, from equation (10) and equation (19), the following equation is established:

$$X = c + a - x \quad (20)$$

In the foregoing manner, the coordinates (X, Y) of the movable unit 201 can be calculated from equation (18) and equation (20).

Figure 46:
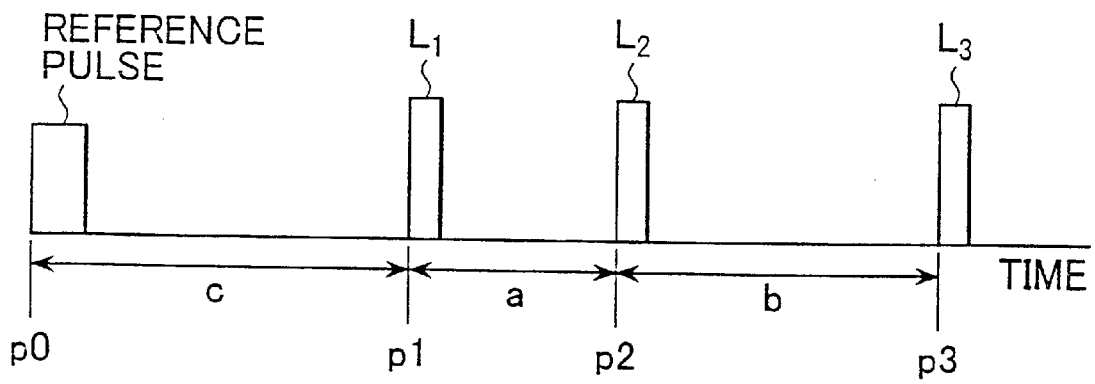
FIG. 46 is a timing chart for explaining the operation of the line sensor 203 in FIG. 43.

For detecting the position in accordance with the foregoing principles, as illustrated in FIG. 46, the line sensor 203 generates a reference pulse at the timing of the left-hand end P0 in FIG. 45, and generates detection pulses at timings of points P1 to P3 at which the laser light L1 to L3 is received, when the sensor head is scanned in synchronism with the clock supplied from the clock generator 225. This pulse is amplified by the amplifier 221, and then input to the detector 222 for detection.

Assuming now that when a light receiving surface of the line sensor 203 has a length of 60 cm, this is read in 6 mS, and the position is calculated at a cycle of 10 mS, a time available for the calculation is 4 mS. Assuming that the line sensor 203 has a resolution of 0.1 mm per dot, and the clock supplied from the clock generator 225 is at frequency of 1 MHz, a time required to read the length of 60 cm is calculated to be 6 mS (=6000 dots×1 μS).

Even if the output of the line sensor 203 is read in units of one dot, respective values include noise and have variations. Therefore, the detector 222 performs envelope detection (amplitude detection) to read the output of the line sensor 203 substantially in unit of 10 dots. The output of the detector 222 is waveform shaped by the waveform shaper 223, and then input to the controller 224.

The controller 224 controls the counter 226 at the timing at which a reference pulse is input from the waveform shaper 223, in FIG. 46, to start counting the clocks output by the clock generator 225. The controller 224 further controls the counter 226 at the timings at which detection pulses corresponding to the laser beams L1 to L3, shown in FIG. 46, are input from the waveform shaper 223, to output a count value at that time to the P/S converter 227, reset the count value, and again start counting the clocks. As a result, the P/S converter 227 outputs to the position calculating unit 24 a count value of the counter 226 corresponding to a spacing c between the position P0 and the position P1; a count value corresponding to a spacing a between the position P1 and the position P2; and a count value corresponding to a spacing b between the position P2 and the position P3, as shown in FIG. 46.

Thus, the position calculating unit 24 converts these count values to the spacing c, a, b, and performs the calculations mentioned above to derive the coordinates (X, Y) of the movable unit 201.

Figure 47:
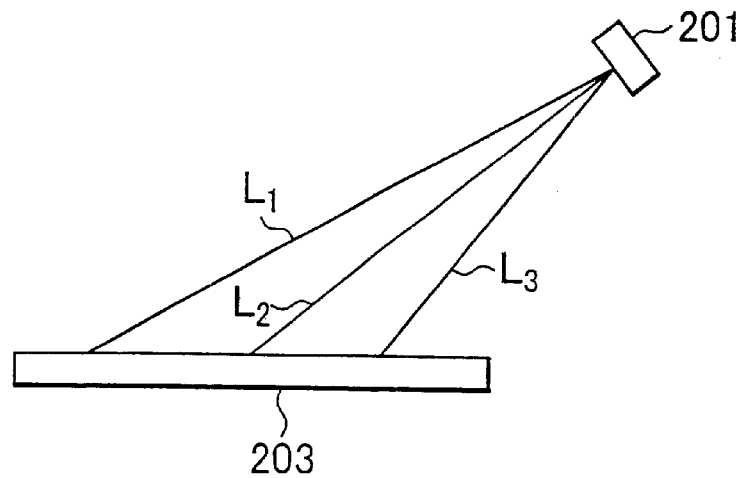
FIG. 47 is a diagram for explaining the principles of detecting the coordinates of the movable unit 201.

The principles shown in FIG. 45 are also established when the movable unit 201 is positioned outside of the end of the line sensor 203, as shown in FIG. 47. Therefore, even in a state shown in FIG. 47, the coordinates of the movable unit 201 can be detected. As such, a wide range can be searched even if the length of the beam detector 202 (line sensor 203) is not made so long.

Figure 48A:
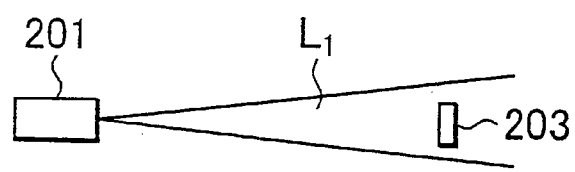
FIGS. 48A and 48B are diagrams for explaining the principles of detecting the movable unit 201.
Figure 48B:
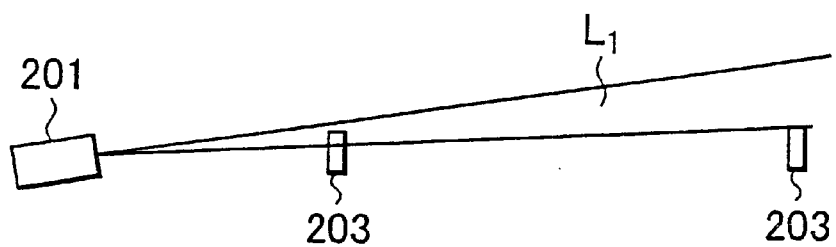

As explained above, the three laser beams are emitted because the coordinates X, Y can be calculated therefrom. For example, when only one laser beam L1 is emitted from the movable unit 201 to the line sensor 203 as illustrated in FIG. 48, a point P1 at its reading position corresponds to the coordinate X of the movable unit 201 if the laser beam L1 perpendicularly impinges on the line sensor 203. However, if the laser beam L1 slantly impinges on the line sensor 203 as indicated by a broken line in FIG. 48, its reading point P1 does not correspond to the coordinate X of the movable unit 201. In addition, the Y coordinate of the movable unit 201 cannot be derived irrespective of the reading point P1. For this reason, the three laser beams L1 to L3 are used as described above.

Figure 49A:
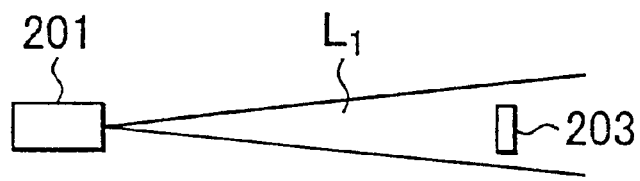
FIGS. 49A and 49B are diagrams for explaining a change in orientation of the movable unit 201 to the line sensor 203.
Figure 49B:
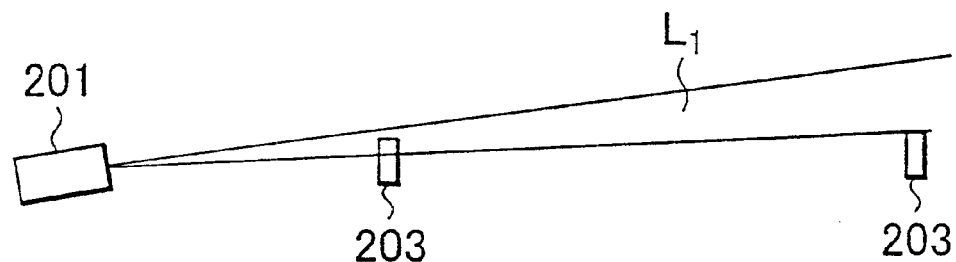

When the operator holds the movable unit 201 horizontally as illustrated in FIG. 49(A), the emitted laser beam L1 (L2, L3) correctly impinges on the line sensor 203. On the other hand, if the operator orients the movable unit 201 slightly upward with respect to the horizontal plane as illustrated in FIG. 49(B), the laser beam L1 impinges on the line sensor 203 if the distance from the movable unit 201 to the line sensor 203 is relatively short, whereas the laser beam L1 will not impinge on the line sensor 203 if the distance is long.

Figure 50:
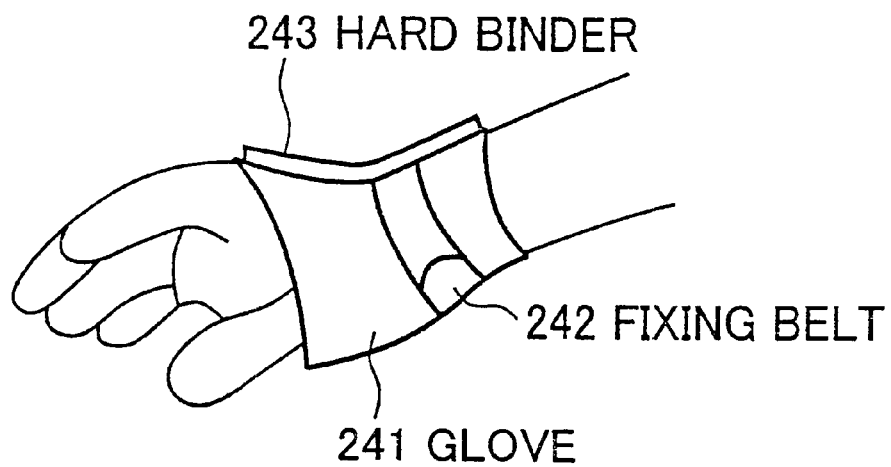
FIG. 50 is a diagram for explaining a glove.

Therefore, the operator is forced to wear a glove 241 which is fixed on a wrist by a belt 242, for example, as illustrated in FIG. 50. A hard binder 243 is adhered on the back side of the glove 241, so that the operator can bend the wrist within the horizontal plane, but hardly bends it in the perpendicular direction. As a result, the state as illustrated in FIG. 49(B) is limited.

Figure 51:
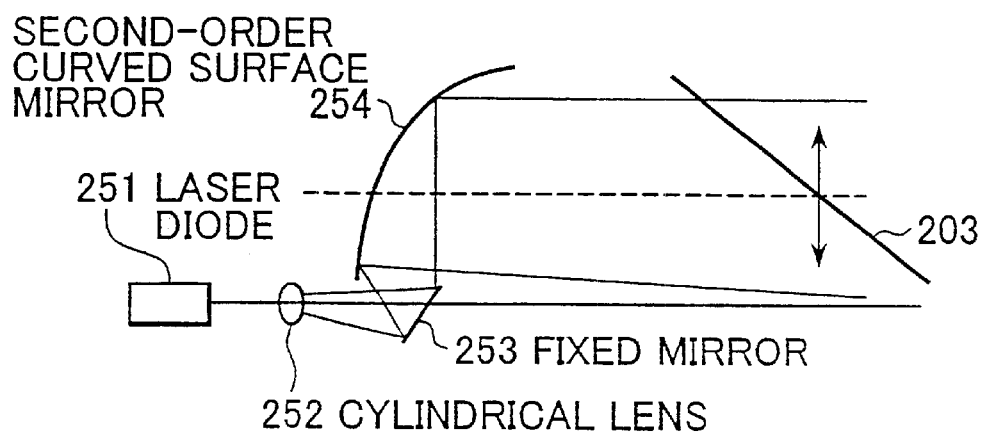
FIG. 51 is a diagram for explaining an optical system for generating collimated light.

Alternatively, as illustrated in FIG. 51, a laser beam emitted from a laser diode 251 is transformed by a cylindrical lens 252 to a laser beam, the cross section of which is in the shape of flat plate, and this laser beam is directed to a fixed mirror 253 positioned at the focal point of a second-order curved surface mirror 254. Then, the laser beam reflected by the fixed mirror 253 is reflected by the second-order curved surface mirror 254, converted to substantially collimated light which is emitted to the line sensor 203. In this way, since the line sensor 203 receives substantially collimated light having the cross section in the shape of flat plate which is long in the vertical direction, it is possible to limit variations in the amount of received light due to the position, whether the line sensor 203 is at a nearby position or at a remote position.

Figure 52:
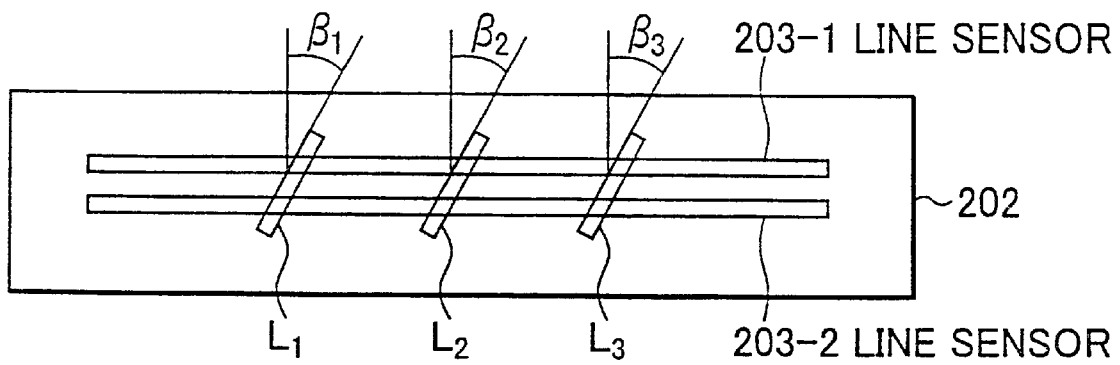
FIG. 52 is a diagram for explaining the positioning of a laser beam for detecting the three-dimensional coordinates and posture of the movable unit.

In the foregoing, one line sensor 203 is provided, and the three laser beams L1 to L3 are directed to impinge substantially perpendicular to the line sensor 203 as illustrated in FIG. 41. Alternatively, as illustrated in FIG. 52, two line sensors may be provided as 203-1, 203-2, and the laser beams L1 to L3 may be inclined by angles β1 to β3 with respect to the line sensors 203-1, 203-2. In this way, it is possible to detect not only the two-dimensional coordinates (X, Y) of the movable unit 201 but also three-dimensional coordinates (X, Y, Z) and a rotating angle with respect to each of the axes (posture).

Figure 53:
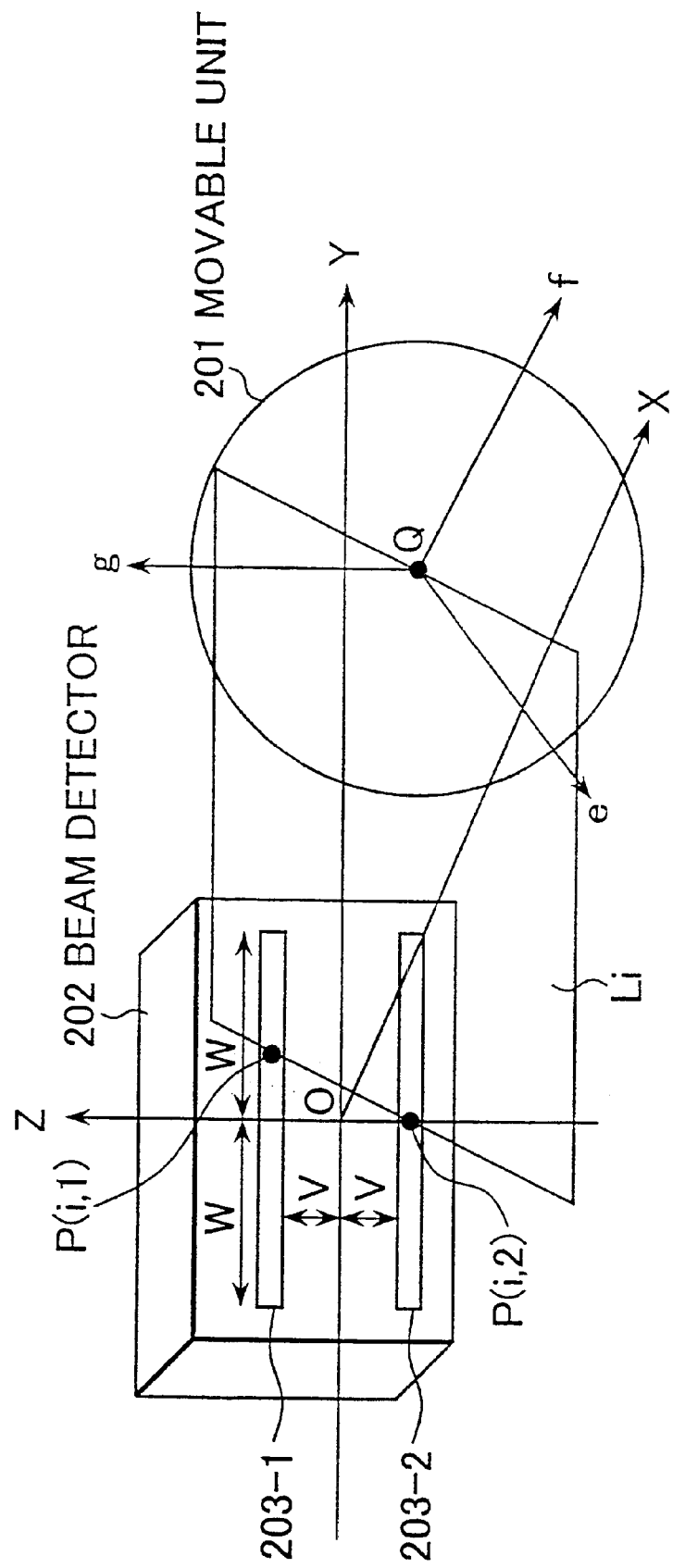
FIG. 53 is a diagram for explaining the principles of detecting the three-dimensional coordinates and posture of the movable unit.

Next, the principles will be explained. As illustrated in FIG. 53, a laser beam L1 (i=1, 2 or 3) impinges on two parallel line sensors 203-1, 203-2 at a predetermined angle βi. It should be noted that only one laser beam in the shape of flat plate L1 is illustrated in FIG. 53, this represents three laser beams.

Assume that an intersection formed by the laser beam Li on the line sensor 203-j (j=1 or 2) is P(i, j). The coordinates of intersections P(1, 1), P(1, 2), P(2, 1), P(2, 2), P(3, 1), P(3, 2) change in accordance with the three-dimensional position of the movable unit 201 (sensor head). Therefore, these points P(1, 2) to P(3, 2) can be measured to calculate the three-dimensional position and posture of the movable unit 151 using the values.

Assuming that a point in the middle of the line sensors 203-1 and 203-2 is defined as the origin O, the planes of the laser beams L1 to L3 are expressed by the following equations:

$$Z = a1 \times X + b1 \times Y + c1 \quad (21)$$

$$Z = a2 \times X + b2 \times Y + c2 \quad (22)$$

$$Z = a3 \times X + b3 \times Y + c3 \quad (23)$$

The line sensor 203-1 is represented by substituting Z=V, X=0 into the equations. In this event, a minimum value of Y is −W, while a maximum value of Y is W. V is the distance from the origin O to the line sensor 203-1 in the Z-axis direction.

Similarly, the line sensor 203-2 is represented by substituting Z=−V, X=0 into the equations. In this event, a minimum value of Y is −W, while a maximum value of Y is W.

When X=0 and Z=V are substituted in equation (21) to equation (23), the value of Y is calculated to be (V−ci)/bi. Also, when X=0, Z=−V are substituted, the value of Y is calculated to be (−V−ci)/bi. Thus, the three-dimensional coordinates of a point P(i, 1) are represented by (0, (V−ci)/bi, V), while the three-dimensional coordinates of a point P(i, 2) are represented by (0, (−V−ci)/bi, −V).

In the line sensor 203-1, assume that the value measured as the coordinates at which the laser beam L1 intersects the line sensor 203-1 is represented by f(i, 1). For simplicity, the relationship between the coordinates f and the three-dimensional coordinates are set as follows:

$$f(i, 1) = (V - ci)/bi \quad (24)$$

Similarly, in the line sensor 203-2, assuming that the value measured as the coordinates at which the laser beam L1 intersects the line sensor 203-2 is represented by f(i, 2), the following equation is established:

$$f(i, 2) = (-V - ci)/bi \quad (25)$$

The equations of the laser beams L1, L2, L3 change in accordance with a parallel movement of the center position Q of the movable unit 201 (sensor head 12), and rotation about axes e, f, g of the three-dimensional coordinates having the origin defined at the position Q. When the coordinate system Q, e, f, g is expressed from a coordinate system O, X, Y, Z, the following matrix (K) is derived:

$$\begin{bmatrix} K11 & K12 & K13 & K14 \\ K21 & K22 & K23 & K24 \\ K31 & K32 & K33 & K34 \\ 0 & 0 & 0 & 1 \end{bmatrix} = [K] \quad (26)$$

This matrix (K) expresses three degrees of freedom for the position, and three degrees of freedom for the posture. A vector (K11, K21, K31) included in this matrix (K) is a unit vector on a Q-e axis expressed by an O-XYZ coordinate system. A vector (K12, K22, K32) is a unit vector on a Q-f axis expressed by the O-XYZ coordinate system. Similarly, a vector (K13, K23, K33) is a unit vector on a Q-g axis expressed by the O-XYZ coordinate system. Further, a vector (K14, K24, K34) represents three-dimensional coordinates of the point Q when viewed from the O-XYZ coordinate system.

For an arbitrary point in a three-dimensional space, the following equation is established when a position vector expressed by the coordinate system O-XYZ is (X, Y, Z), and a position vector expressed by the Q-efg coordinate system is (e, f, g):

$$\begin{bmatrix} X \\ Y \\ Z \\ 1 \end{bmatrix} = [K] \begin{bmatrix} e \\ f \\ g \\ 1 \end{bmatrix} \quad (27)$$

A plane in the three-dimensional space can be expressed by a position vector at a leading end position of a perpendicular drawn from the origin of the coordinate system down to the plane. For example, assuming that the leading end position of the perpendicular is expressed by a position vector (r1, r2, r3), the following equation is established between this position vector and a position vector (X, Y, Z) at an arbitrary point on the plane for this position vector:

$$r1 \times X + r2 \times Y + r3 \times Z = \text{sqrt}(r1 \times r1 + r2 \times r2 + r3 \times r3) \quad (28)$$

where sqrt( ) in the above equation is a function for finding a square root.

Transforming equation (28) to an equation for a plane, the following is derived:

$$Z = (r1/r3) \times X + (-r2/r3) \times y + \text{sqrt}(r1 \times r1 + r2 \times r2 + r3 \times r3)/r3 \quad (29)$$

The equations for the planes of the laser beams L1, L2, L3, which are light in the shape of flat plate, expressed from the Q-efg coordinate system are fixed and known.

When the laser beams L1, L2, L3 are expressed in the Q-efg coordinate system, the followings are derived:

$$g = u1 \times e + v1 \times f + w1 \quad (30)$$

$$g = u2 \times e + v2 \times f + w2 \quad (31)$$

$$g = u3 \times e + v3 \times f + w3 \quad (32)$$

Each of the planes expressed by equation (30) to equation (32) corresponds to a position vector at a leading end of a perpendicular drawn from the point Q down to the plane. For the position indicated by the perpendicular position vector indicative of this plane, since the position and the posture of the movable unit 201 are in the state expressed by the matrix (K), a position vector viewed from the O-XYZ coordinate system is converted in accordance with equation (27). Corresponding to this conversion of the position vector, the equation for the plane is converted in accordance with equation (29). A point f(i, j) indicated by equation (24) and equation (25) is derived in accordance with a change in the equation for the plane.

Six equations are derived by observing the points f(1, 1), f(2, 1), f(3, 1), f(1, 2), f(2, 2), f(3, 2) as the coordinates of intersections of the two line sensors 203-1, 203-2 with the three planar laser beams L1 to L3. Since the matrix (K) has only six degrees of freedom, each element in the matrix (K)

can be found using the six equations. Thus, the position and the posture of the movable unit 201 (sensor head 12) are found by calculating (K) by the position calculating unit 24.

When the three-dimensional coordinates and the posture of the movable unit 201 (sensor head 12) are found in the foregoing manner, the aforementioned calibration processing and migration processing may be performed in accordance with the three-dimensional coordinates and the posture of the sensor head. In this way, the position can be more accurately detected.

Figure 54:
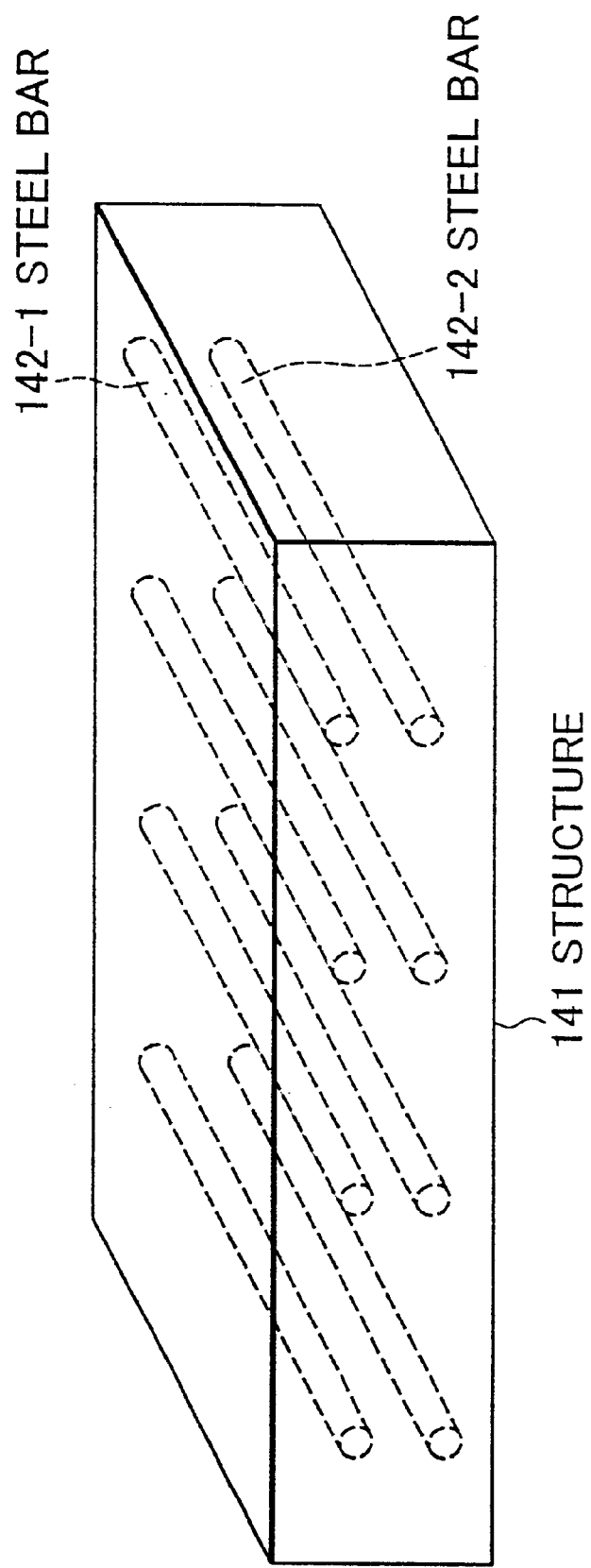
FIG. 54 is a perspective view illustrating the construction of a structure as a target under inspection.
Figure 55:
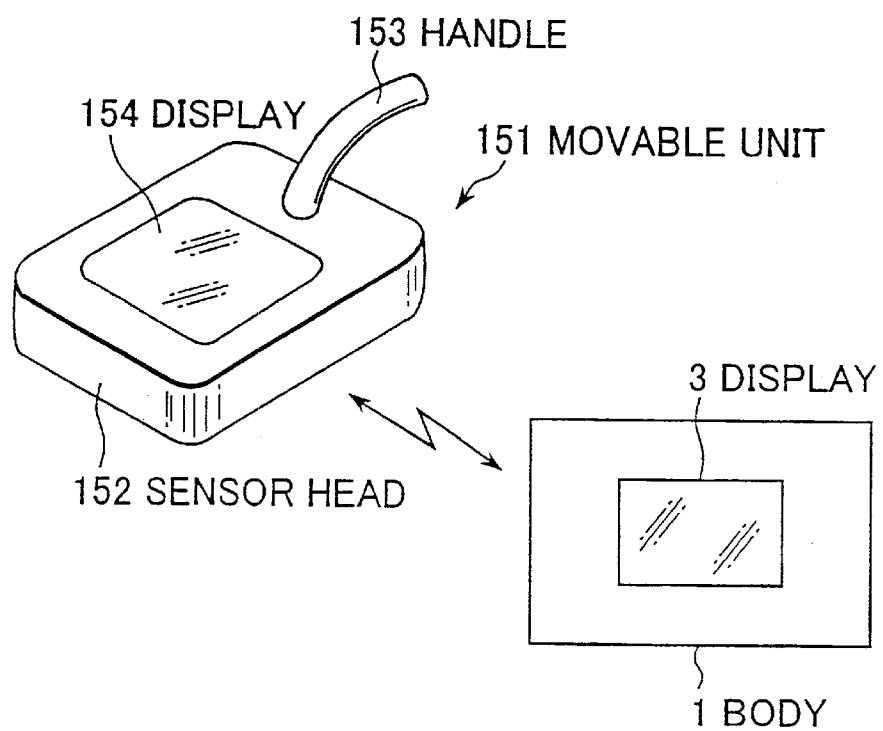
FIG. 55 is a diagram illustrating an exemplary configuration of an inspection apparatus for inspecting the structure in FIG. 54.

Next, description will be made on an inspection apparatus intended for inspection of concrete, rather than the ground, for inspecting steel bars within concrete. Specifically, in this event, steel bars 142-1, 142-2 are incorporated within a structure comprising reinforced concrete, as illustrated in FIG. 54. FIG. 55 illustrates an exemplary configuration of the inspection apparatus for inspecting the structure 141 as mentioned. As illustrated in this figure, the exemplary configuration comprises a body 1 and a movable unit 151. The movable unit 151 basically comprises a sensor head 152. The sensor head 152 is provided with a handle 153 such that the operator grabs the handle 153 with a hand to operate the scanning. The sensor head 152 is also provided with a display 154 on the top surface. The movable unit 151 and the body 1 can wirelessly communicate with each other.

Figure 56:
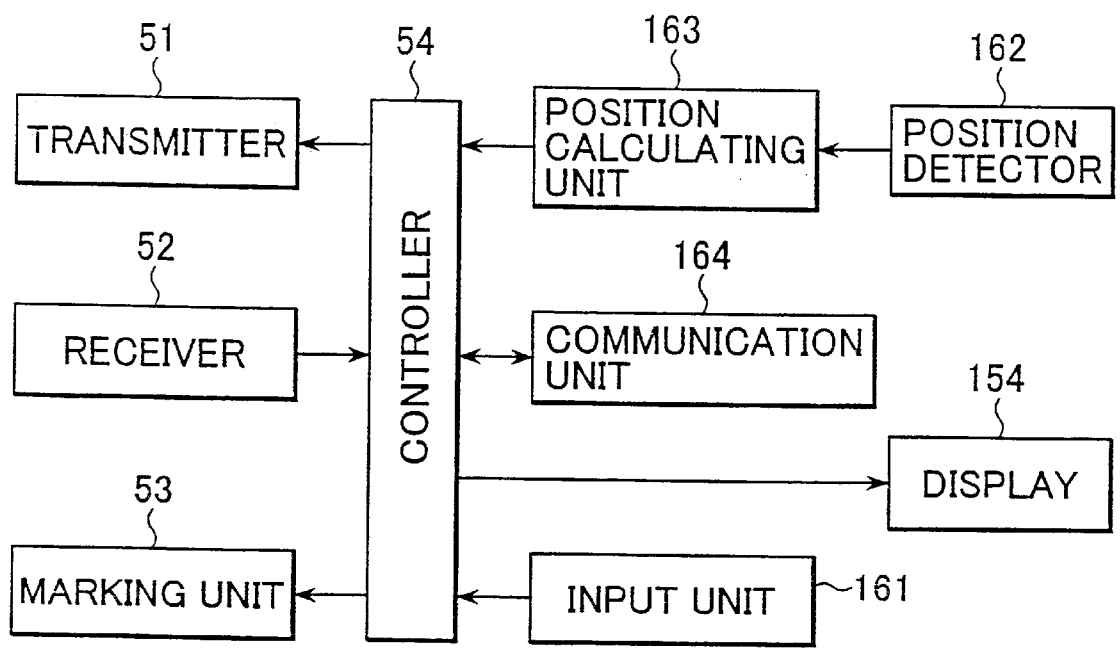
FIG. 56 is a block diagram illustrating an exemplary internal configuration of a sensor head 152 in FIG. 55.

FIG. 56 illustrates an exemplary internal configuration of the sensor head 152. A transmitter 51 to a controller 54 has similar functions to those in the sensor head 12 illustrated in FIG. 2. A position detector 162 comprises a gyro, a compass or the like for detecting the position of the sensor head 152. A position calculating unit 163 calculates the position of the sensor head 152 from the output of the position detector 162, and outputs the result of the calculation to the controller 54. An input unit 161 comprises buttons, switches and so on, and is manipulated by the operator for entering a scan start position and so on. A communication unit 164 wirelessly communicates with the body 1. The display 154 displays the same image as that on the display unit 3 on the body 1 by the controller 54.

Figure 57:
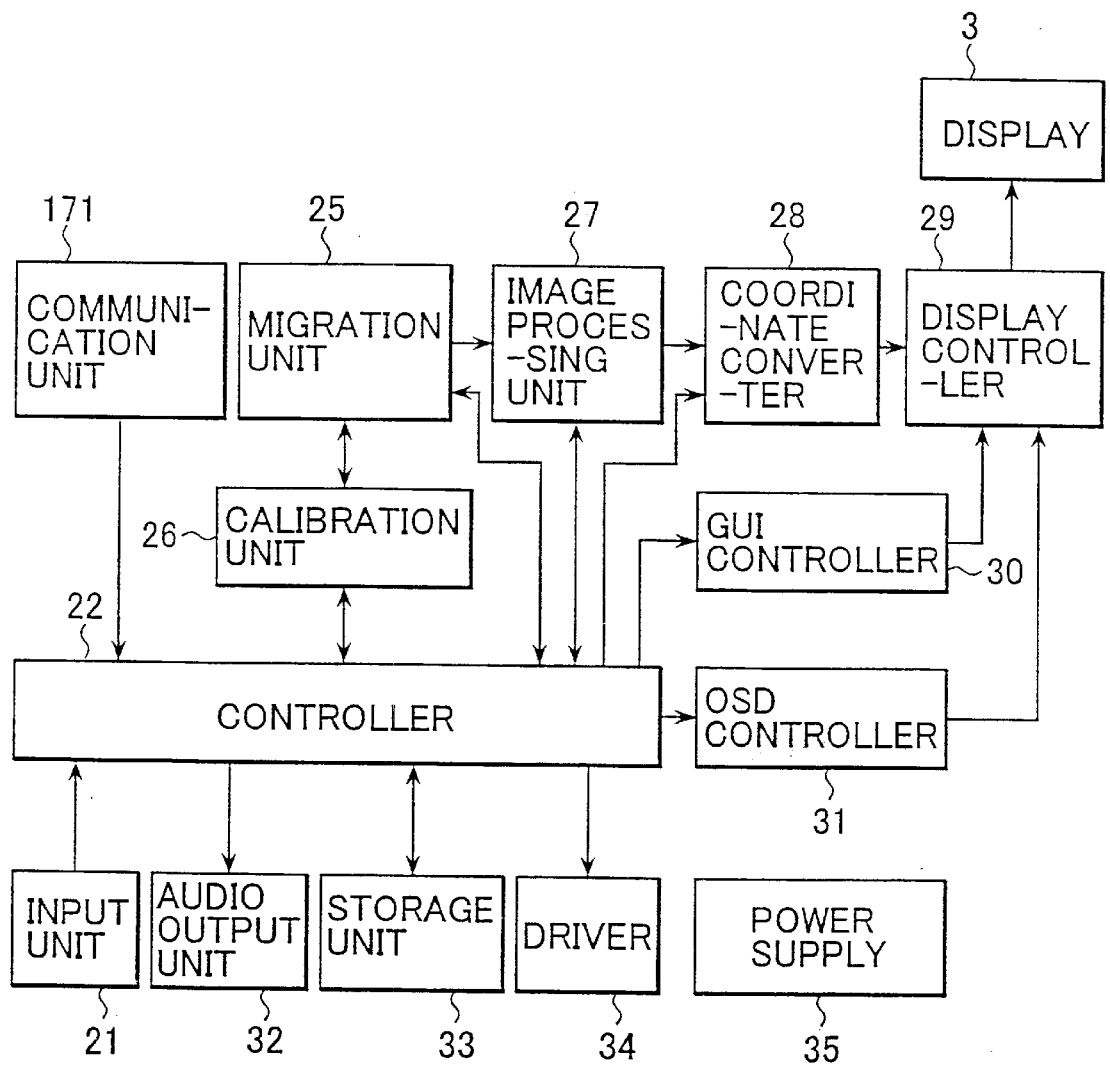
FIG. 57 is a block diagram illustrating an exemplary internal configuration of a body 1 in FIG. 55.

FIG. 57 illustrates an exemplary internal configuration of the body 1. While the basic configuration thereof is similar to that illustrated in FIG. 2, the position detector and the position calculating unit are disposed in the sensor head 152 in this exemplary configuration, so that the position detector 23 and the position calculating unit 24 illustrated in FIG. 2 are omitted. In addition, the communication unit 171 wirelessly communicates with the communication unit 164 of the sensor head 152. The rest of the configuration is similar to that in FIG. 2.

Next, the operation will be explained with reference to flow charts of FIGS. 58 to 62. First, at step S81, calibration processing is performed. Although this calibration processing is basically similar to the processing at step S1 in FIG. 15, the structure 141 does not permit an object to be buried therein for purposes of testing, a proper position at which a steel rod is buried inside may be empirically scanned for detection, and the calibration processing may be performed there.

At step S82, the operator manipulates the input unit 21 to select a scan mode, a plane display mode, a lateral cross section display mode, a bottom cross section display mode, or a three-dimensional object image display mode. At step S83, the controller 22 determines whether or not the scan mode has been selected at step S82. When the scan mode has been selected, the processing proceeds to step S84, where the operator places the sensor head 152 on a scan start position, and manipulates the input unit 161 of the sensor head 152 to instruct the start of scanning. In this event, the controller 54 controls the position controller 162 to start position detection processing for the sensor 152 with a current position defined as a reference point. As a result, the position calculating unit 163 subsequently calculates the position of the sensor head 152 from the output of the position detector 162 on a coordinate axis with reference to this reference point, and outputs the result of the calculation to the controller 54.

Figure 63:
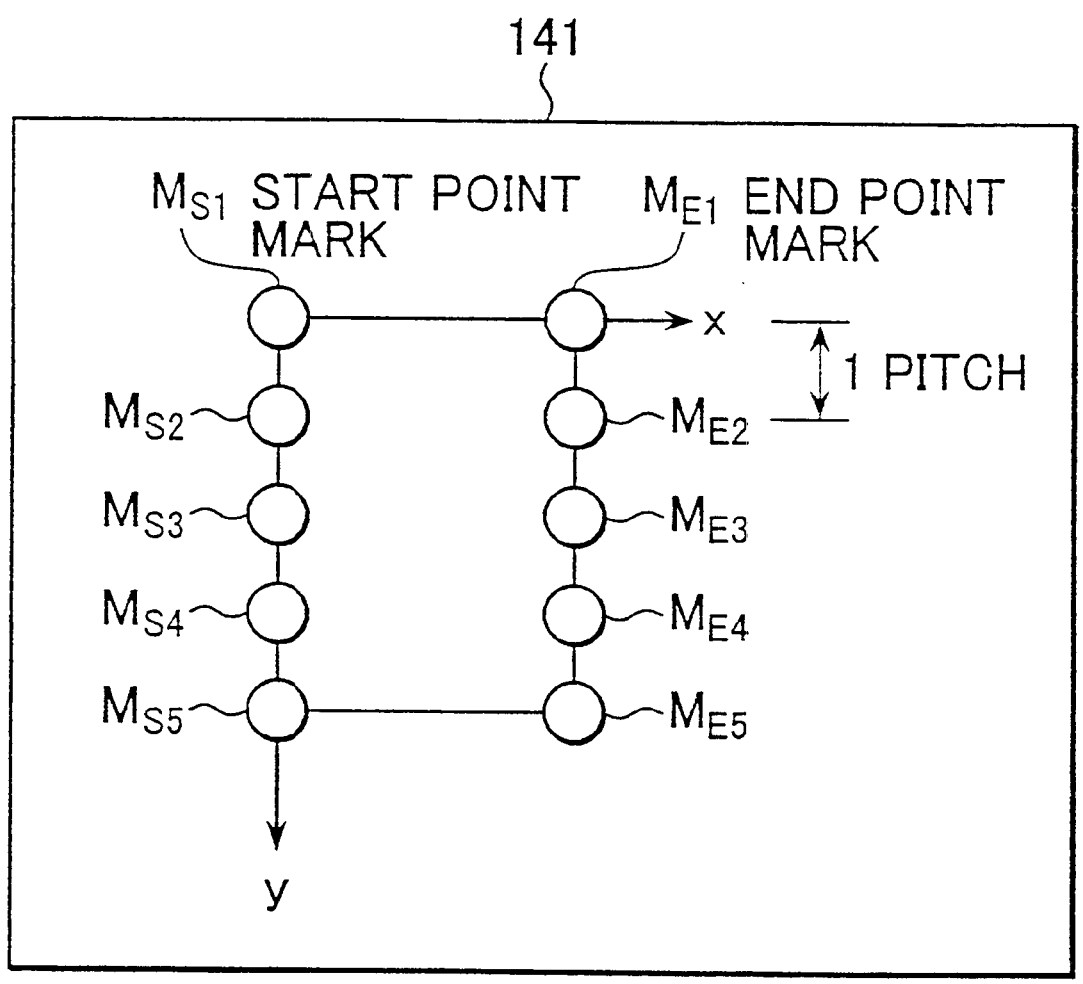
FIG. 63 is a diagram for explaining marking.

When the start of the scanning operation is instructed through the input unit 161, the controller 54 controls the marking unit 53 to execute marking for indicating a start point at step S85. Specifically, in this event, a paint is discharged from the marking unit 53 onto the structure 141, and a start point mark MS1 is marked as illustrated in FIG. 63.

Next, the processing proceeds to step S86, where the operator scans the sensor head 152 in a main scan direction (x-axis direction) for the scanning operation. With this scanning operation, the controller 22 controls the image processing unit 27 to execute image processing at step S87.

Specifically, the controller 54 forces the transmitter 51 to generate an electromagnetic wave, and measures a propagation time when the receiver 52 receives its reflected wave. The controller 54 transmits position information and the propagation time input from the receiver 52 to the body 1 through the communication unit 164.

In the body 1, the communication unit 171 receives the position information and propagation velocity information transmitted from the communication unit 164 of the sensor head 152, and outputs them to the controller 22. The controller 22 outputs the information to the migration unit 25. The migration unit 25 performs migration processing based on the input information, converts the propagation time to a depth z, and outputs three-dimensional coordinate data to the image processing unit 27. The image processing unit 27 generates a three-dimensional image representative of the state inside of the structure 141 based on the input information.

The image processing unit 27 stores the generated three-dimensional image in the storage unit 33 through the controller 22.

At step S88, the controller 22 determines from the x-coordinate transmitted thereto from the sensor head 152 whether or not a previously set end point in the main scan direction has been reached. If the controller 22 determines that the scan position has not reached the end point in the main scan direction, the processing returns to step S86 to repetitively execute the processing subsequent thereto. If the controller 22 determines at step S88 that the end point in the main scan direction has been reached, the processing proceeds to step S89, where the controller 22 controls the audio output unit 32 to output an audio signal announcing that the scan position has reached the end point in the main scan direction. Also, the controller 22 controls the communication unit 171 to output a command for executing end point marking processing to the sensor head 152.

The controller 54 of the sensor head 152, upon receipt of this command through the communication unit 164, controls the marking unit 53 to execute marking indicative of the end point in the main scan direction. Specifically, in this event, the marking unit 53 discharges a paint onto the structure 141 to form an end point mark ME1.

Next, the processing proceeds to step S90, where the operator moves the sensor head 152 by one pitch in a sub-scan direction (y-axis direction). The controller 22 determines at step S91 whether or not the position after the movement has reached an end point in the sub-scan direction. This determination is made by determining whether or not the y-coordinate after the movement of one pitch is larger than the y-coordinate at a previously set end point in the sub-scanning direction.

If the controller 22 determines at step S91 that the position after the movement of one pitch has not reached the end point in the sub-scan direction, the processing returns to step S86 to repetitively execute the processing subsequent thereto.

The foregoing processing from step S86 to step S91 is repetitively executed until the controller 22 determines at step S91 that the sensor head 152 has reached the end point in the sub-scan direction. In this way, as illustrated in FIG. 63, the start point mark MS1 is marked at the starting point on the starting point of the left side of the scan range, a start point mark MS5 is marked at the end point of the start point, and start point marks MS2 to MS4 are marked at every one pitch in between. Similarly, the end point mark ME1 is marked at the start point of the end point of the right side of the search range, and an end point mark ME5 is marked at the end point of the end point. Then, between them, end point marks ME2 to ME4 are marked at every one pitch.

In this way, the operator can recognize the inspected range on the structure 141.

When the controller 22 determines at step S91 that the position in the sub-scan direction has reached the end point, the processing proceeds to step S92, where the operator determines whether or not the scanning operation is terminated. When not terminated, the processing returns to step S82 to repetitively execute the processing subsequent thereto. When the operator determines at step S92 that the inspection processing is terminated, the operator manipulates the input unit 21 to instruct the termination of the processing. The controller 22, in response to this instruction, terminates the inspection operation. This instruction is transmitted to the sensor head 152 through the communication unit 171. The controller 54 of the sensor head 152, upon receipt of the termination instruction through the communication unit 164, terminates the control for the respective components.

Figure 64:
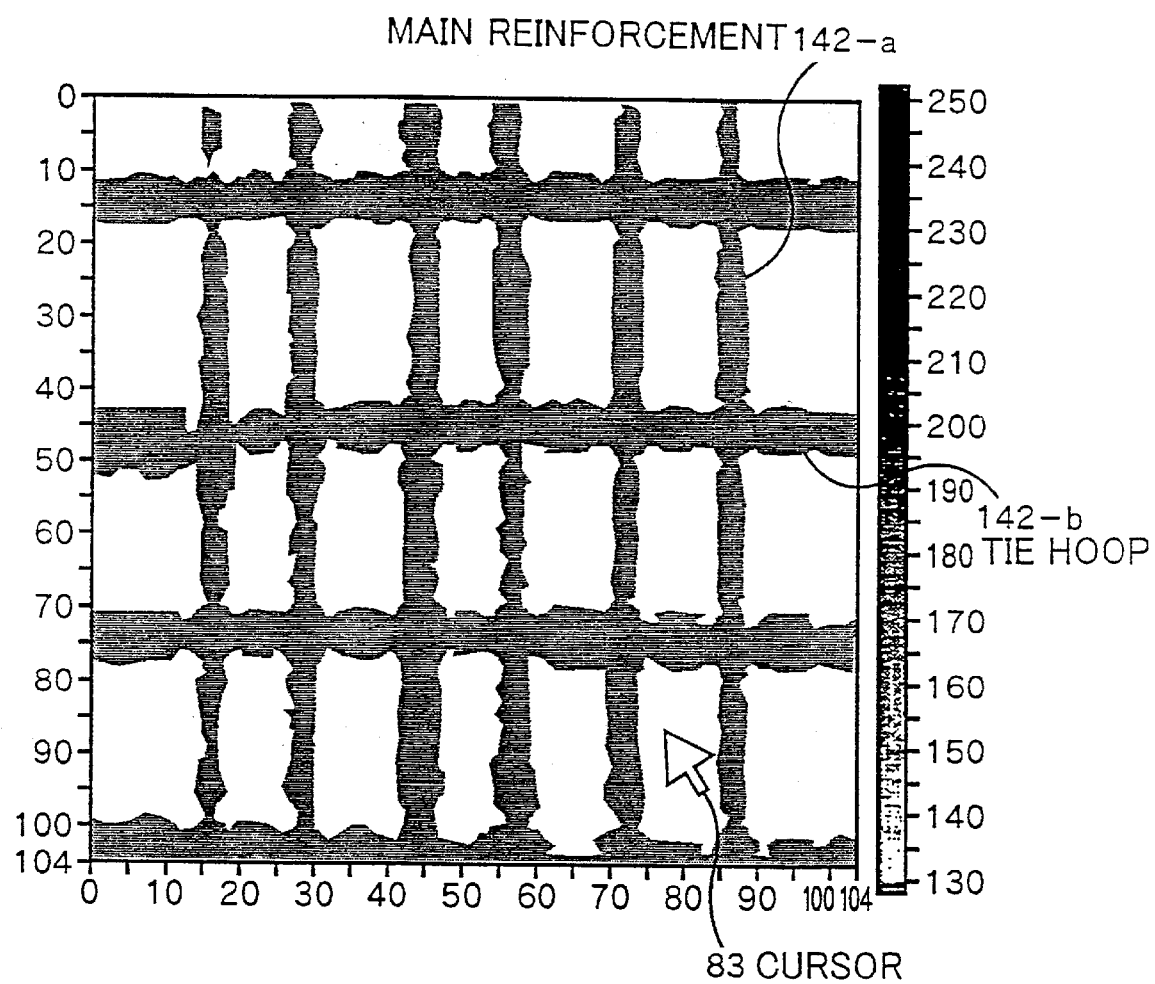
FIG. 64 is a diagram illustrating an exemplary display of a plane cross section.

When the controller 22 determines at step S83 that the scan mode is not selected, the processing proceeds to step S93, where the controller 22 determines whether or not the selected mode is the three-dimensional object image display mode. When the controller 22 determines that the selected mode is not the three-dimensional object image display mode, the processing proceeds to step S94, where the controller 22 determines whether or not the selected mode is the plane display mode. When the selected mode is the plane display mode, the processing proceeds to step S95, where the controller 22 executes plane display processing. Specifically, in this event, the controller 22 controls the image processing unit 27 to read data required to generate a plane cross section image at a predetermined depth, which has been previously set, from the storage unit 33 through the controller 22 to generate plane cross section image. Then, this image data is input to the coordinate converter 28, where it is converted to two-dimensional image data on the display 3. This two-dimensional image data is output to and displayed on the display 3 through the display controller 29. In this way, a plane cross-sectional view at a predetermined depth is displayed on the display 3, for example, as illustrated in FIG. 64. In this exemplary display, main reinforcements 142-*a* and tie hoops 142-*b* are displayed as black images.

It should be noted that a similar image is also displayed on the display 154 on the sensor head 152. For this purpose, the output of the display controller 29 is supplied to the controller 22, and the controller 22 outputs this data to the sensor head 152 through the communication unit 171. The controller 54 of the sensor head 152, upon receipt of this data transmission through the communication unit 164, outputs the data to the display 154 for display.

Next, at step S96, processing for superimposing a cursor on the display is executed corresponding to the position of the sensor head 152. Specifically, the controller 22 has received from the sensor head 152 data indicative of its position, and forces the OSD controller 31 to generate the cursor corresponding to this position. The figure of the cursor is output to and displayed on the display 3 through the display controller 29. In FIG. 64, this cursor is shown as a cursor 83. It should be noted that this cursor is also displayed on the display 154 on the sensor head 152.

Next, the processing proceeds to step S97, where the operator determines whether or not the depth of a plane cross section displayed on the display 3 need be changed. When a change is required, the processing proceeds to step S98, where the operator enters a depth of the plane cross section to be displayed on the display 3 from the input unit 21. After the depth is entered, the processing returns to step S95, where the controller 22 controls the image processing unit 27 to generate and display a plane cross section image at the specified depth. In this way, the operator can display the plane cross-sectional view at the specified depth on the displays 3, 154.

When the operator determines at step S97 that the depth need not be changed, the operator determines at step S99 whether the scaling factor need be changed. When the scaling factor need be changed, the processing proceeds to step S100, where the operator manipulates the input unit 21 to make an entry for specifying a scaling factor. After the scaling factor is entered, the controller 22 controls the coordinate converter 28 to generate an image at the specified scaling factor. Subsequently, the processing returns to step S95, where the image at the scaling factor changed by the coordinate converter 28 is displayed on the display 3 (display 154).

When the operator determines at step S99 that the scaling factor need not be changed, the processing proceeds to step S101, where the operator determines whether or not marking is required. When determining that the marking is required, the operator executes marking processing at step S102. Specifically, in this event, the operator manipulates the input unit 161 to instruct the marking. Then, the controller 54 controls the marking unit 53 to discharge a paint. In this way, the operator, viewing a plane cross section image as illustrated in FIG. 64, manipulates the input unit 161 of the sensor unit 152 at a location where a main reinforcement 142-*a* or a tie hoop 142-*b* is likely to have a problem to mark this location (add a mark).

After the processing at step S102, the processing returns to step S95 to repetitively execute the processing subsequent thereto.

When the operator determines at step S101 that the marking is not required, the processing proceeds to step S103, where the operator determines whether or not the plane display processing is terminated. When the plane display processing need not be terminated, the processing returns to step S95 to repetitively execute the processing subsequent thereto.

Figure 65:
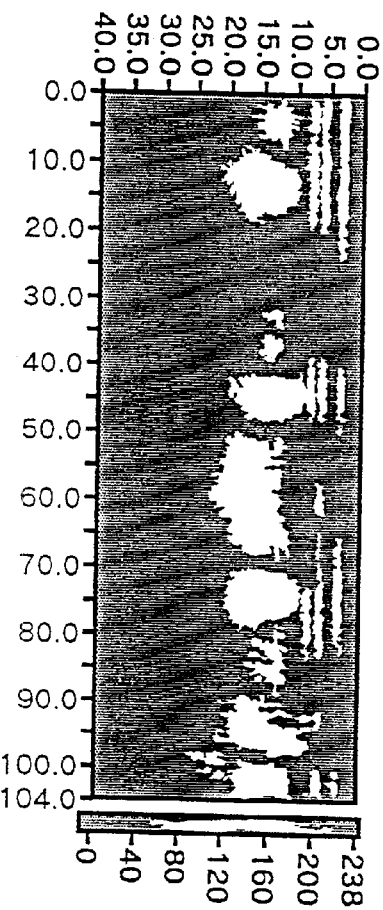
FIG. 65 is a diagram illustrating an exemplary display of a lateral cross section.

When the controller 22 determines at step S94 that the selected mode is not the plane display mode, the processing proceeds to step S104, where the controller 22 determines whether or not the selected mode is the lateral cross section display mode. When the selected mode is the lateral cross section display mode, the processing proceeds to step S105, where lateral cross section display processing is executed near the position of the cursor. Specifically, in this event, the controller 22 requests the image processing unit 27 to generate a lateral cross section at a position at which the cursor 83 lies on the plane cross-sectional view. The image processing unit 27, in response to this request, generates image data of a lateral cross section, with the position of the cursor 83 on the plane cross section defined as a reference, from the storage unit 33, and displays this image data on the display 3 (display 154). In this way, an image, for example, as illustrated in FIG. 65 is displayed on the display 3 (display 154). In this figure, a scale for the depth is displayed from right to left. Therefore, in the figure, the right side represents the surface, and the value of the depth becomes larger toward the left of the figure.

Next, the processing proceeds to step S106, where the operator determines whether or not the position of the sensor head 152 need be changed. When the position need be changed, the processing proceeds to step S107, where the operator moves the sensor head 152 to a predetermined position. In this way, the position of the cursor 83 indicated in FIG. 65 is moved corresponding to the position of the sensor head 152. Subsequently, the processing returns to step S105 to perform the lateral cross section display processing for the position of the cursor 83 after the movement. In this way, the operator can move the sensor head 152 to a predetermined position (move the cursor 83 to a predetermined position) to display a lateral cross section corresponding to that position on the display 3 (display 154).

When the operator determines at step S106 that the position of the sensor head 152 need not be changed, the processing proceeds to step S108, where the operator determines whether or not the scaling factor need be changed. When the scaling factor need be changed, the processing proceeds to step S109, where the operator manipulates the input unit 21 to enter a scaling factor. When the scaling factor is specified, the controller 22 controls the coordinate converter 28 to execute a coordinate conversion for the specified scaling factor. Subsequently, the processing returns to step S105 to execute the processing subsequent thereto. In this way, an image of a lateral cross section at the specified scaling factor is displayed on the display 3 (display 154).

When the operator determines at step S108 that the scaling factor need not be changed, the processing proceeds to step S110, where the operator determines whether or not the lateral cross section display processing is terminated. When the lateral cross section display processing is not yet terminated, the processing returns to step S105 to repetitively execute the processing subsequent thereto.

Figure 66:
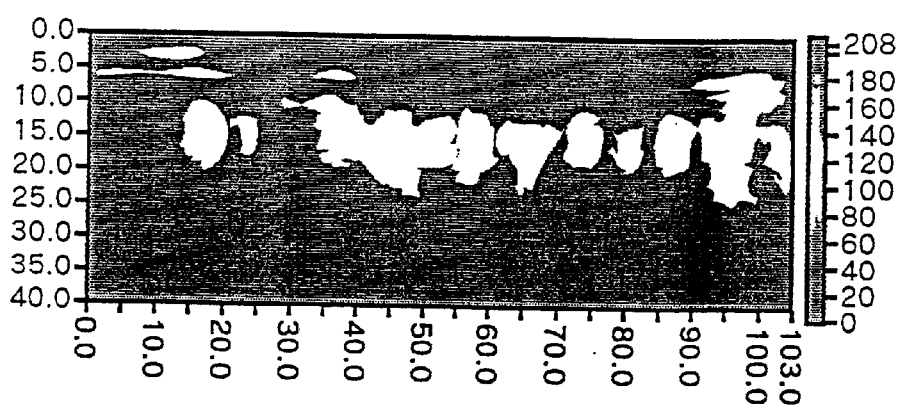
FIG. 66 is a diagram illustrating an exemplary display of a bottom cross section.

When the controller 22 determines at step S104 that the selected mode is not the lateral cross section display mode, this results in that the selected mode is the bottom cross section display mode. In this event, the processing proceeds to step S111, where the controller 22 instructs the execution of bottom cross section display processing near the position of the cursor. In this way, a bottom cross-sectional view with the position of the cursor 83 in FIG. 64 defined as a reference is processed in a manner similar to the lateral cross section image display processing for display on the display 3 (display 154). FIG. 66 illustrates an exemplary display in this case. As illustrated in this figure, the image in this event is such that the topmost side of the screen indicates the surface of the structure 141, and the depth is larger toward the lower side.

Subsequently, while processing from step S112 to step S116 is executed, this processing is similar to the aforementioned processing from step S106 to step S110 in FIG. 60, so that explanation thereof is omitted. Specifically, in this event, a bottom cross-sectional view at an arbitrary position can be displayed as well by moving the sensor head 152 to a predetermined position (by moving the cursor 83 to the arbitrary position), and its scaling factor can also be changed as required.

Figure 67:
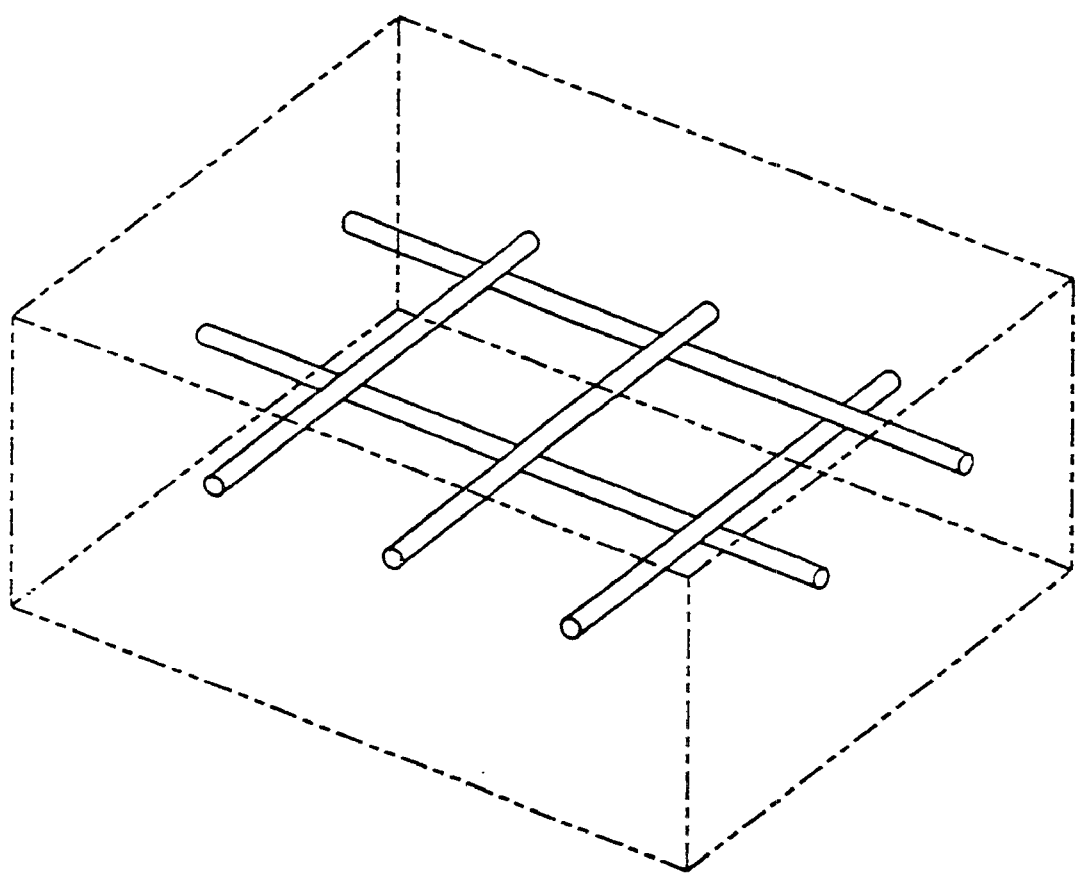
FIG. 67 is a perspective view illustrating an exemplary display of an image of a three-dimensional object.

When the controller 22 determines at step S93 that the selected mode is the three-dimensional object image display mode, the processing proceeds to step S117, where three-dimensional object image display processing is executed. Specifically, in this event, the controller 22 controls the image processing unit 27, and forces the image processing unit 27 to generate three-dimensional image data representative of a state inside of the structure 141 within a range specified by the operator through manipulations on the input unit 21. In this way, a three-dimensional image representative of an internal structure, for example, as illustrated in FIG. 67, is displayed on the display 3 (display 154).

The operator determines at step S118 whether or not the orientation of the three-dimensional object image need be changed. When a change is required, the processing proceeds to step S120, where the operator manipulates the input unit 21 to enter the orientation of the three-dimensional object image. In this event, the controller 22 returns to step S117, where it instructs the image processing unit 27 to generate image data corresponding to the specified orientation. The image processing unit 27, in response to this instruction, generates data of the three-dimensional object image corresponding to the specified orientation, and displays the same on the display 3 (display unit 154).

When the operator determines at step S118 that the orientation need not be changed, the processing proceeds to step S119, where the operator determines whether or not the three-dimensional object image display processing is terminated. When the three-dimensional object image display processing need not be terminated, the processing returns to step S117 to repetitively execute the processing subsequent thereto.

When the operator determines at step S103, step S110, step S116 or step S119 that the display processing is terminated, the processing returns to step S92 to execute the processing subsequent thereto.

While in the foregoing, either a plane cross-sectional view, a lateral cross-sectional view or a bottom cross-sectional view is individually displayed, they may be simultaneously displayed, for example, as illustrated in FIG. 68. Alternatively, as illustrated in FIG. 69 or in FIG. 70, a plane cross-sectional view and a lateral cross-sectional view may be displayed simultaneously, or a plane cross-sectional view and a bottom cross-sectional view may be displayed simultaneously.

However, for displaying a plurality of cross-sectional views simultaneously in this way, their x-coordinates or y-coordinates are preferably displayed at positions corresponding to the plane cross-sectional view. This permits the operator to promptly understand a positional relationship.

Figure 71:
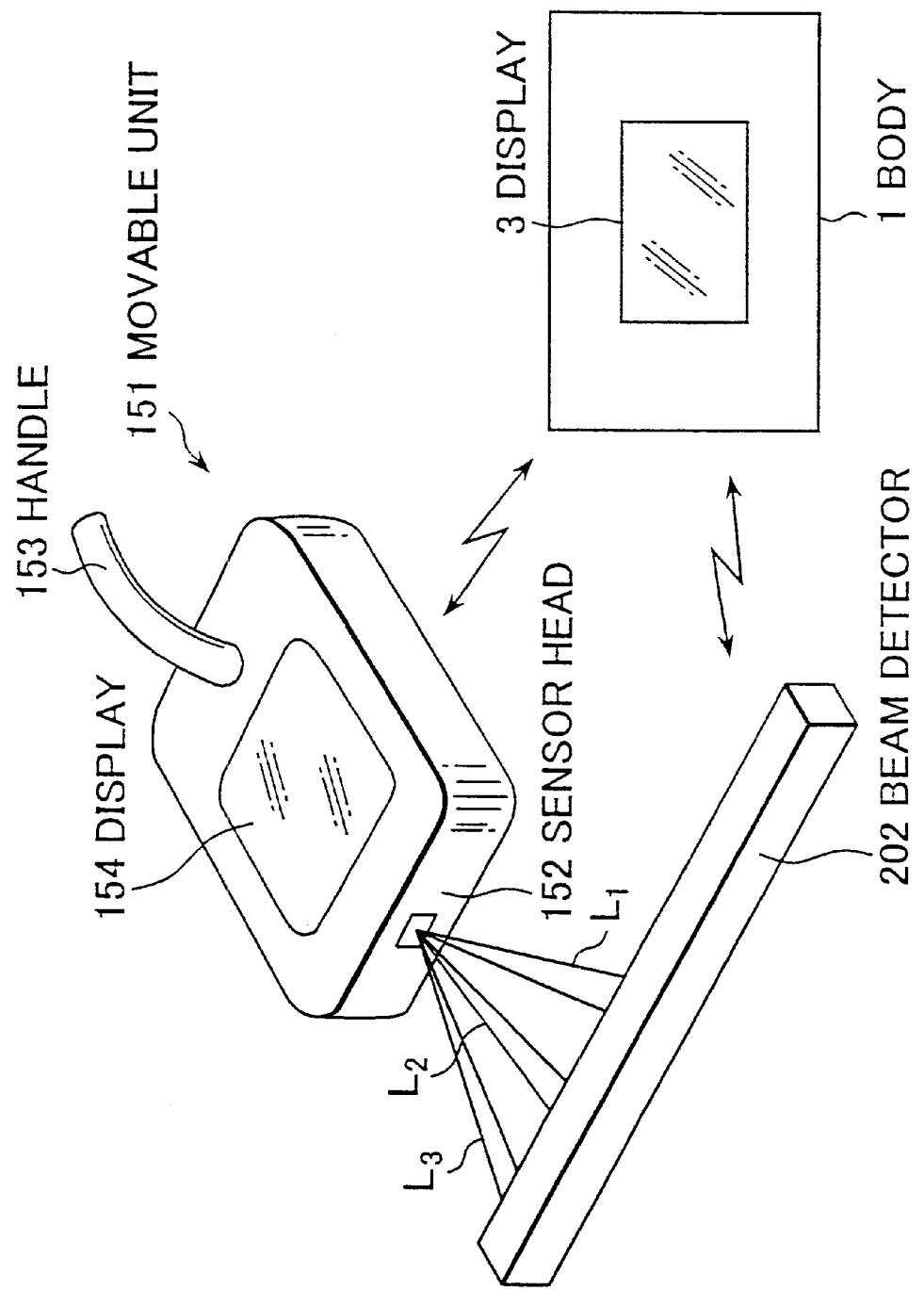
FIG. 71 is a diagram illustrating a further exemplary configuration of an inspection apparatus to which the present invention is applied.

The method of detecting the position of the movable unit 201 using the beam detector 202, explained with reference to FIGS. 40 to 43, may be applied to an inspection apparatus for inspecting the interior of concrete or the like. FIG. 71 illustrates an exemplary configuration for this case. In this exemplary configuration, three laser beams L1 to L3 are emitted from the movable unit 151 to the beam detector 202. Then, the beam detector 202 can wirelessly communicate with the body 1. The rest of the configuration is similar to that in FIG. 55.

Figure 72:
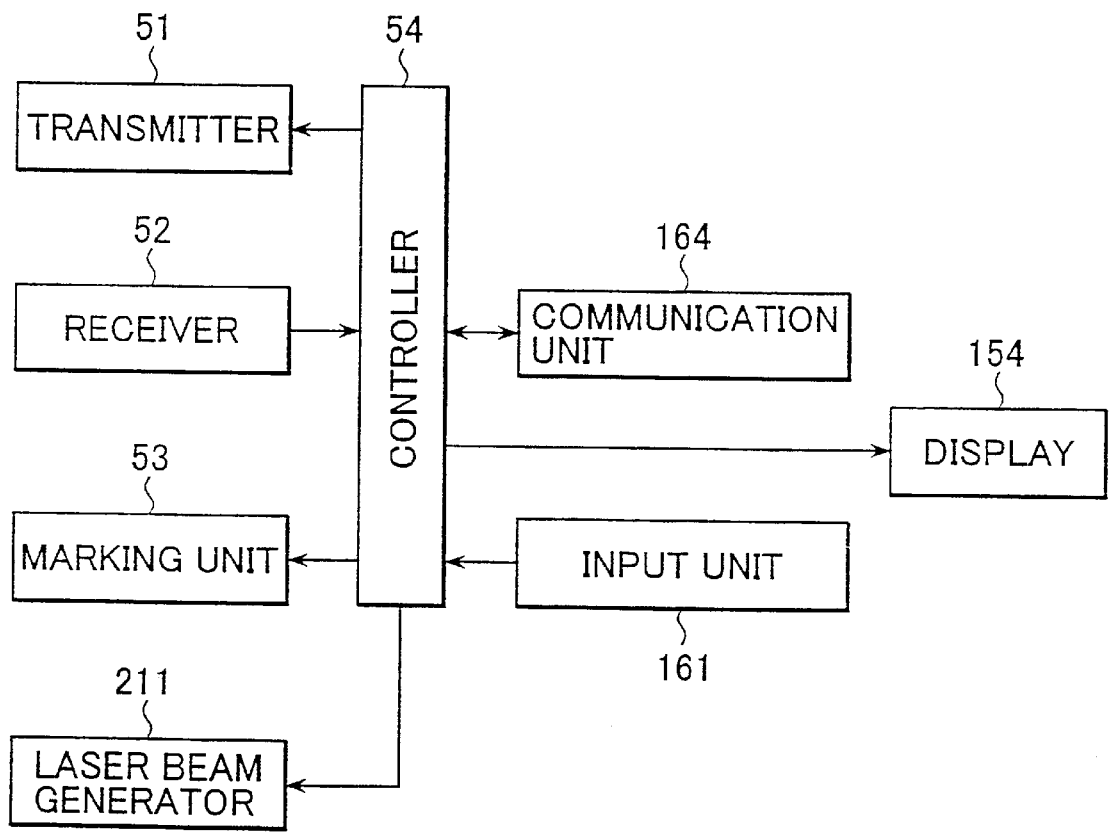
FIG. 72 is a block diagram illustrating an exemplary configuration of a sensor head 152 in FIG. 71.

In this case, the sensor head 152 forming part of the movable unit 151 is configured as illustrated in FIG. 72. While its basic configuration is similar to that illustrated in FIG. 56, the laser beam generator 211 is controlled by the controller 54, in this example, to generate the three laser beams L1 to L3. In addition, the position detector 162 and the position calculating unit 163 in FIG. 56 are omitted.

Figure 73:
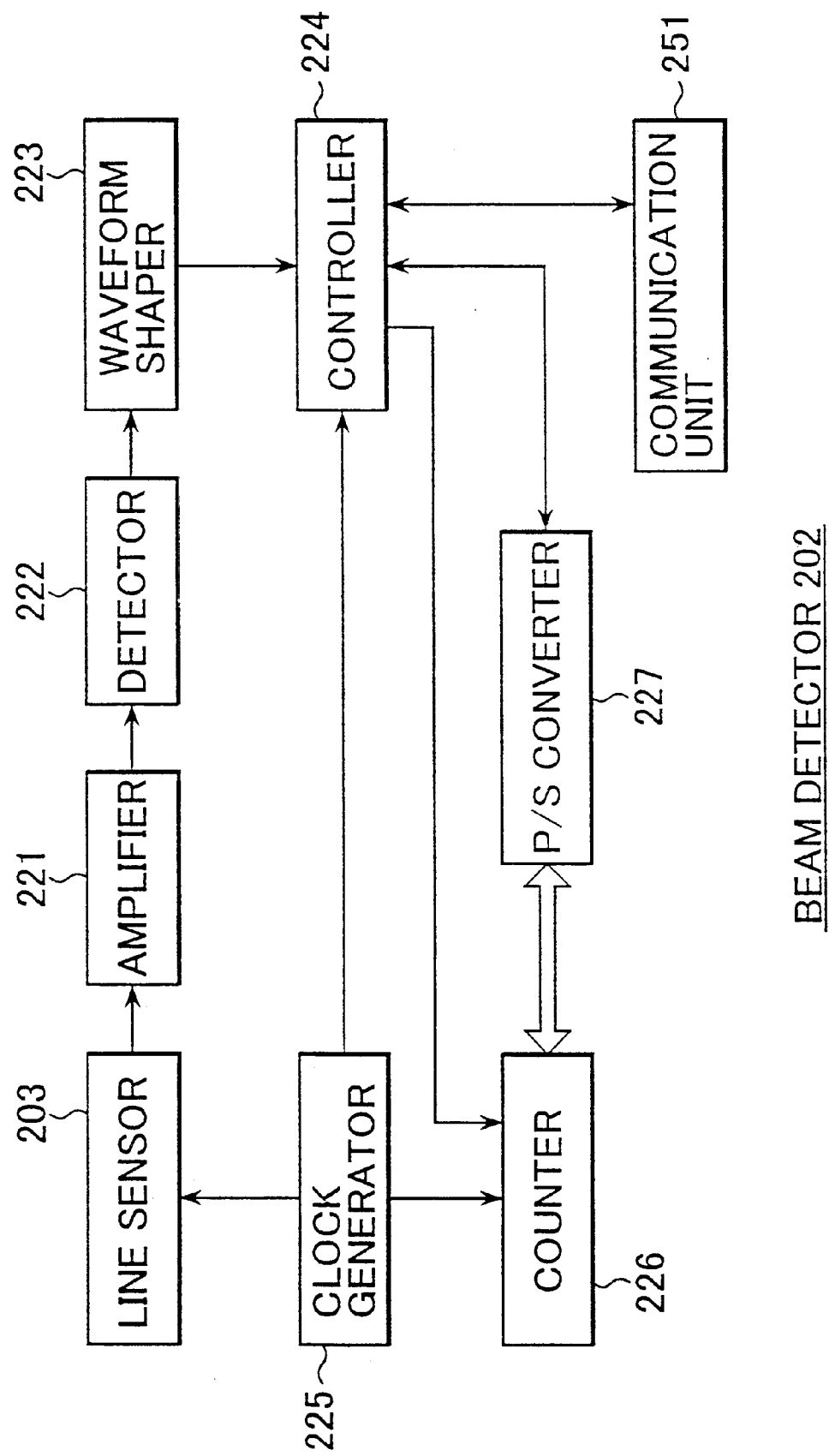
FIG. 73 is a block diagram illustrating an exemplary configuration of a beam detector 202 in FIG. 71.

The beam detector 202 is configured as illustrated in FIG. 73. While its basic configuration is similar to that illustrated in FIG. 43, a communication unit 251 is provided in this example, such that the controller 224 wirelessly transmits a count value of the counter 226 captured by the P/S converter 227 from the communication unit 251 to the body 1. The rest of the configuration is similar to that in FIG. 43.

Figure 74:
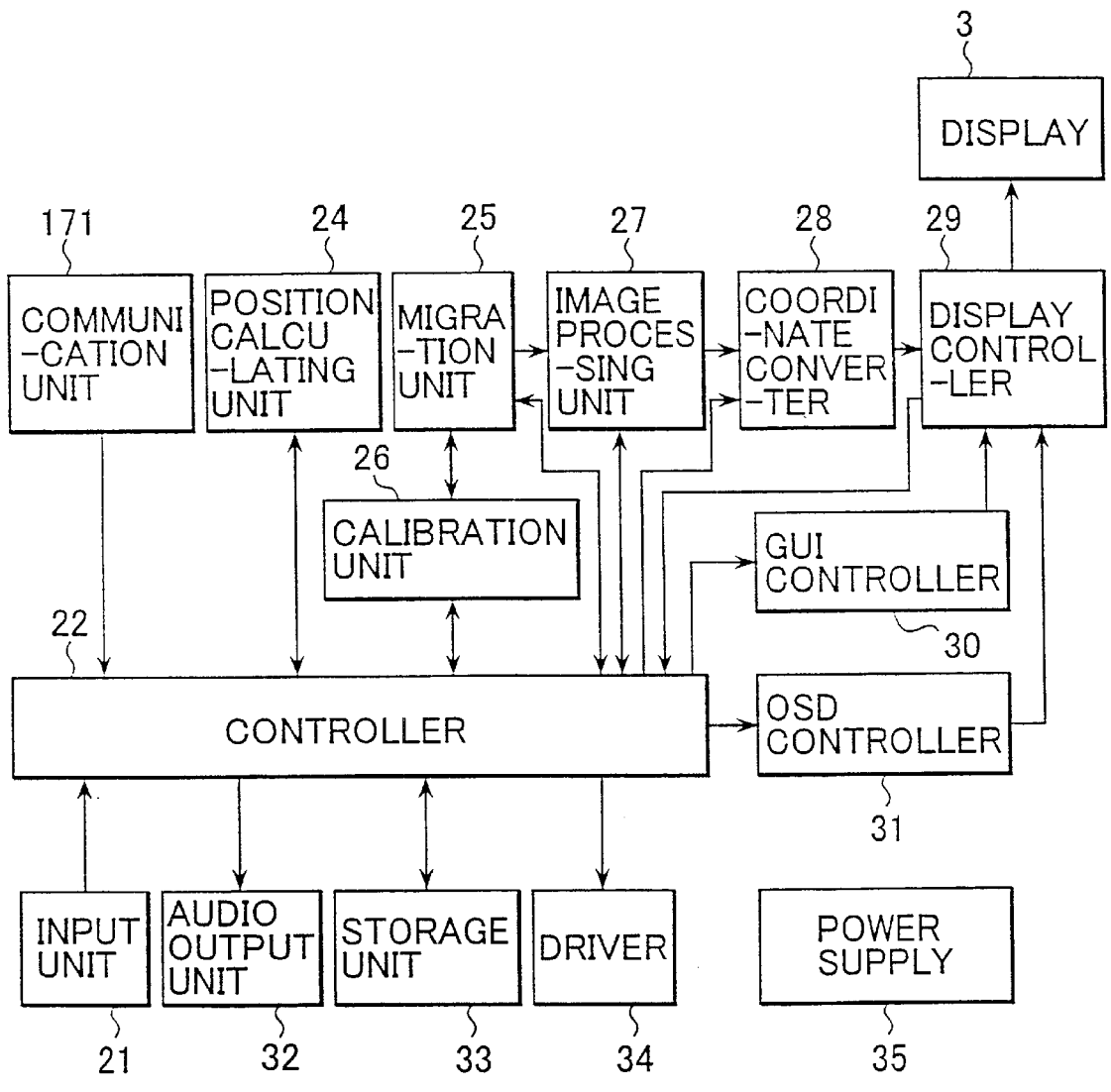
FIG. 74 is a block diagram illustrating an exemplary configuration of a body 1 in FIG. 71.

Further, the body 1 is configured as illustrated in FIG. 74. While its basic configuration is similar to that in FIG. 57, the body 1 is provided with a position calculating unit 24 for receiving a count value input from the beam detector 202 to calculate the position of the movable unit 151 (sensor head 152). When the count value of the counter 226 is wirelessly supplied through the communication unit 251 of the beam detector 202, the controller 22 receives this through the communication unit 171 and outputs this to the position calculating unit 24. The position calculating unit 24 performs a calculation for determining the position based on the input count value. The controller 22 supplies the migration unit 25 with the result of the calculation performed in the position calculating unit 24. The rest of the configuration is similar to that in FIG. 57.

Since these operations are basically similar to the aforementioned, explanation thereof is omitted. However, since no land mine is detected in this example, the beam detector 202 is disposed in front of the movable unit 151 as illustrated in FIG. 71. This is because the beam detector 202 must be carried on the safe zone side for detecting land mines, whereas the beam detector 202 is not necessarily disposed in front when an object under inspection is not a land mine (not a dangerous object), and therefore disposed in front since the beam detector 202 disposed in front will not obstruct the operation. However, it goes without saying that the beam detector 202 may be disposed at the back of the movable unit 151.

While the present invention has been described for an example in which the land mines are detected in the ground under inspection, and for an example in which internal reinforcing bars are inspected within a structure under inspection, the present invention can be applied for inspecting any objects positioned inside other subjects under inspection.

DRAWINGS

FIG. 1
  1 BODY
  2 TIRES
  3 DISPLAY
  11-1~11-4 HINGES
  12 SENSOR HEAD
  12-1~12-3 ARM
FIG. 2
  12 SENSOR HEAD
  51 TRANSMITTER
  52 RECEIVER
  53 MARKING UNIT
  54 CONTROLLER
  1 BODY
  3 DISPLAY
  21 INPUT UNIT
  22 CONTROLLER
  23 POSITION DETECTOR
  24 POSITION CALCULATING UNIT
  25 MIGRATION UNIT
  26 CALIBRATION UNIT
  27 IMAGE PROCESSING UNIT
  28 COORDINATE CONVERTER
  29 DISPLAY CONTROLLER
  30 GUI CONTROLLER
  31 OSD CONTROLLER
  32 AUDIO OUTPUT UNIT
  33 STORAGE UNIT
  34 DRIVER
  35 POWER SUPPLY
FIG. 3
  54 CONTROLLER
  121 2-MHz CLOCK GENERATOR CIRCUIT
  122 40-Hz CLOCK GENERATOR CIRCUIT
  123 RECEPTION UNIT
  12 SENSOR HEAD
  51 TRANSMITTER
  101 IMPULSE GENERATOR
  52 RECEIVER
  111 SAMPLING PULSE GENERATOR
  112 SAMPLING UNIT
  SEVERAL ns
  P OBJECT
FIG. 4(A)
  RECEIVED WAVE (REFLECTED WAVE)
  SENT WAVE
FIG. 5
  SAMPLING PULSE
FIG. 7(A)
  REFERENCE POINT
  SAMPLING POINT
FIG. 7(B)
  REFERENCE POINT
  SAMPLING POINT
FIG. 8
  GROUND
FIG. 9
  GROUND
FIG. 10
  71 OBJECT
FIG. 15
  START
  S1 CALIBRATION
  S2 MODE SELECTION
  S3 SCAN MODE?
  S4 SCANNING OPERATION
  S5 IMAGE PROCESSING
  S6 DISPLAY SCANNED RANGE
  S7 SCANNING OPERATION TERMINATED?
  S8 TERMINATED?
  END

Figure 33:
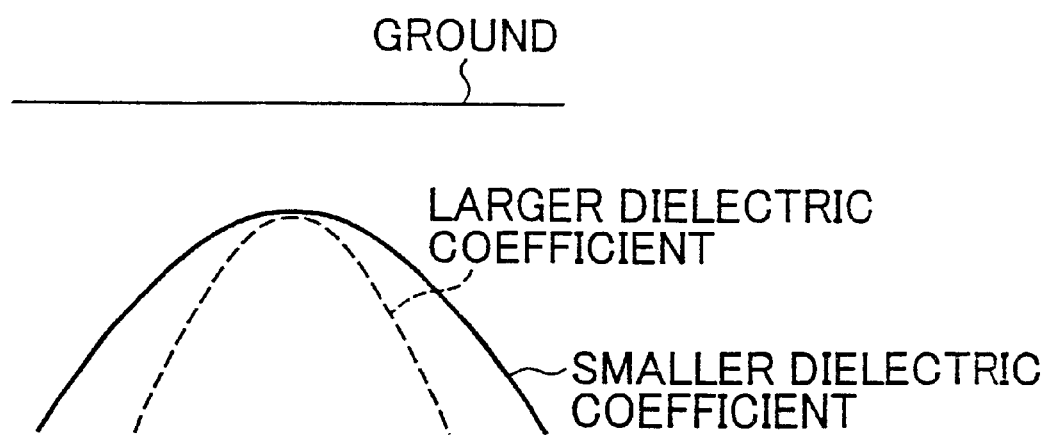
FIG. 33 is a diagram for explaining a change in hyperbolic characteristic caused by a difference in dielectric coefficient.

FIG. 16
  S9 THREE-DIMENSIONAL OBJECT IMAGE DISPLAY MODE?
  S10 HORIZONTAL PLANE DISPLAY
  S11 SUPERIMPOSE CURSOR ON DISPLAY
  S12 CHANGE DEPTH?
  S13 CHANGE DEPTH
  S14 CHANGE SCALING FACTOR?
  S15 CHANGE SCALING FACTOR
  S16 MARKING REQUIRED?
  S17 MARKING
  S18 PLANE DISPLAY TERMINATED?
  S19 THREE-DIMENSIONAL OBJECT IMAGE DISPLAY
  S20 CHANGE ORIENTATION?
  S21 THREE-DIMENSIONAL OBJECT IMAGE DISPLAY TERMINATED?
  S22 CHANGE
FIG. 17
  SUB-SCAN DIRECTION
  MAIN SCAN DIRECTION
FIG. 18
  (A) RED
  (B) RED
     BLUE
  (C) BLUE
FIG. 19
  DEPTH
  81 SCALE
  82 INDICATOR
  83 CURSOR
FIG. 20
  DEPTH
FIG. 21
  DEPTH
FIG. 22
  START SCREEN DISPLAY PROCESSING
  S51 LEVEL L OF SIGNAL CORRESPONDING TO REFLECTED WAVE IS LARGER THAN $T_2$?
  S52 DISPLAY IN RED
  S53 LEVEL L OF SIGNAL CORRESPONDING TO REFLECTED WAVE IS LARGER THAN $T_1$?
  S54 DISPLAY IN BLUE
  S55 DISPLAY IN ANOTHER COLOR
  RETURN
FIG. 23
  METAL
  PLASTIC
  WOOD, AIR
FIG. 24(A)
  12 SENSOR HEAD
  12A POSITION
  ELECTROMAGNETIC WAVE TRANSMITTING DIRECTION
FIG. 24(B)
  MAIN SCAN DIRECTION
  12 SENSOR HEAD
  12A POSITION
  12B POSITION
FIG. 25
  DEPTH
FIG. 26
  DEPTH
FIG. 27
  DEPTH
FIG. 28
  SUB-SCAN DIRECTION
    SEARCH DEPTH
    MAIN SCAN DIRECTION
  SLICE
FIG. 29
  FRAME
FIG. 33
  GROUND
  LARGER DIELECTRIC COEFFICIENT
  SMALLER DIELECTRIC COEFFICIENT
FIG. 34
  START CALIBRATION PROCESSING
  S31 BURY OBJECT AT PREDETERMINED DEPTH
  S32 OPERATE SCANNING
  S33 STORE DATA
  S34 SET PREDETERMINED DIELECTRIC COEFFICIENT
  S35 MIGRATION PROCESSING
  S36 SET DIELECTRIC COEFFICIENT IN REQUIRED RANGE?
  S37 SELECT CURVE HAVING THE LARGEST PEAK
  S38 A PLURALITY OF CURVES?
  S39 SELECT CURVE HAVING THE SMALLEST WIDTH
  S40 SET DIELECTRIC COEFFICIENT CORRESPONDING TO SELECTED CURVE
  RETURN
FIG. 35
  START
  S61 CALIBRATION
  S62 MODE SELECTION
  S63 SCAN MODE?
  S64 SCANNING OPERATION
  S65 IMAGE PROCESSING
  S66 DISPLAY IMAGE
  S67 SCANNING OPERATION TERMINATED?
  S68 TERMINATED?
  END
FIG. 36
  111 MOVABLE UNIT
  121 SENSOR HEAD
  122 DISPLAY
  123 ARM
  124 HANDLE
  125 HOLDER
FIG. 37
  111 MOVABLE UNIT
  121 SENSOR HEAD
  122 DISPLAY
  123 ARM
  124 HANDLE
  125 HOLDER

Figure 58:
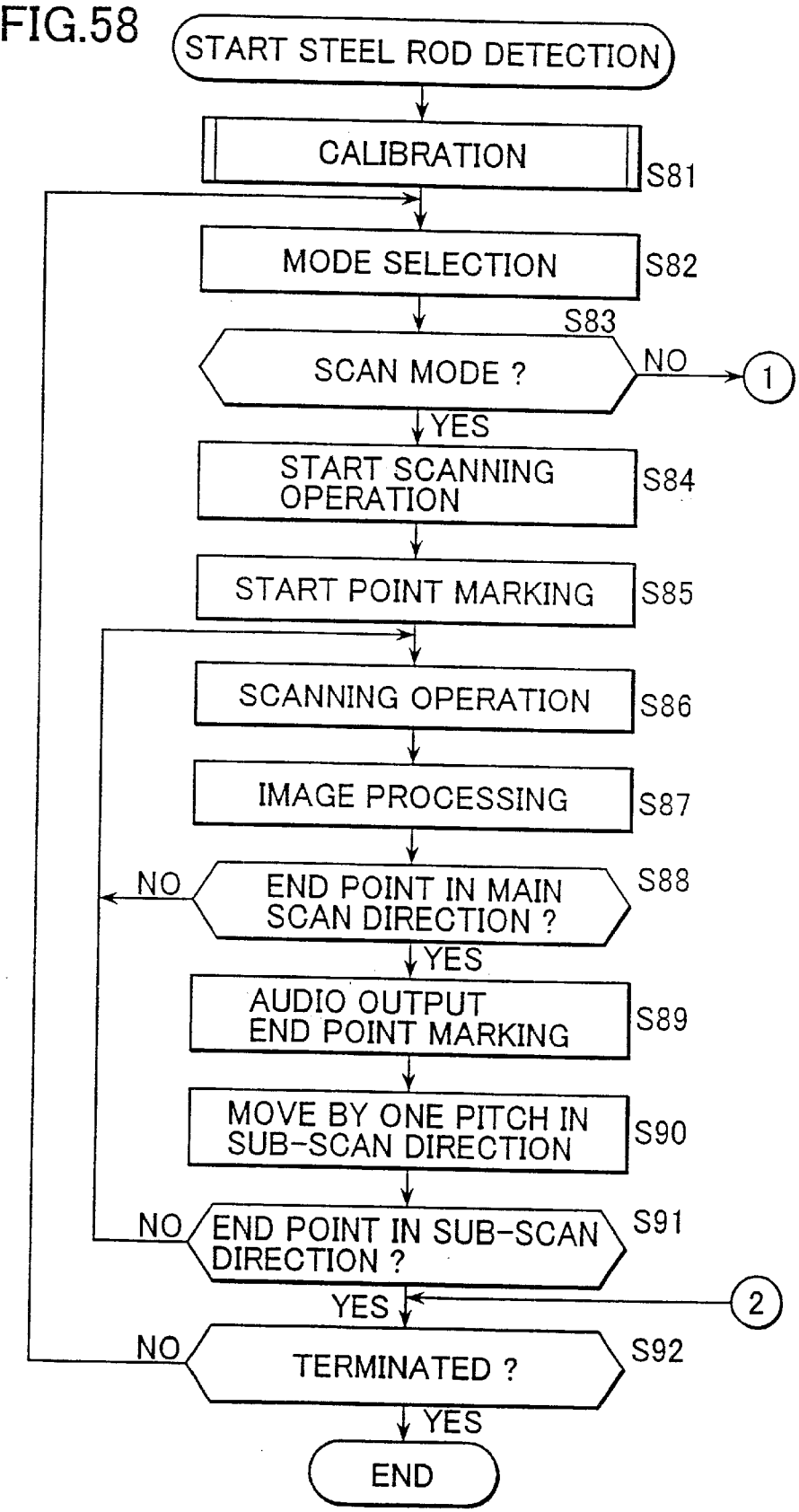
FIG. 58 is a flow chart for explaining the operation of an inspection apparatus in FIG. 55.

FIG. 38
  111 MOVABLE UNIT
  121 SENSOR HEAD
  122 DISPLAY
  123 ARM
  124 HANDLE
  125 HOLDER
FIG. 40
  201 MOVABLE UNIT
  202 BEAM DETECTOR
  203 LINE SENSOR
  1 BODY
  GROUND SURFACE
  P OBJECT
  DANGEROUS ZONE SAFE ZONE
FIG. 41
  202 BEAM DETECTOR
  203 LINE SENSOR
FIG. 42
  201 MOVABLE UNIT
  211 LASER BEAM GENERATOR
  51 TRANSMITTER
  52 RECEIVER
  53 MARKING UNIT
  54 CONTROLLER
  1 BODY
  3 DISPLAY
  21 INPUT UNIT
  22 CONTROLLER
  23 POSITION DETECTOR
  24 POSITION CALCULATING UNIT
  25 MIGRATION UNIT
  26 CALIBRATION UNIT
  27 IMAGE PROCESSING UNIT
  28 COORDINATE CONVERTER
  29 DISPLAY CONTROLLER
  30 GUI CONTROLLER
  31 OSD CONTROLLER
  32 AUDIO OUTPUT UNIT
  33 STORAGE UNIT
  34 DRIVER
  35 POWER SUPPLY
  202 BEAM DETECTOR
FIG. 43
  203 LINE SENSOR
  221 AMPLIFIER
  222 DETECTOR
  223 WAVEFORM SHAPER
  224 CONTROLLER
  225 CLOCK GENERATOR
  226 COUNTER
  227 P/S CONVERTER
    TO POSITION CALCULATING UNIT 24
  DETECTOR 202
FIG. 46
  REFERENCE PULSE
  TIME
FIG. 50
  241 GLOVE
  242 FIXING BELT
  243 HARD BINDER
FIG. 51
  251 LASER DIODE
  252 CYLINDRICAL LENS
  253 FIXED MIRROR
  254 SECOND-ORDER CURVED-SURFACE MIRROR
FIG. 52
  203-1 LINE SENSOR
  203-2 LINE SENSOR
FIG. 53
  201 MOVABLE UNIT
  202 BEAM DETECTOR
FIG. 54
  141 STRUCTURE
  142-1 STEEL BAR
  142-2 STEEL BAR
FIG. 55
  151 MOVABLE UNIT
  152 SENSOR HEAD
  153 HANDLE
  154 DISPLAY
  1 BODY
  3 DISPLAY
FIG. 56
  51 TRANSMITTER
  52 RECEIVER
  53 MARKING UNIT
  54 CONTROLLER
  154 DISPLAY
  161 INPUT UNIT
  162 POSITION DETECTOR
  163 POSITION CALCULATING UNIT
  164 COMMUNICATION UNIT
  SENSOR HEAD 152
FIG. 57
  3 DISPLAY
  21 INPUT UNIT
  22 CONTROLLER
  25 MIGRATION UNIT
  26 CALIBRATION UNIT
  27 IMAGE PROCESSING UNIT
  28 COORDINATE CONVERTER
  29 DISPLAY CONTROLLER
  30 GUI CONTROLLER
  31 OSD CONTROLLER
  32 AUDIO OUTPUT UNIT
  33 STORAGE UNIT
  34 DRIVER
  35 POWER SUPPLY
  171 COMMUNICATION UNIT
  BODY 1
FIG. 58
  START STEEL ROD DETECTION
  S81 CALIBRATION
  S82 MODE SELECTION

Figure 59:
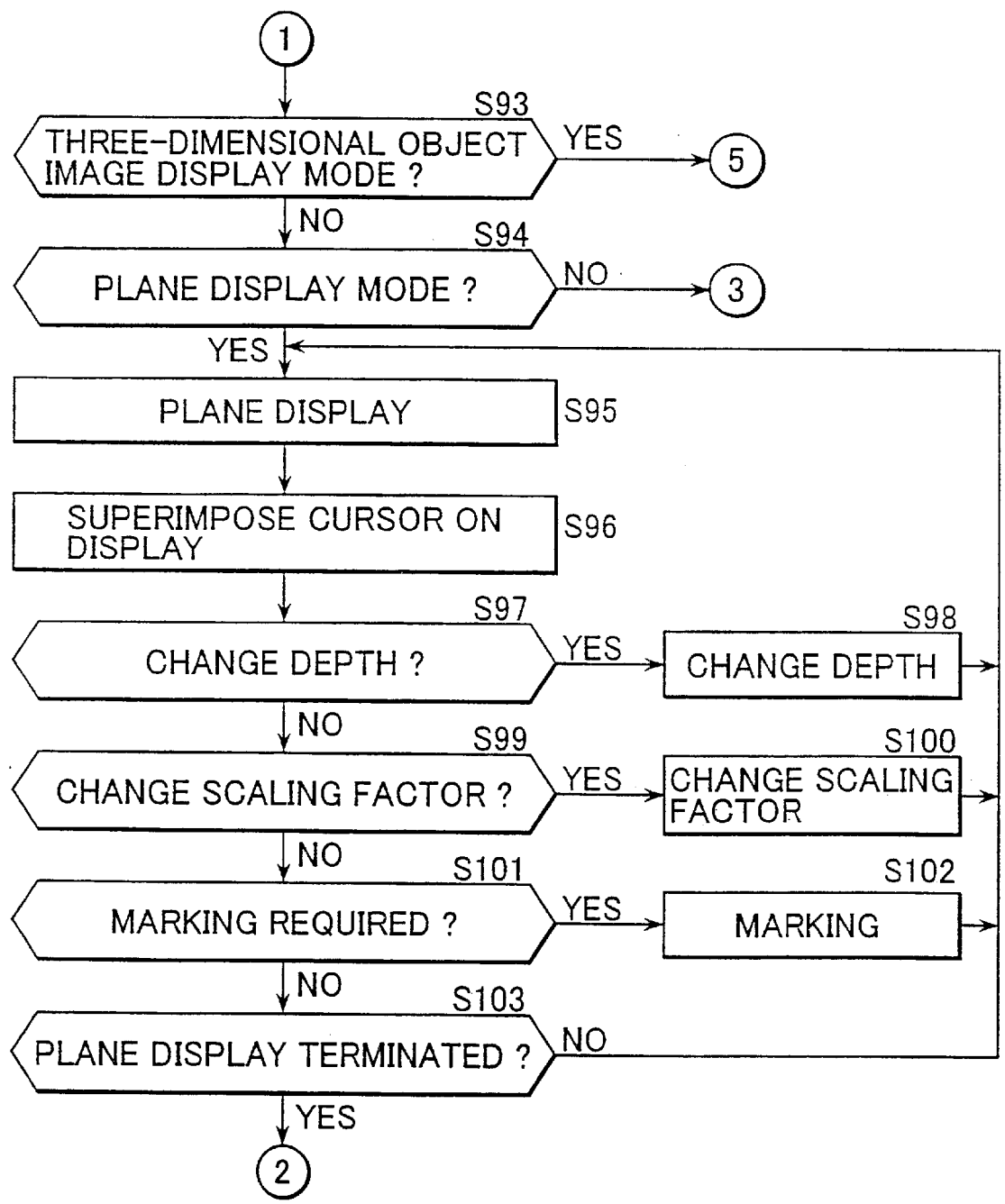
FIG. 59 is a flow chart for explaining the operation of the inspection apparatus in FIG. 55.
Figure 60:
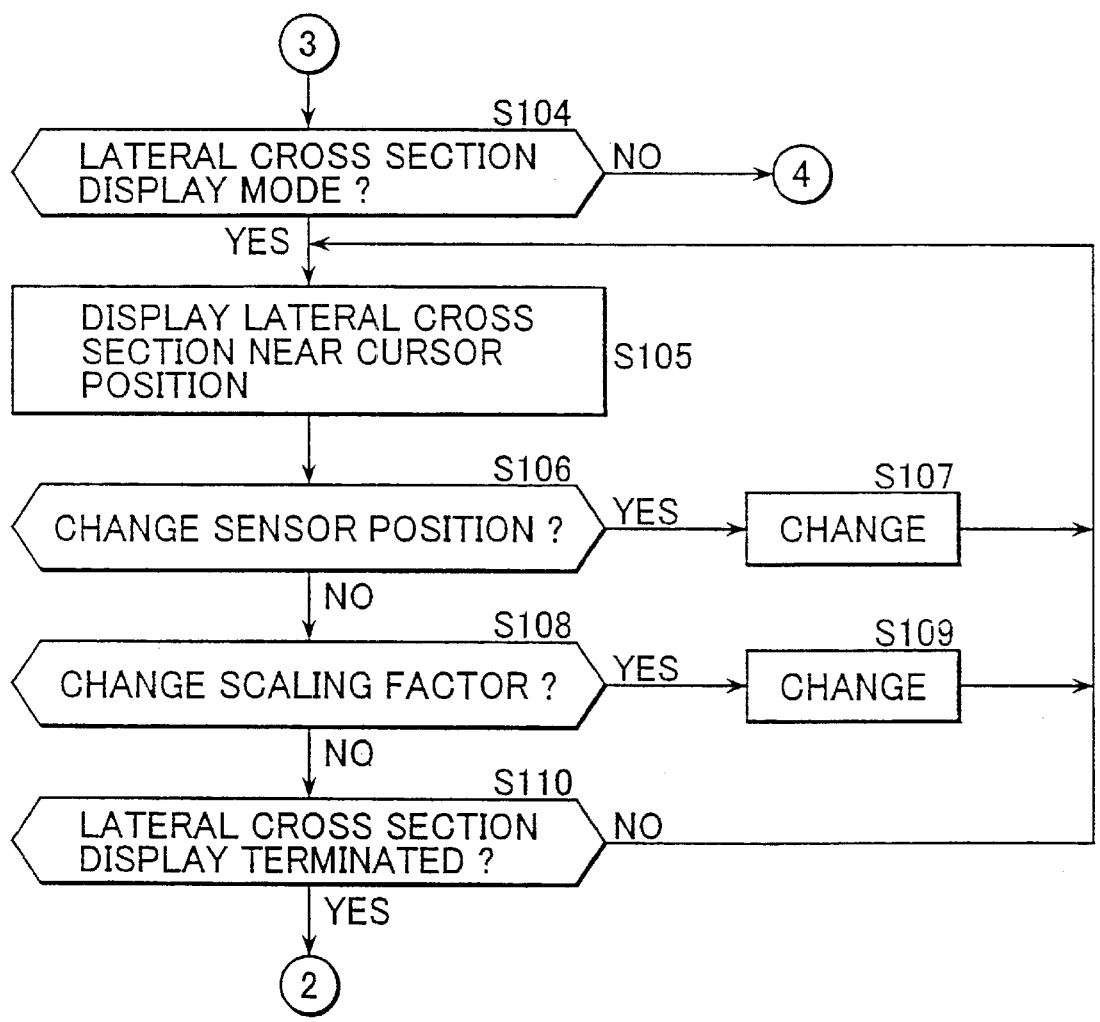
FIG. 60 is a flow chart for explaining the operation of the inspection apparatus in FIG. 55.
Figure 61:
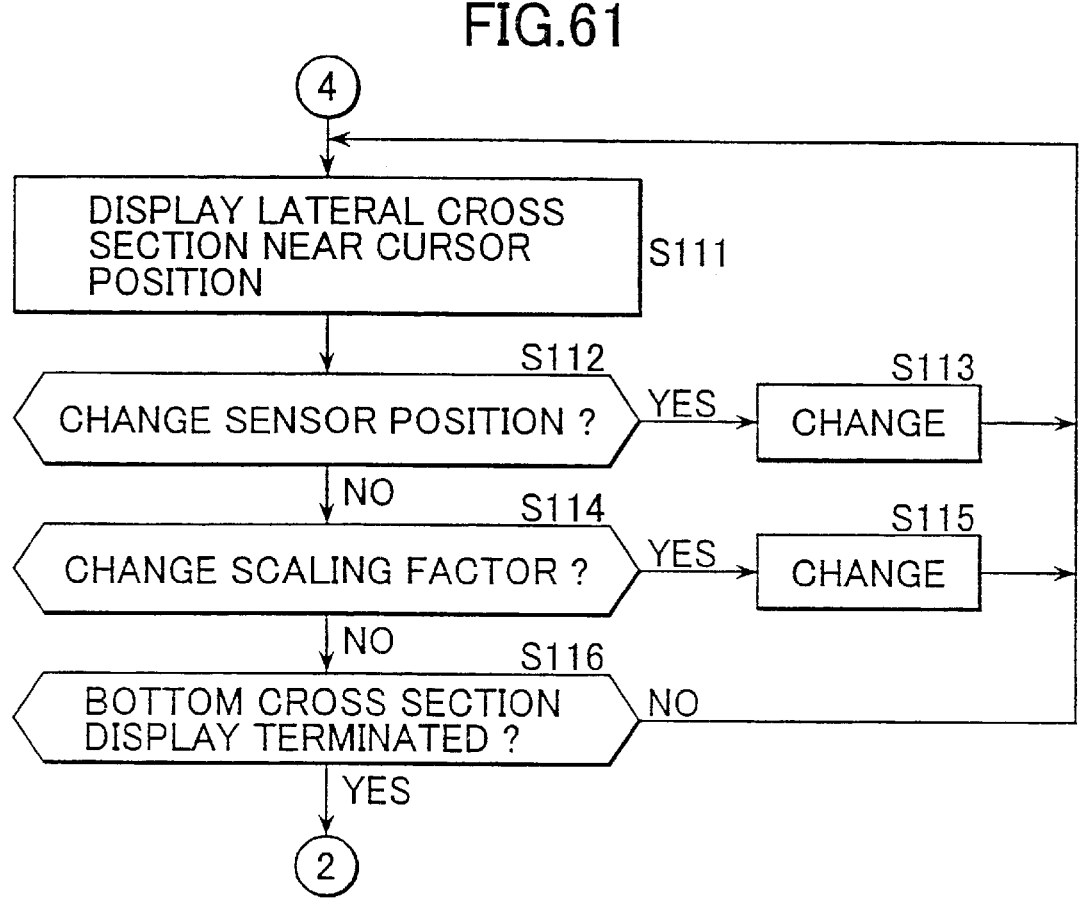
FIG. 61 is a flow chart for explaining the operation of the inspection apparatus in FIG. 55.
Figure 62:
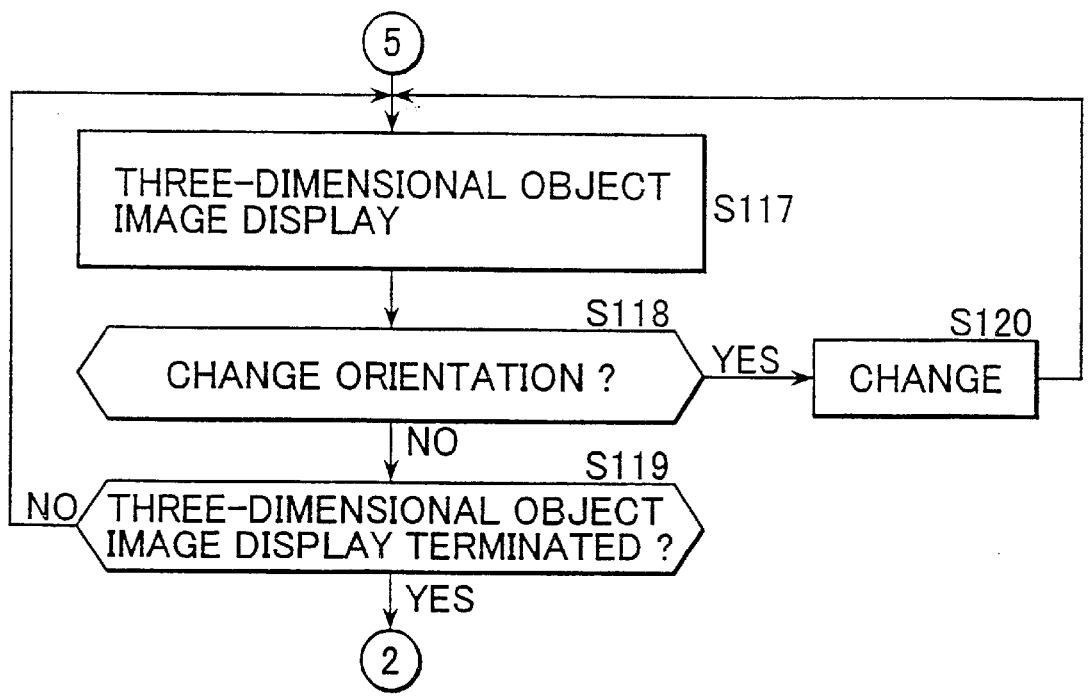
FIG. 62 is a flow chart for explaining the operation of the inspection apparatus in FIG. 55.

S83 SCAN MODE?
S84 START SCANNING OPERATION
S85 START POINT MARKING
S86 SCANNING OPERATION
S87 IMAGE PROCESSING
S88 END POINT IN MAIN SCAN DIRECTION?
S89 AUDIO OUTPUT
END POINT MARKING
S90 MOVE BY ONE PITCH IN SUB-SCAN DIRECTION
S91 END POINT IN SUB-SCAN DIRECTION?
S92 TERMINATED?
END
FIG. 59
S93 THREE-DIMENSIONAL OBJECT IMAGE DISPLAY MODE?
S94 PLANE DISPLAY MODE?
S95 PLANE DISPLAY
S96 SUPERIMPOSE CURSOR ON DISPLAY
S97 CHANGE DEPTH?
S98 CHANGE DEPTH
S99 CHANGE SCALING FACTOR?
S100 CHANGE SCALING FACTOR
S101 MARKING REQUIRED?
S102 MARKING
S103 PLANE DISPLAY TERMINATED?
FIG. 60
S104 LATERAL CROSS SECTION DISPLAY MODE?
S105 DISPLAY LATERAL CROSS SECTION NEAR CURSOR POSITION
S106 CHANGE SENSOR POSITION?
S107 CHANGE
S108 CHANGE SCALING FACTOR?
S109 CHANGE
S110 LATERAL CROSS SECTION DISPLAY TERMINATED?
FIG. 61
S111 BOTTOM CROSS SECTION DISPLAY NEAR CURSOR POSITION
S112 CHANGE SENSOR POSITION?
S113 CHANGE
S114 CHANGE SCALING FACTOR?
S115 CHANGE
S116 BOTTOM CROSS SECTION DISPLAY TERMINATED?
FIG. 62
S117 THREE-DIMENSIONAL OBJECT IMAGE DISPLAY
S118 CHANGE ORIENTATION?
S120 CHANGE
S119 THREE-DIMENSIONAL OBJECT IMAGE DISPLAY TERMINATED?
FIG. 63
$M_{S1}$ START POINT MARK
$M_{E1}$ END POINT MARK
FIG. 64
142-a MAIN REINFORCEMENT
142-b TIE HOOP
83 CURSOR

FIG. 71
1 BODY
3 DISPLAY
151 MOVABLE UNIT
152 SENSOR HEAD
153 HANDLE
154 DISPLAY
202 BEAM DETECTOR
FIG. 72
51 TRANSMITTER
52 RECEIVER
53 MARKING UNIT
54 CONTROLLER
154 DISPLAY
161 INPUT UNIT
164 COMMUNICATION UNIT
211 LASER BEAM GENERATOR
SENSOR HEAD 152
FIG. 73
203 LINE SENSOR
221 AMPLIFIER
222 DETECTOR
223 WAVEFORM SHAPER
224 CONTROLLER
225 CLOCK GENERATOR
226 COUNTER
227 P/S CONVERTER
251 COMMUNICATION UNIT
BEAM DETECTOR 202
FIG. 74
3 DISPLAY
21 INPUT UNIT
22 CONTROLLER
24 POSITION CALCULATING UNIT
25 MIGRATION UNIT
26 CALIBRATION UNIT
27 IMAGE PROCESSING UNIT
28 COORDINATE CONVERTER
29 DISPLAY CONTROLLER
30 GUI CONTROLLER
31 OSD CONTROLLER
32 AUDIO OUTPUT UNIT
33 STORAGE UNIT
34 DRIVER
35 POWER SUPPLY
171 COMMUNICATION UNIT
BODY 1

What is claimed is:
1. An inspection apparatus characterized by comprising:
transmitting and receiving means for transmitting an electromagnetic wave to an object under inspection in a range in which said object under inspection is scanned, and receiving a reflected wave thereof;
a position detecting means for detecting a position at which said transmitting and receiving means receives said reflected wave;
processing means for processing a signal indicative of a three-dimensional structure inside of said object under inspection based on a period of time from the transmission of said electromagnetic wave by said transmitting and receiving means to the reception of the reflected wave, a received level of said reflected wave, and said position being detected by said position detecting means;

generating means for generating an image signal from said signal indicative of the three-dimensional structure processed by said processing means;

display means for displaying an image based on said image signal generated by said generating means; and mode switching means for switching a first mode for instructing said display means to display an image indicative of the range in which said object under inspection has been scanned, and a second mode for instructing said display means to display an image representative of a three-dimensional structure inside of said object under inspection, generated by said image information generating means, wherein said display means displays the image indicative of the range in which said object under inspection has been scanned when switched to said first mode, and displays the image representative of the three-dimensional structure inside of said object under inspection when switched to said second mode.

2. An inspection apparatus according to claim 1, characterized by further comprising:

displayed cross section switching means for switching an image displayed on said display means to an image of a plane cross section inside of said object under inspection generated by said generating means, or to an image of a lateral cross section inside of said object under inspection.

3. An inspection apparatus according to claim 2, characterized by further comprising:

symbol display means for superimposing a predetermined symbol on said display means corresponding to a position of said transmitting and receiving means when said transmitting and receiving means scans in a state in which said mode switching means has switched to said second mode, and said displayed cross section switching means has switched to display an image of a plane cross section inside of said object under inspection on said display means.

4. An inspection apparatus according to claim 2, characterized by further comprising:

depth specifying means for specifying a depth of a plane cross section when an image of the plane cross section inside of said object under inspection is displayed on said display means, wherein said display means display an image of a plane cross section inside of said object under inspection at a depth specified by said depth specifying means.

5. An inspection apparatus according to claim 2, characterized by further comprising:

direction specifying means for specifying a direction of a lateral cross section when an image of the lateral cross section inside of said object under inspection is displayed on said display means, wherein said display means displays an image of a lateral cross section inside of said object under inspection in a direction specified by said direction specifying means.

6. An inspection apparatus according to claim 1, characterized by further comprising:

marking means for marking a predetermined mark at a predetermined position when said transmitting and receiving means is scanned in a state in which switching has been made to display an image of a plane cross section inside of said object under inspection on said display means.

7. An inspection apparatus according to claim 6, characterized by further comprising:

distinguishing means for distinguishing a material of an article positioned in said object under inspection based on a signal corresponding to the intensity of said reflected wave.

8. An inspection apparatus according to claim 7, characterized in that:

said distinguishing means distinguishes at least metal from plastic.

9. An inspection apparatus according to claim 7, characterized in that:

said display means displays different materials in different colors corresponding to the result of a determination made by said determining means.

10. An inspection apparatus according to claim 6, characterized in that:

said display means further displays a shape which serves as a reference for the size of an article in said object under inspection.

11. An inspection apparatus according to claim 1, characterized by further comprising:

scaling factor specifying means for specifying a scaling factor of an image displayed on said display means, wherein said display means displays an image inside of said object under inspection at a scaling factor specified by said scaling factor specifying means.

12. An inspection apparatus according to claim 1, characterized in that:

said generating means generates a three-dimensional image of an article positioned in said object under inspection; and said inspection apparatus further comprises three-dimensional image display means for displaying a three-dimensional image said article positioned in said object under inspection.

13. An inspection apparatus according to claim 1, characterized in that:

said display means is formed integrally with said transmitting and receiving means.

14. An inspection apparatus according to claim 1, characterized by further comprising:

adding means for adding a mark indicative of a position at which scanning is started or a position at which the scanning is finished on said object under inspection.

15. An inspection apparatus according to claim 1, characterized in that:

said display means simultaneously displays an image of plane cross section inside of said object under inspection and an image of lateral cross section inside of said object under inspection.

16. An inspection apparatus according to claim 15, characterized in that:

said display means displays the position of a plane of the image of the lateral cross section inside of said object under inspection in line with the position of a plane of the image of the plane cross section inside of said object under inspection.

17. An inspection apparatus characterized by comprising:

transmitting and receiving means for transmitting an electromagnetic wave to an object under inspection in a range in which said object under inspection is scanned, and receiving a reflected wave thereof;

inspecting means for inspecting the interior of said object under inspection from an output of said transmitting and receiving means;

generating means constructed integrally with said transmitting and receiving means for generating at least three light beams of substantially flat plate shape in cross section;

light receiving means for receiving said three light beams and outputting signals corresponding to positions at which said light beams are received; and position detecting means for detecting a position of said transmitting and receiving means from an output of said light receiving means.

18. An inspection apparatus according to claim 17, characterized in that:

said light receiving means comprises at least one line sensor; and said position detecting means calculates the position of said transmitting and receiving means based on spacings between positions at which said line sensor receives said three light beams.

19. An inspection apparatus according to claim 17, characterized by further comprising:

converting means for converting said three light beams to substantially collimated light.

20. An inspection apparatus according to claim 17, characterized in that:

said light receiving means comprises at least two line sensors;

said generating means inclines said three light beams of substantially flat plate shape in cross sectional a predetermined angle with respect to said two line sensors; and said position detecting means calculates a three-dimensional position of said transmitting and receiving means and rotation about the three-dimensional axes based on spacings between positions at which said two line sensors receive said three light beams.

* * * * *